United States Patent [19]

Watanabe et al.

[11] Patent Number: 5,333,239
[45] Date of Patent: Jul. 26, 1994

[54] LEARNING PROCESS SYSTEM FOR USE WITH A NEURAL NETWORK STRUCTURE DATA PROCESSING APPARATUS

[75] Inventors: Nobuo Watanabe, Zama; Takashi Kimoto, Yokohama; Akira Kawamura, Kawasaki; Ryusuke Masuoka, Tokyo; Kazuo Asakawa, Kawasaki, all of Japan

[73] Assignee: Fujitsu Limited, Kawasaki, Japan

[21] Appl. No.: 3,856

[22] Filed: Jan. 11, 1993

Related U.S. Application Data

[63] Continuation of Ser. No. 490,583, May 11, 1990, abandoned.

[30] Foreign Application Priority Data

Sep. 12, 1988 [JP] Japan .................. 63-227825

[51] Int. Cl.[5] .................... G06F 15/18; G06G 7/60
[52] U.S. Cl. .................................................. 395/23
[58] Field of Search .................... 395/24, 23

[56] References Cited

U.S. PATENT DOCUMENTS

| | | | |
|---|---|---|---|
| 4,807,168 | 2/1989 | Moopenn et al. | 364/602 |
| 4,809,223 | 2/1989 | Brown | 365/45 |
| 4,858,177 | 8/1989 | Smith | 364/900 |
| 4,866,645 | 9/1989 | Lish | 364/602 |
| 4,912,653 | 3/1990 | Wood | 364/513 |
| 4,912,655 | 3/1990 | Wood | 364/513 |
| 4,941,122 | 7/1990 | Weideman | 364/807 |
| 4,979,126 | 12/1990 | Pao et al. | 364/513 |
| 4,988,891 | 1/1991 | Mashiko | 307/201 |
| 4,994,982 | 2/1991 | Duranton et al. | 364/513 |
| 5,003,490 | 3/1991 | Castelaz et al. | 364/513 |
| 5,056,037 | 10/1991 | Eberhardt | 364/513 |

OTHER PUBLICATIONS

McClelland et al., Explorations in Parallel Distributed Processing: A Handbook of Models, Programs, and Exercises, MIT Press, 1988, pp. 2, 3, 137–145.

Raffel et al., "A Generic Architecture for Wafer-Scale Neuromorphic Systems", from Proc. of the IEEE 1st Annual Intl. Conf. on Neural Networks, 1988, vol. II pp. 173–180.

Denning, E., "Accelerated Learning Using the Generalized Delta Rule", IEEE First Intl. Conf. Neural Networks, 1987, I523–530.

Hush et al., "Improving the Learning Rate of Back-Propagation with the Gradient Reuse Algorithm", IEEE Intl. Conf. on Neural Networks, Jul. 1988, I-44-1-I446.

IEEE International Conference on Neural Networks, San Diego, Calif. 24th–27th Jul. 1988, pp. I-625-I-632; A. Khotanzad et al.: "Distortion invariant character recognition by a multi-layer perceptron and back-propagation learning".

D. E. Rumelhart et al.: "Parallel distributed processing, vol. 1", vol. 1: Foundations:, 1986, pp. 318–362, The MIT Press, U.S.

IEEE International Conference on Neural Networks, San Diego, Calif., 24th–27th Jul. 1988, pp. I-335-I-341; A. Von Lehmen et al.: "Factors influencing learning by backpropagation".

*Primary Examiner*—Allen R. MacDonald
*Assistant Examiner*—Robert W. Downs
*Attorney, Agent, or Firm*—Staas & Halsey

[57] ABSTRACT

A learning process system is provided for a neural network. The neural network is a layered network comprising an input layer, an intermediate layer and an output layer formed of basic units. In the basic units, a plurality of inputs is multiplied by a weight signal and the products are accumulated, thereby supplying the sum of products. An output signal is obtained using a threshold value function in response to the sum of products. An error signal is generated by an error circuit in response to a difference between the output signal obtained from the output layer and a teacher signal. A weight updating signal is determined in a weight learning circuit by obtaining a weight value in which the sum of the error values falls within an allowable range. Thus, the learning is performed in the layered neural network through use of a back propagation method. Through such learning in the layered neural network, an updating quantity to be obtained in the present weight updating cycle is determined in response to a once delayed weight updating quantity signal in a previous weight updating cycle and a twice delayed weight updating quantity obtained at a twice-previous weight updating cycle prior to the previous weight updating cycle.

23 Claims, 41 Drawing Sheets

Fig. 4

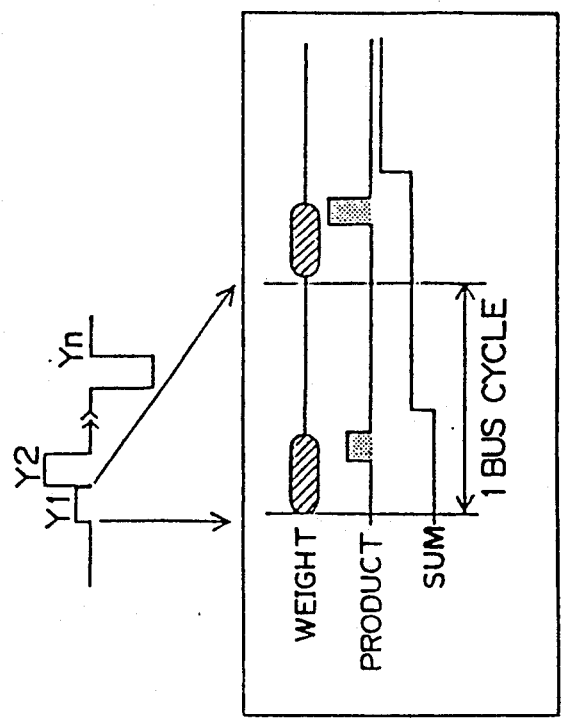
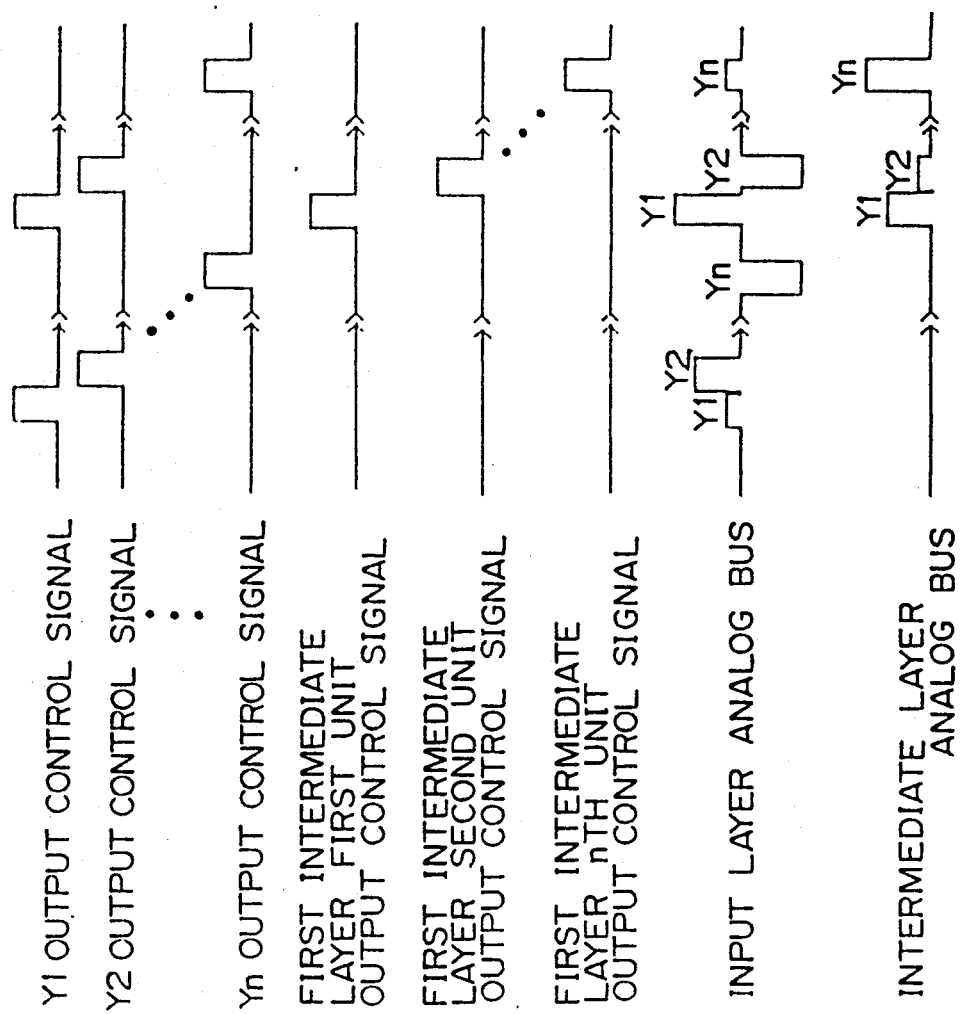
Fig. 22B
Fig. 22A

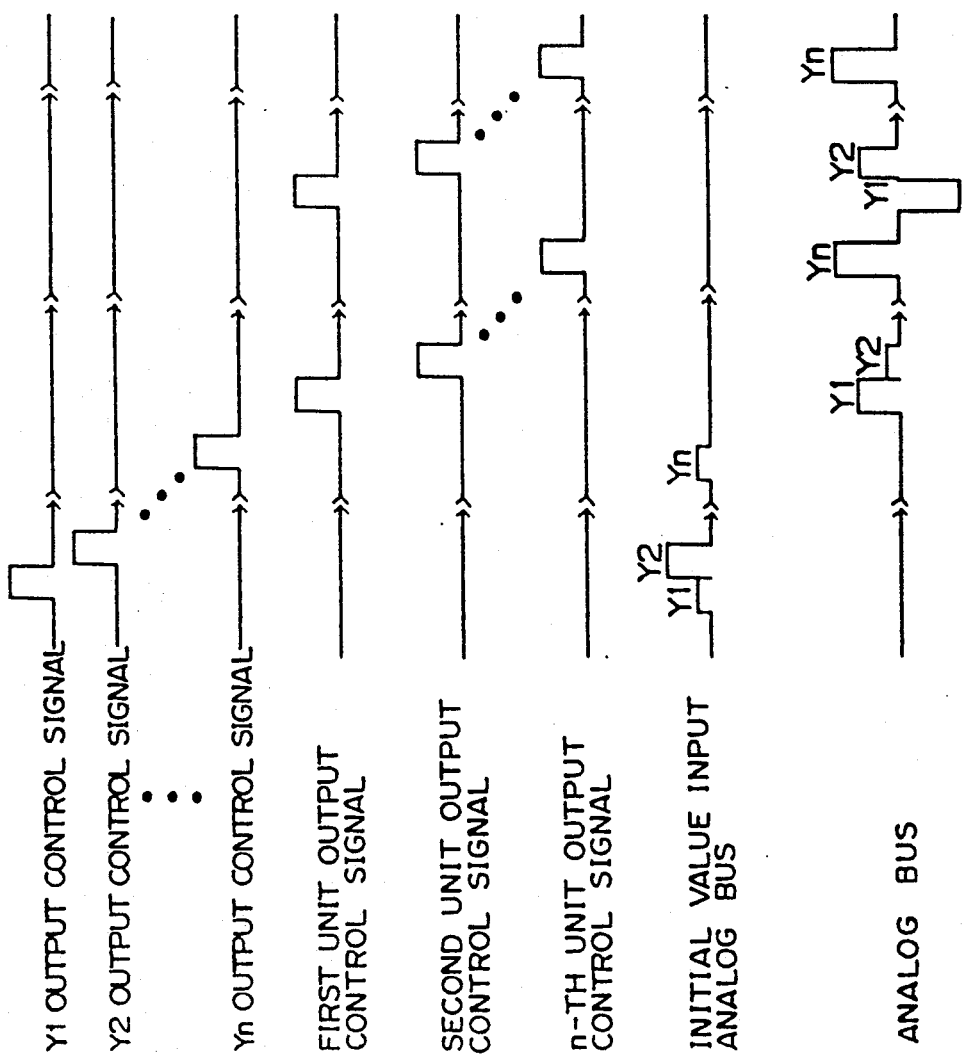
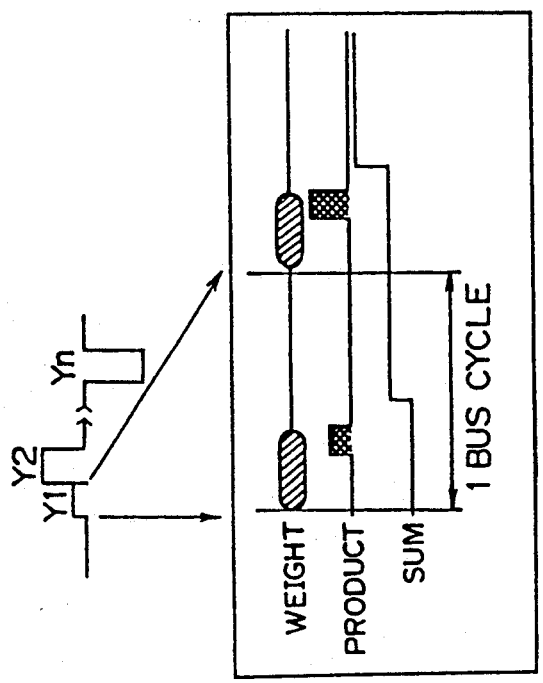
Fig. 33A
Fig. 33B

LEARNING PROCESS SYSTEM FOR USE WITH A NEURAL NETWORK STRUCTURE DATA PROCESSING APPARATUS

This application is a continuation of application Ser. No. 07/490,583, filed May 11, 1990, now abandoned.

RELATED APPLICATION

This application is related to U.S. Ser. No. 07/400,826 filed Aug. 30, 1989.

BACKGROUND OF THE INVENTION

1. Technical Field

The present invention relates to a learning process system for use in a network structure data process apparatus.

2. Background Art

In a conventional sequential processing computer (Neumann type) it is difficult to control a data process function in accordance with a variation in the usage method or environment. Therefore, an adaptive data processing method utilizing a parallel distribution system in a layered network is proposed. The back propagation method (D. E. Rumelhart, G. E. Hinton, and Williams, "Learning Internal Representations by Error Propagation", PARALLEL DISTRIBUTED PROCESSING, Vol. 1, pp. 318-364, The MIT Press, 1986) receives particular attention because of its high practicality.

The back propagation method utilizes a layered structure network comprising a node called a basic unit and internal connection having weights presented. FIG. 1 shows the principle structure of a basic unit. This basic unit 1 comprises a multiple-input single-output system and further comprises a multiplication unit 2 for multiplying the plurality of inputs by weights of the internal connections respectively, an accumulating unit 3 for adding all the multiplied results, and a threshold value processing unit 4 for outputting a final output by applying a nonlinear threshold value process to the added values. Many basic units 1 thus formed are connected in layers as shown in FIG. 2, thereby forming a layered network, and converts a pattern of an input signal to a corresponding output signal, thereby performing a data processing function.

The back-propagation method determines the weight of an internal connection within a layered network in accordance with a predetermined learning algorithm so that the output signal for the selected input signal becomes a teacher signal for designating the signal value to be satisfied. When this process determines the weight, and even if an unexpected or unsought signal is input, the layered network outputs a signal similar to the input signal, or an output signal which looks like the input signal, thereby realizing a data processing function for a "flexible" parallel distribution.

In order to practically realize a network structure data process apparatus such as the one recited above, it is necessary to realize a weight learning process within a shorter time period. In solving this problem, the background that a layered network is to be formed of multi-layers in order to realize a complex data process must be taken into account.

If it is determined that h layer is a pre-stage layer and i layer is a post-stage layer, the arithmetic operation performed by accumulation process unit 3 of and basic unit 1 is as shown by the following equation (1) and the arithmetic operation conducted by threshold value process unit 4 is shown by the following equation (2).

$$x_{pi} = \sum_h y_{ph} W_{ih} \quad (1)$$

$$y_{pi} = 1/(1 + \exp(-x_{pi} + \theta_i)) \quad (2)$$

where,
- h: a unit number of the h layer,
- i: a unit number of the i layer,
- p: a pattern number of an input signal,
- $\theta_i$: a threshold value of the ith unit in the i layer,
- $W_{ih}$: a weight of an internal connection between h-i layers,
- $x_{pi}$: sum of the products of an input from respective units in the h layer to the i unit in the i layer,
- $y_{ph}$: the output of the h layer for the input signal of the P-pattern,
- $y_{pi}$: the output of the i layer for the input signal of the P-pattern, The back propagation method adaptively and automatically adjusts an error in a feedback between weight $W_{ih}$ and threshold value $\theta_i$. As is clear from the equations (1) and (2). It is necessary to simultaneously carry out the adjustment of weight $W_{ih}$ and the threshold value $\theta_i$ but this operation is difficult where one is interfered with by the other. Therefore, the present applicant proposes that basic unit 1, having normally "1" as an input signal, is provided in a layer on the input side and threshold value $\theta_i$ is combined with weight $W_{ih}$ and therefore the threshold value $\theta_i$ does not appear externally, is disclosed in "patent application sho 62-333484 publication filed on Dec. 28, 1987 and titled "Network Structure Data Process Apparatus". The above equations (1), (2) can be expresd as follows.

$$x_{pi} = \sum_h y_{ph} W_{ih} \quad (3)$$

$$y_{pi} = 1/(1 + \exp(-x_{pi})) \quad (4)$$

A prior art technology of the weight learning process is explained in accordance with equations (3) and (4). The following explanation is made by using a layered network comprising a structure of h layer-i layer-j layer, as shown in FIG. 2.

The following equations can be derived from equations (3) and (4).

$$x_{pj} = \sum_i y_{pi} W_{ji} \quad (5)$$

$$y_{pj} = 1/(1 + \exp(-x_{pj})) \quad (6)$$

where,
- j: a unit number of the j layer,
- $W_{ji}$: a weight of an internal connection between i-j layer,
- $x_{pj}$: the sum of the products of the input from respective units in the i layer to the j unit in the j layer,
- $y_{pj}$: the output in the j layer for the input signal of the p pattern, According to a weight learning process, an error vector $E_P$ of the sum of the second powers of an error between a teacher signal and an output signal from the output layer is deemed to be an error in the layered network, thereby performing a calculation. The teacher signal is a signal which should be achieved by the output signal.

$$E_p = 1/2 \sum_j (y_{pj} - d_{pj})^2 \tag{7}$$

$$E = \sum_p E_p \tag{8}$$

where, $E_p$: an error vector for an input signal of the P-pattern,
E: the sum of the error vectors for the input signals of all the patterns,
$d_{pj}$: the teacher signal for the j unit in the j layer with regard to the input signal of the p pattern, In order to obtain a relation in an error vector and an output signal, equation (7) is subjected to a partial differentiation with regard to $y_{pj}$, is obtained.

$$\frac{\partial E_p}{\partial y_{pj}} = y_{pj} - d_{pj} = \delta_{pj} \tag{9}$$

Further, in order to obtain a relation between an error vector $E_p$ and the j-th layer, error vector $E_p$ is partially differentiated by $x_{pj}$, $$\frac{\partial E_p}{\partial x_{pj}} = \frac{\partial E_p}{\partial y_{pj}} \cdot \frac{\partial y_{pj}}{\partial x_{pj}} \tag{10}$$

$$= \delta_{pj} y_{pj} (1 - y_{pj})$$

is obtained. Further, in order to obtain a relation between error vector $E_p$ and a weight between i-j layers error vector $E_p$ is partially differentiated by $W_{ji}$.

$$\frac{\partial E_p}{\partial W_{ji}} = \frac{\partial E_p}{\partial x_{pj}} \cdot \frac{\partial x_{pj}}{\partial W_{ji}} \tag{11}$$

$$= \delta P_{ij} y_{pj} (1 - y_{pj}) Y_{pi}$$

Thus, the sum of the products expressed by the above equation can be obtained as a resolution.

Next, the variation of error vector $E_p$ for the output $y_{pi}$ in the i layer is as follows.

$$\frac{\partial E_p}{\partial y_{pi}} = \sum_j \frac{\partial E_p}{\partial x_{pj}} \cdot \frac{\partial x_{pj}}{\partial y_{pi}} \tag{12}$$

$$= \sum_j \delta_{pj} y_{pj} (1 - y_{pj}) W_{ji}$$

Next, a variation of the error vector for the variation of the sum $x_{pi}$ of the input to be supplied to the i layer input unit is calculated and then a solution expressed by the above sum of the products equation can be obtained.

$$\frac{\partial E_p}{\partial x_{pi}} = \sum_j \frac{\partial E_p}{\partial y_{pj}} \cdot \frac{\partial y_{pj}}{\partial x_{pi}} \tag{13}$$

$$= \left( \sum_j \delta_{pj} y_{pj} (1 - y_{pj}) W_{ji} \right) y_{pi} (1 - y_{pi})$$

Further, a relation of a variation of an error vector for the variation of the weight between h-i layers is provided by the following equation, the solution is expressed by the sum of the products.

$$\frac{\partial E_p}{\partial W_{ih}} = \sum_j \frac{\partial E_p}{\partial x_{pi}} \cdot \frac{\partial x_{pj}}{\partial W_{ih}} \tag{14}$$

$$= (\sum_j \delta_{pj} y_{pj} (1 - y_{pj} W_{ji}) y_{pi} (1 - y_{pi}) y_{ph}$$

Based on the above solution, the relation between the error vector and the weight between i-j layers for all the input patterns is obtained as follows.

$$\frac{\partial E}{\partial W_{ji}} = \sum_p \frac{\partial E_p}{\partial W_{ji}} \tag{15}$$

The relation between the error vector and the weight between h-i layers for the entire input pattern is as follows.

$$\frac{\partial E}{\partial W_{ih}} = \sum_p \frac{\partial E_p}{\partial W_{ih}} \tag{16}$$

Equations (15) and (16) show a ratio of a variation of an error vector for the variation of the weight between layers. When the weight is caused to vary so that the variation ratio becomes normally negative, the sum E of the error vectors can be gradually made 0 in accordance with the well-known gradient method. The conventional back propagation method determines the updating quantity $\Delta w_{ji}$ and $\Delta w_{ih}$ and one weight updating operation is determined as follows. The weight updating operation is repeated, thus converging the total sum E of the error vectors to the minimum value.

$$\Delta W_{ji} = -\epsilon \frac{\partial E}{\partial W_{ji}} \tag{17}$$

$$\Delta W_{ih} = -\epsilon \frac{\partial E}{\partial W_{ih}} \tag{18}$$

wherein, $\epsilon$ represent control parameters for learning.

The biggest problem of the back propagation method is that the number of learning operations necessary for convergence is large. This is more pronounced with a multiple network structure. To accelerate convergence, the data element relating to the updating quantity of the weight determined upon the previous updating cycle is added to equations (17) and (18). Then $\Delta w_{ih}$ and $\Delta w_{ji}$ are as follows.

$$\Delta W_{ji}(t) = -\epsilon \frac{\partial E(t)}{\partial W_{ji}(t)} + \alpha \Delta W_{ji}(t-1) \tag{19}$$

$$\Delta W_{ih}(t) = -\epsilon \frac{\partial E(t)}{\partial W_{ih}(t)} + \alpha \Delta W_{ih}(t-1) \tag{20}$$

wherein, $\alpha$ also represents a control parameter for the learning and t represents the number of updating operations.

When $\epsilon$ and $\alpha$, representing control parameters, are determined to be small, the sum E of the error vectors almost certainly converges and the number of learning operations required for convergence is made large. If both parameters are determined to decrease the number of learning operations, there is a fear that the sum E of the error vectors oscillates. When the number of units in the input layer is "13" and the number of units in the intermediate layer is "8", the number of units in the output layer is determined to be "7", thereby forming a layered network. Then the learning result is obtained by performing a learning using 62 input pattern signals shown in FIG. 4 and the corresponding teacher pattern signals and is shown in FIG. 5. In FIG. 5, the abscissa designates the number of learning operations and the ordinate axis designates the sum of the error vectors. The control parameter is determined $\epsilon=0.3$, $\alpha=0.2$. For this reason, the 13th basic unit always receives "1".

As is clear from FIG. 5, although there are some variations depending on the difference in the setting of the parameter, a large number of learning operations is required in the prior art to determine the weight.

SUMMARY OF THE INVENTION

The present invention is made in consideration of the above situation. An object of the present invention is to provide a learning process for determining a weight within a smaller number of learning operations, i.e., within a shorter time period, using a back propagation method in accordance with the network structure data process apparatus.

FIG. 6 shows the principle structure of the present invention.

In the drawing, a basic unit forms a basic element of a layered network. It receives a plurality of inputs and a weight to be multiplied by these inputs to obtain the sum of the products. The sum of the products thus obtained is converted by a threshold value function to provide the final output. 1-h is a plurality of basic units forming an input layer, 1-i is a plurality of basic units forming an intermediate layer in a plurality of stages in one or a plurality of stages. 1-j shows one or a plurality of basic units for forming the output layer. Connections are made between basic units 1-h and 1-i and between basic units 1-i and 1-j. A weight is then determined corresponding to respective connections, thereby forming a layered network designated by 10.

20 is a learning pattern maintaining means for maintaining a learning pattern necessary for a learning process. It comprises an input signal maintaining area 21 for maintaining a plurality of predetermined input signals and a teacher signal maintaining area 22 for maintaining a teacher signal for the predetermined input signal. 30 is an output signal introducing means for obtaining an output signal corresponding to the input signal by supplying the input signal maintained in input signal maintaining area 21 to layered network 10. 40 is an error value calculating means for calculating an error value designating the degree of non-consistence between two signals based on the output signal obtained from output signal introducing means 30. The teacher signal is maintained in teacher signal maintaining area 22, thereby providing an error value of all the input signals to be supplied.

50 is a weight learning means comprising weight updating quantity calculating means 51, a first weight updating quantity maintaining means 52, a second weight updating quantity maintaining means 53 and a weight updating means 54. Weight learning means 50 sequentially updates the weight of layered network 10 beginning with an initial value to obtain the value of the weight so that the sum of the error values is located within an allowable scope and the weight is thereby layered network. Thus, weights updating quantity calculating means 51 obtains a weight updating quantity by using an error value calculated by error value calculating means 40. First weight updating quantity maintaining means 52 maintains a weight updating quantity upon a previous updating cycle obtained by weight updating quantity calculating means 51. Second weight updating quantity maintaining means 53 maintains the weight updating quantity upon the updating cycle prior to the previous cycle obtained by weight updating quantity calculating means 51. Weight updating means 54 determines the weight updating quantity upon the current updating cycle by using the updating quantity obtained by weight updating quantity calculating means 51 and the weight updating quantity maintained by the first and second weight updating quantity maintaining means so that the value of the weight determined by the determined updating quantity is set for layered network 10.

The present invention provides second weight updating quantity maintaining means 53 for maintaining the weight updating quantity upon an updating cycle prior to the previous cycle and the data element relating to the weight updating quantity maintained by second weight updating quantity maintaining means 53 when the updating weight value is determined.

The weight updating quantity of the prior art back propagation system is determined based on the following differentiation equation.

$$M\ddot{W}(t) + D\dot{W}(t) = -\frac{\partial E(t)}{\partial W(t)} \quad (21)$$

The differentiation equation is solved with regard to ΔW by obtaining the difference approximate.

$$\Delta W(t) = \frac{-1}{M+D} \cdot \frac{\partial E(t)}{\partial W(t)} + \frac{M}{M+D} \Delta W(t-1) \quad (22)$$
$$= -\epsilon \frac{\partial E(t)}{\partial W(t)} + \alpha \Delta W(t-1)$$

Then the weight updating quantity of the prior art back propagation method given by equations (19) and (20) is introduced as recited above.

In contrast, the weight updating quantity of the present invention is based on the following differential equation (23).

$$J\dddot{W}(t) + M\ddot{W}(t) + D\dot{W}(t) = -\frac{\partial E(t)}{\partial W(t)} \quad (23)$$

This differential equation is solved with regard to ΔW through a difference approximate.

$$\Delta W(t) = \frac{-1}{J+M+D} \cdot \frac{\partial E(t)}{\partial W(t)} + \frac{2J+M}{J+M+D} \Delta W(t-1) - \frac{J}{J+M+D} \Delta W(t-2)$$
$$= -\epsilon \frac{\partial E(t)}{\partial W(t)} + \alpha \Delta W(t-1) - \beta \Delta W(t-2)$$

The data element relating to the weight updating quantity upon the updating cycle prior to the previous cycle is introduced as recited above.

Equation (23) represents a compulsory oscillation system relating to W when an external disturbance occurs as shown in the right side. Therefore, as is known from the theory of a compulsory oscillation system, if J, M and D and d are appropriately determined, W quickly converges to "0" without suffering an oscillation.

Therefore, by using the present invention, the updating quantity Δw corresponding to W can be quickly converged to "0" as in the compulsory oscillation system. Thus, the error vector can be rapidly converged to "0".

BRIEF DESCRIPTION OF THE DRAWINGS

FIG. 4 is a detailed explanatory view of the data used for a learning process, FIGS. 22A and 22B are timing charts of a signal processing in the embodiments shown in FIGS. 19 and 20.

FIGS. 33A and 33B are timing charts for designating the signal processes in the embodiment shown in FIG. 32.

DESCRIPTION OF THE PREFERRED EMBODIMENTS

Figure 7:
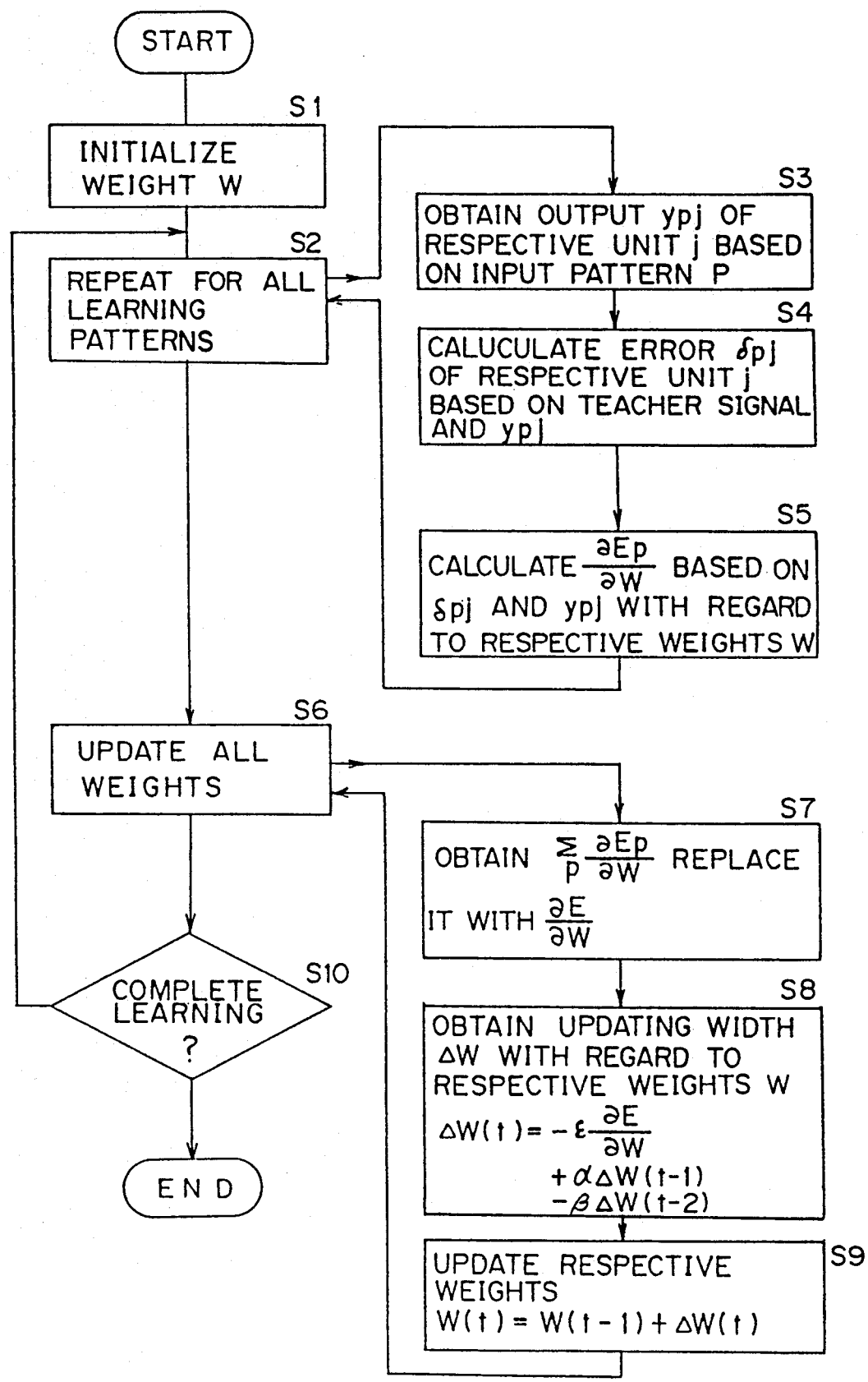
FIG. 7 shows a flowchart showing the learning algorithm of the present invention.

A rule for updating a weight to realize the present invention is shown in FIG. 7. The learning process of the present invention is explained in detail in accordance with the flowchart.

Upon a request for learning a weight, an initial value is set as a weight of an internal connection as shown in step S1. The initializing process is determined by a random number, as in the prior art. When these weight values are the same or symmetrical regarding basic unit 1, then the weight is not varied in accordance with the back propagation method and thus the learning does not proceed. This should be avoided.

In step S2, a pair comprising an input signal and a teacher signal registered as a learning pattern is slected. Then at step S3, the pattern of the input signal is entered into basic unit 1 in the intermediate layer of layered network 10. Thus, the output signal from basic unit 1 in the output layer can be output in accordance with the data conversion function of layered network 10. Equation (6) defines "$y_{pj}$" as "output of the j unit in the j layer (output layer) for the input signal of the p pattern". In step S3, the output "$y_{pj}$" from respective basic unit 1 forming the output layer is obtained. Further, the output "$y_{ph}$ from the h layer (input layer) to be output in accordance with the input of the selected input signal and the output "$y_{pi}$ of the i layer (intermediate layer) are simultaneously obtained.

As described above, when the output signal "$y_{pj}$" corresponding to the input signal of the learning pattern is obtained, the error "$\delta_{pj}$" between "$y_{pj}$" and the selected teacher signal is obtained at step S4. That is, if the teacher signal to the j-th unit in the j layer for the input signal is expressed by "$d_{pj}$" and then at step S4, the following equation is calculated.

$$y_{pj} - d_{pj} = \delta_{pj}$$

In the following step, S5, the following equation is calculated by using "$\delta_{pj}$" obtained at step S4, and "$y_{ph}$", "$y_{pi}$" and "$y_{pj}$" obtained at step S3 in accordance with equation (11).

$$\frac{\partial E_p}{\partial W_{ji}} = \delta_{pj} y_{pj} (1 - y_{pj}) y_{pi}$$

Then the following equation is calculated in accordance with equation (14).

$$\frac{\partial E_p}{\partial W_{ih}} = \left( \sum_j \delta_{pj} y_{pj} (1 - y_{pj}) W_{ji} \right) y_{pi} (1 - y_{pi}) y_{ph}$$

That is, the extent to which the error vector "$E_P$" defined by equation (7) varies with weight is detected.

In step S2, it is confirmed for the input signal of all the prepared learning patterns that the processes from step S3 to step S5 are completed. Then the process proceeds to step S6, and processes of steps S7 to S9 are carried out to update the weight value beginning with the initial value.

At step S7, the following equation is calculated using the value obtained at step S5. In accordance with equation (15), $$\frac{\partial E}{\partial W_{ji}} = \sum_p \frac{\partial E_p}{\partial W_{ji}}$$

Also, the following equation (16) is calculated.

$$\frac{\partial E}{\partial W_{ih}} = \sum_p \frac{\partial E_p}{\partial W_{ih}}$$

That is, the extent to which "E" of the sum of the error vector $E_P$ for all the input signals varies in accordance with the variation of the weight is obtained. Sequentially in step S8, the weight updating quantities $\Delta W_{ji}(t)$ and $\Delta W_{ih}$, which decrease "E" of the sum of the error vectors, are obtained in accordance with the following equation.

$$\Delta W_{ji}(t) = -\epsilon \frac{\partial E(t)}{\partial W_{ji}(t)} + \alpha \Delta W_{ji}(t-1) - \beta \Delta W_{ji}(t-2)$$

$$\Delta W_{ih}(t) = -\epsilon \frac{\partial E(t)}{\partial W_{ih}(t)} + \alpha \Delta W_{ih}(t-1) - \beta \Delta W_{ih}(t-2)$$

Where $\beta$ is a data control parameter as $\epsilon$ or $\alpha$ and t designates the number of updating operations as in the above case.

As is clear from the equation, the weight updating amount adopted by the present invention is determined by adding the following term thereto. This is different from the prior art technology regarding equations (19) and (20).

$$\text{"} -\beta \Delta W(t-2) \text{"}$$

This means that, when the current updating quantity is obtained, the updating quantity of the updating cycle prior to the previous cycle can be used instead of determining the current updating quantity based on the quantity amount at the previous updating cycle. The reason for this arrangement is that the weight can be converged within an even shorter period by forming a back propagation method by using a compulsory oscillation system, as recited above.

At step S8, when weight updating amounts $\Delta W_{ji}(t)$ and $\Delta W_{ih}(t)$ are obtained and in the following step S9 the new weight value is obtained in accordance with the following equation.

$$W_{ji}(t) = W_{ji}(t-1) + \Delta W_{ji}(t)$$

$$W_{ih}(t) = W_{ih}(t-1) + \Delta W_{ih}(t)$$

The weight value thus obtained is determined as the weight of the interconnection in layered network 10. In the following step S10, it is judged based on the newly determined weight whether or not the sum "E" of the error vectors is within an allowable range. If it is judged that it is within an allowable range, the weight learning process is completed and if it is judged that it is not, the process returns to step S2 and the weight updating process continues.

As recited above, the present invention is characterized in that, when the weight is learned in the back propagation system to decrease the sum "E" of the error vector, the updating quantity prior to the previous updating cycle is used in addition to the updating quantity of the previous updating cycle, thereby determining the weight updating value.

Figure 1:
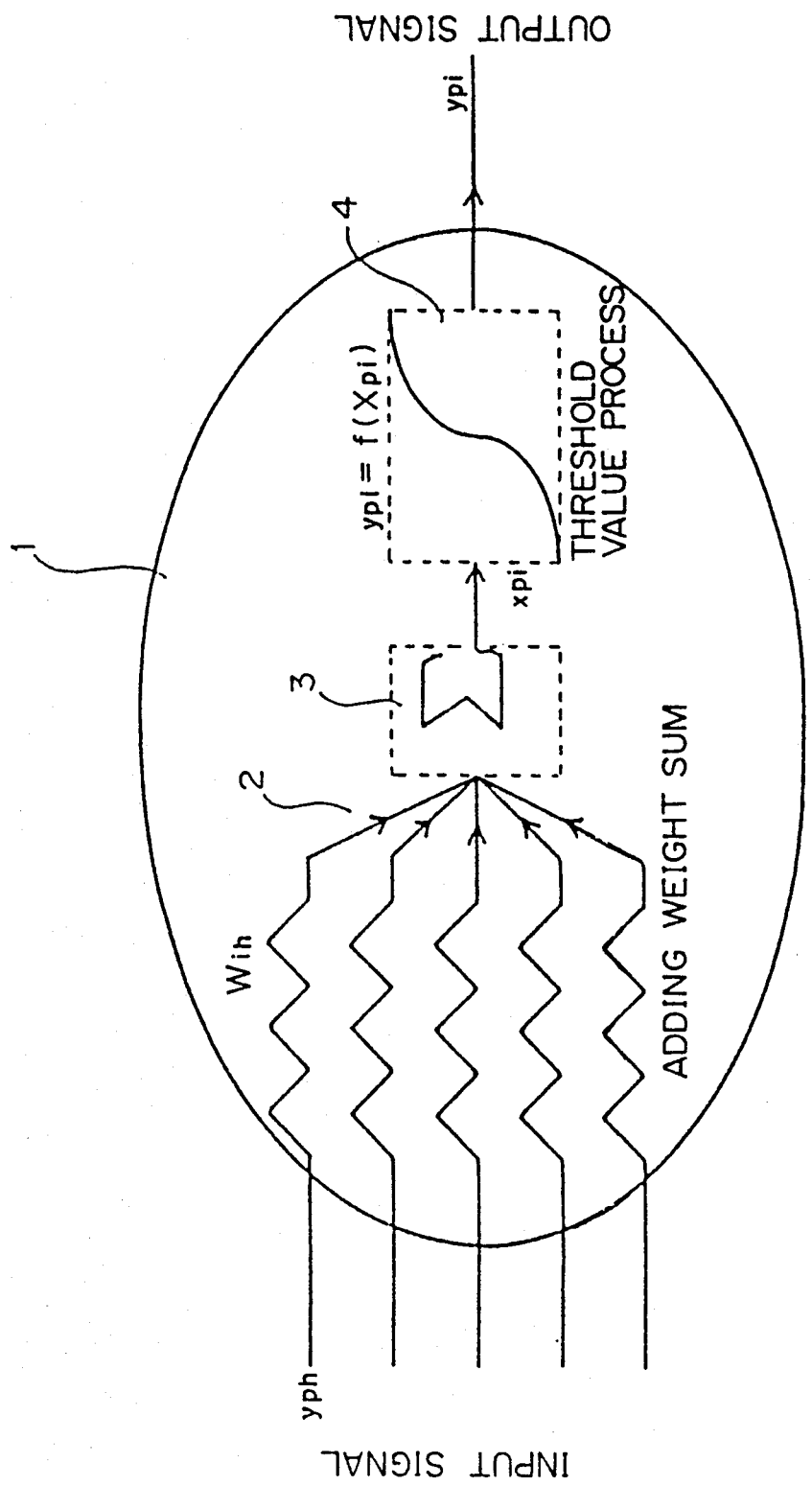
FIG. 1 shows a view of a principle structure of a basic unit in a layered network according to the present invention.
Figure 2:
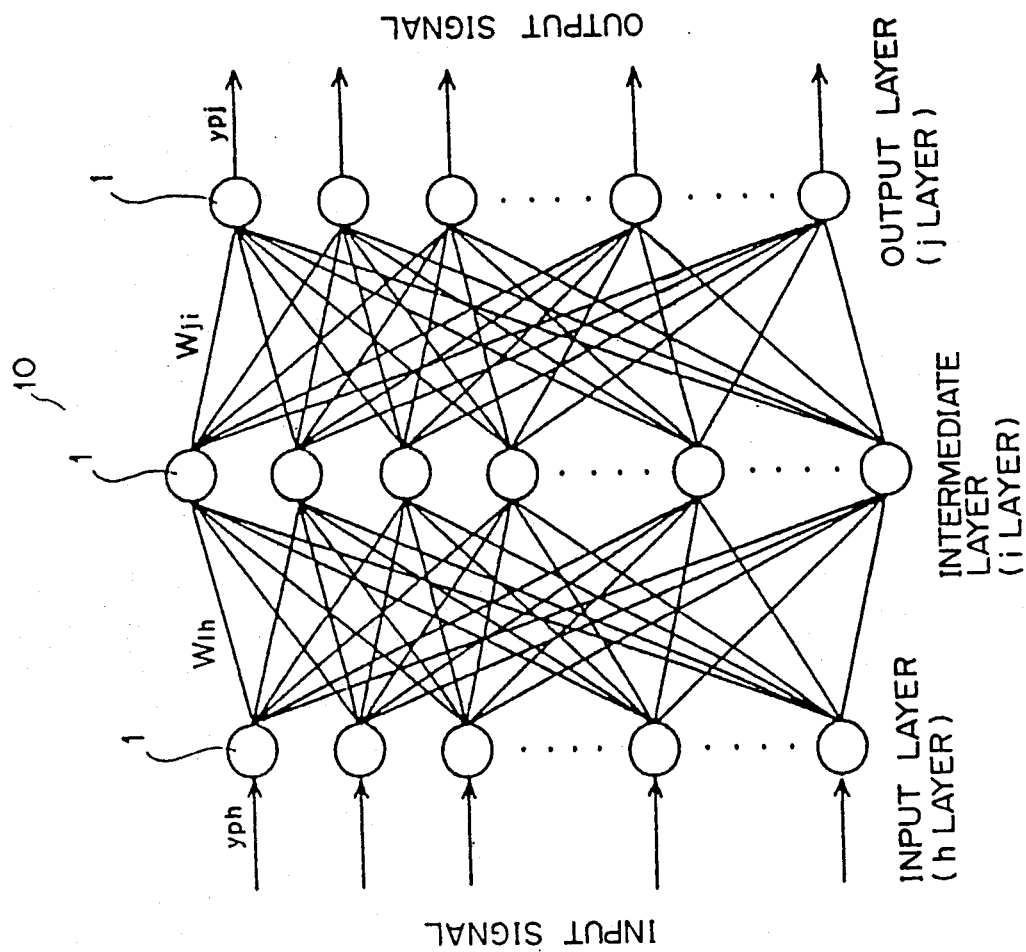
FIG. 2 shows a view of a principle structure of a layered type network.
Figure 3:
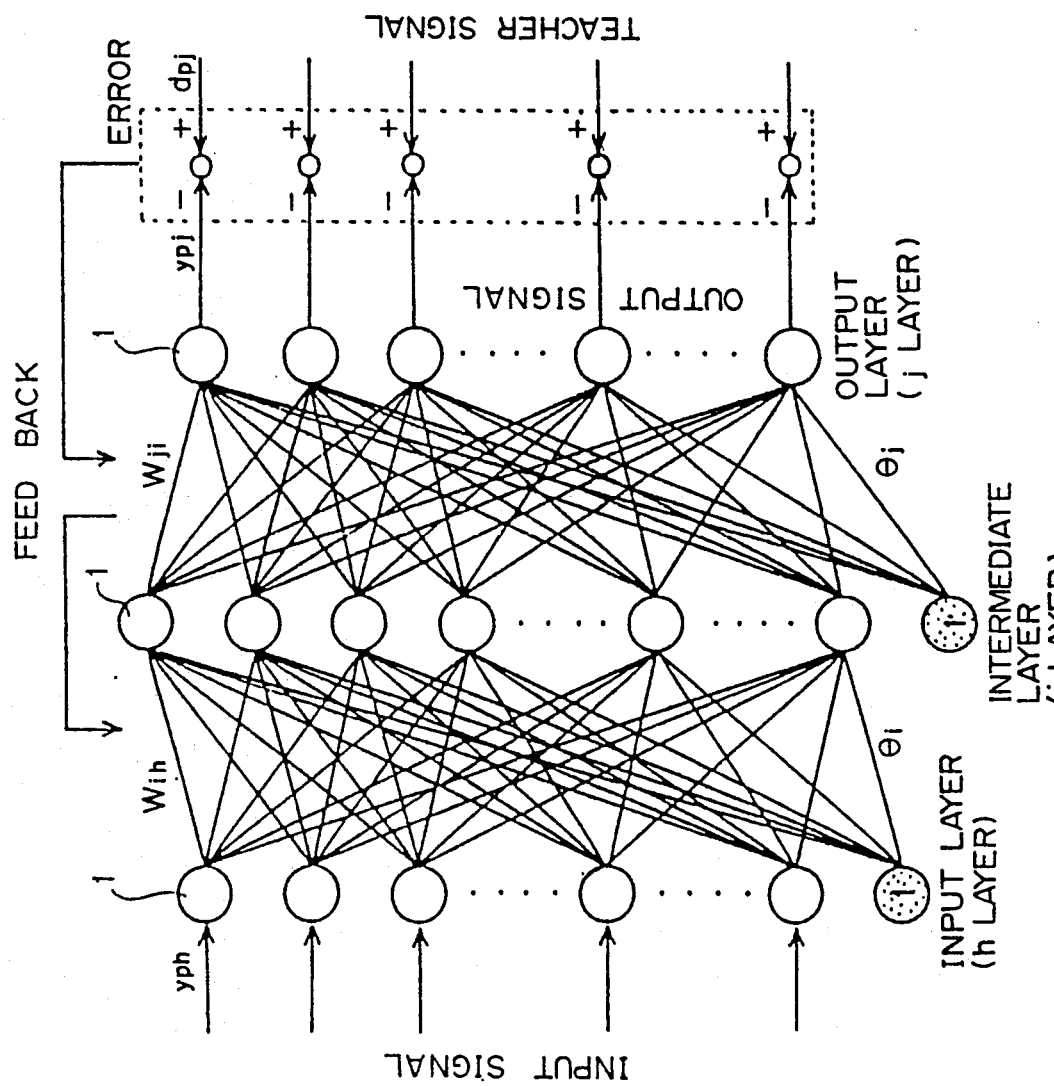
FIG. 3 is an explanatory view of a back propagation method.
Figure 4:
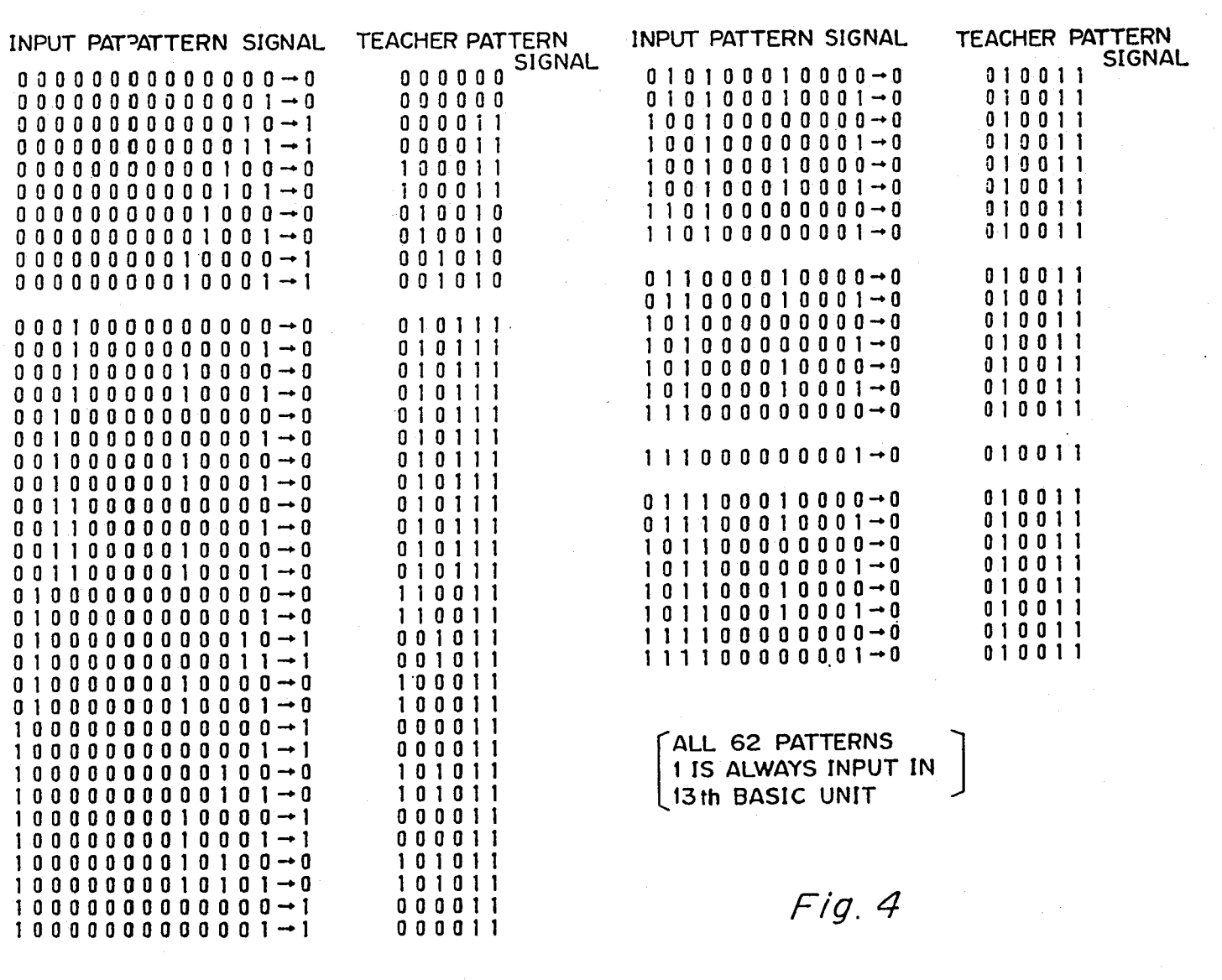
Figure 5:
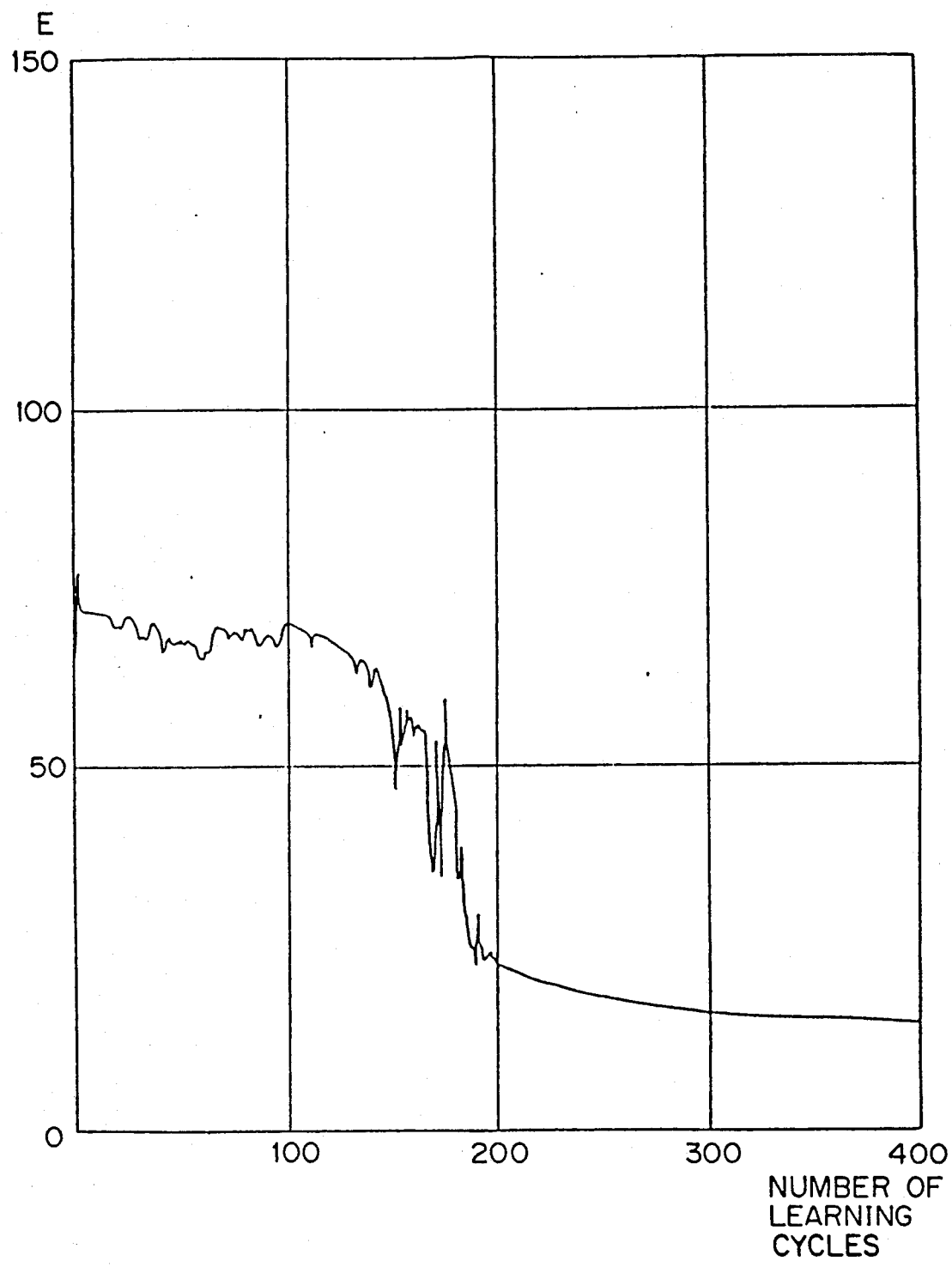
FIG. 5 is an explanatory view of the number of learning cycles in the prior art.
Figure 8:
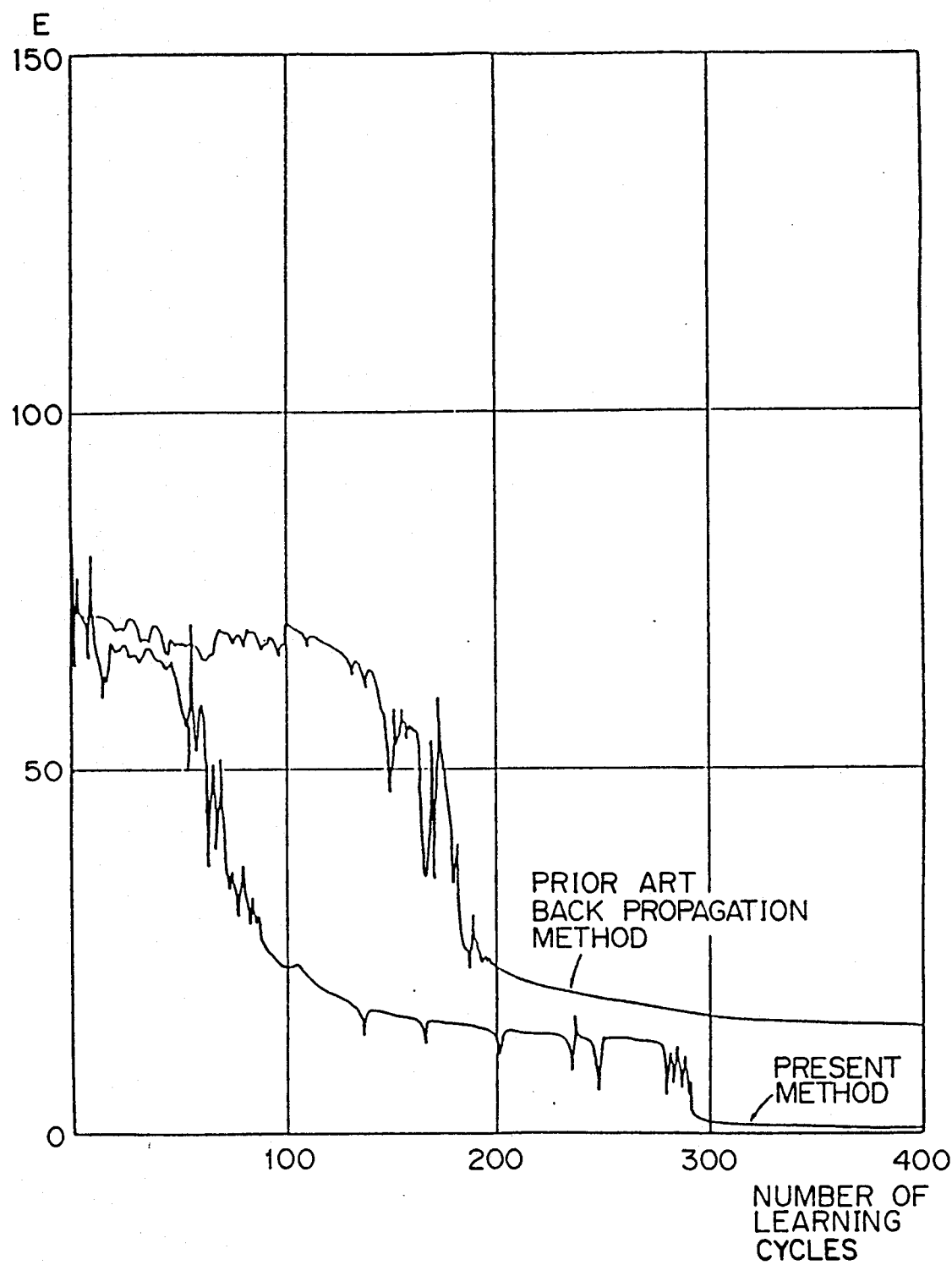
FIG. 8 is an explanatory view of the number of learning cycles according to the present invention.

In FIG. 8, the number of learning processes according to the present invention when the learning pattern shown in FIG. 4 is used is shown as compared with the number of learning processes of the prior art shown in FIG. 5. $\beta$ is determined as being 0.6 and the other condition is as shown in FIG. 5. As is clear from FIG. 8, in the present invention the desired weight can be obtained by using a much smaller number of learning processes than in the prior art. The sum of the error vectors can be made closer to "0" than in the prior art, thereby realizing a more accurate data process.

Figure 9:
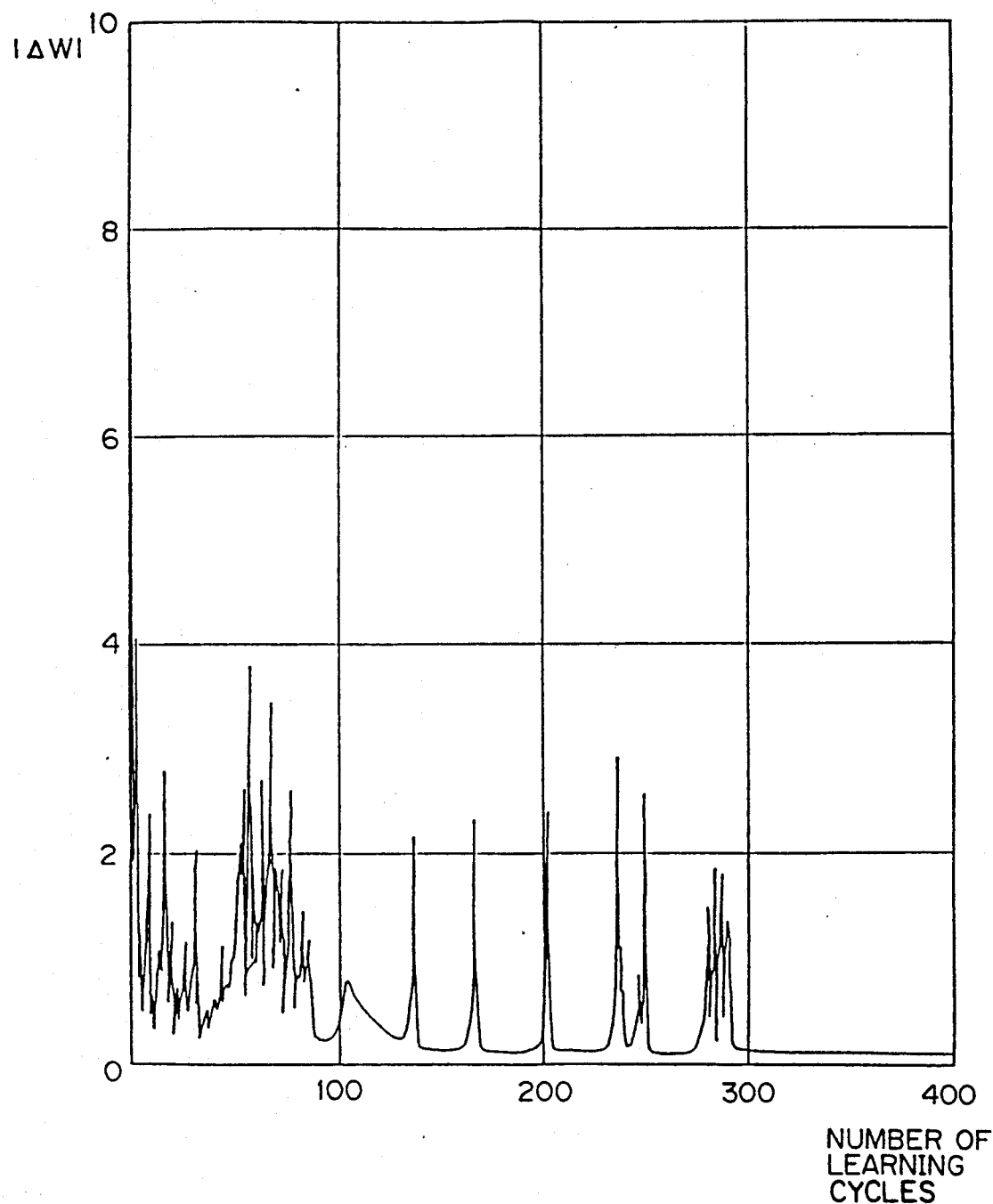
FIG. 9 is an explanatory view of the weight updating quantity according to the present invention.
Figure 10:
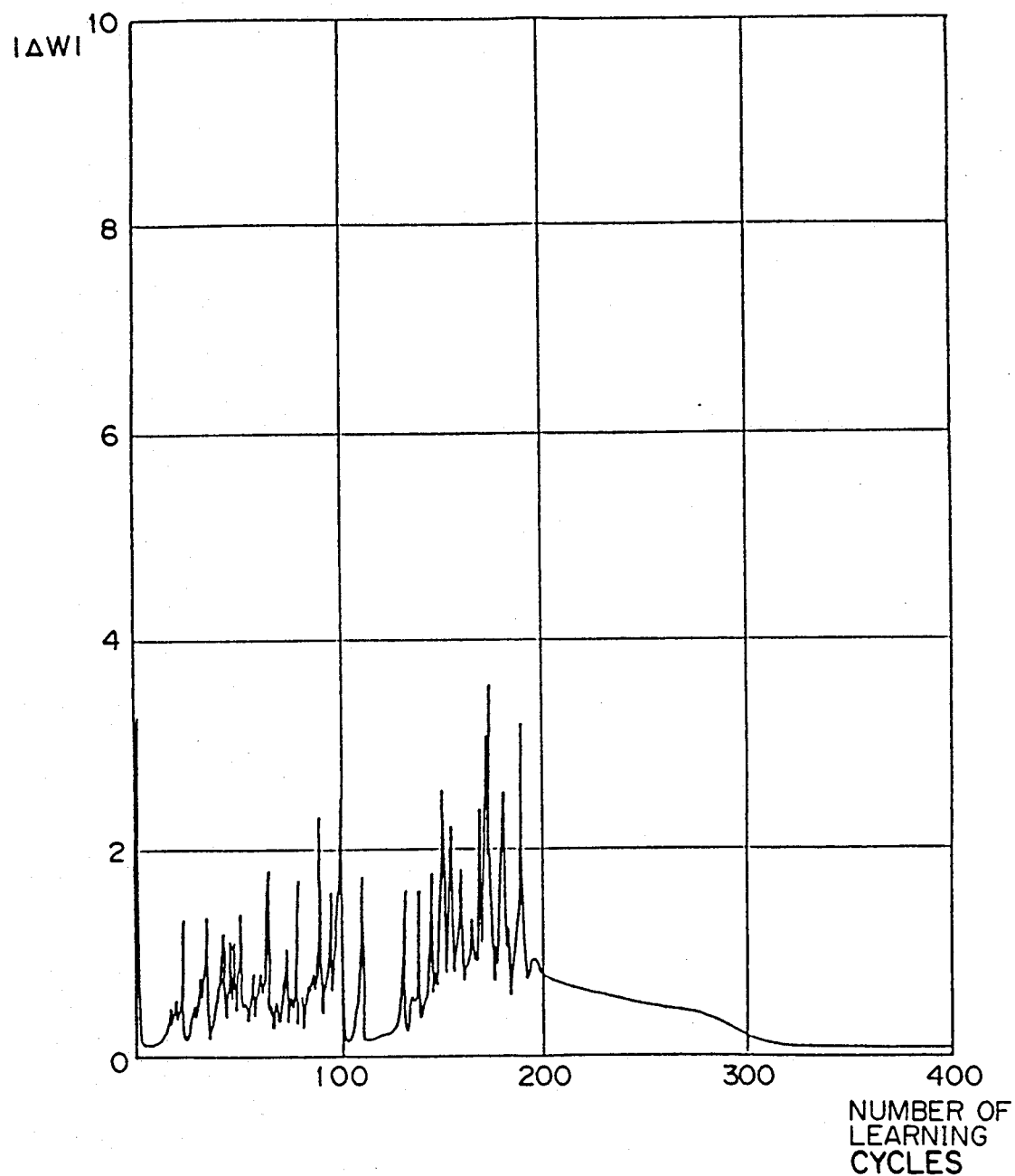
FIG. 10 is an explanatory view of the weight updating quantity in the prior art.

Selected from among weight updating amounts in the learning process shown in FIG. 8, that of the present invention is shown in FIG. 9 and that of the prior art is shown in FIG. 10. From these three Figures, it is shown that the value remains at "0" for a short period after the weight updating quantity changes. If the weight updating quantity becomes "0", this represents a convergence state. From these drawings, it is also clear that the weight can be converged more quickly in the present invention than in the prior art.

According to various simulations executed by the applicant, it is confirmed that the weight converges more rapidly than where the variable $\beta$ is determined to be negative. However, even where the variable $\beta$ is determined to be negative, convergence is more rapid than in the prior art.

The arrangement of an embodiment of a weight learning means is next explained.

Figure 11:
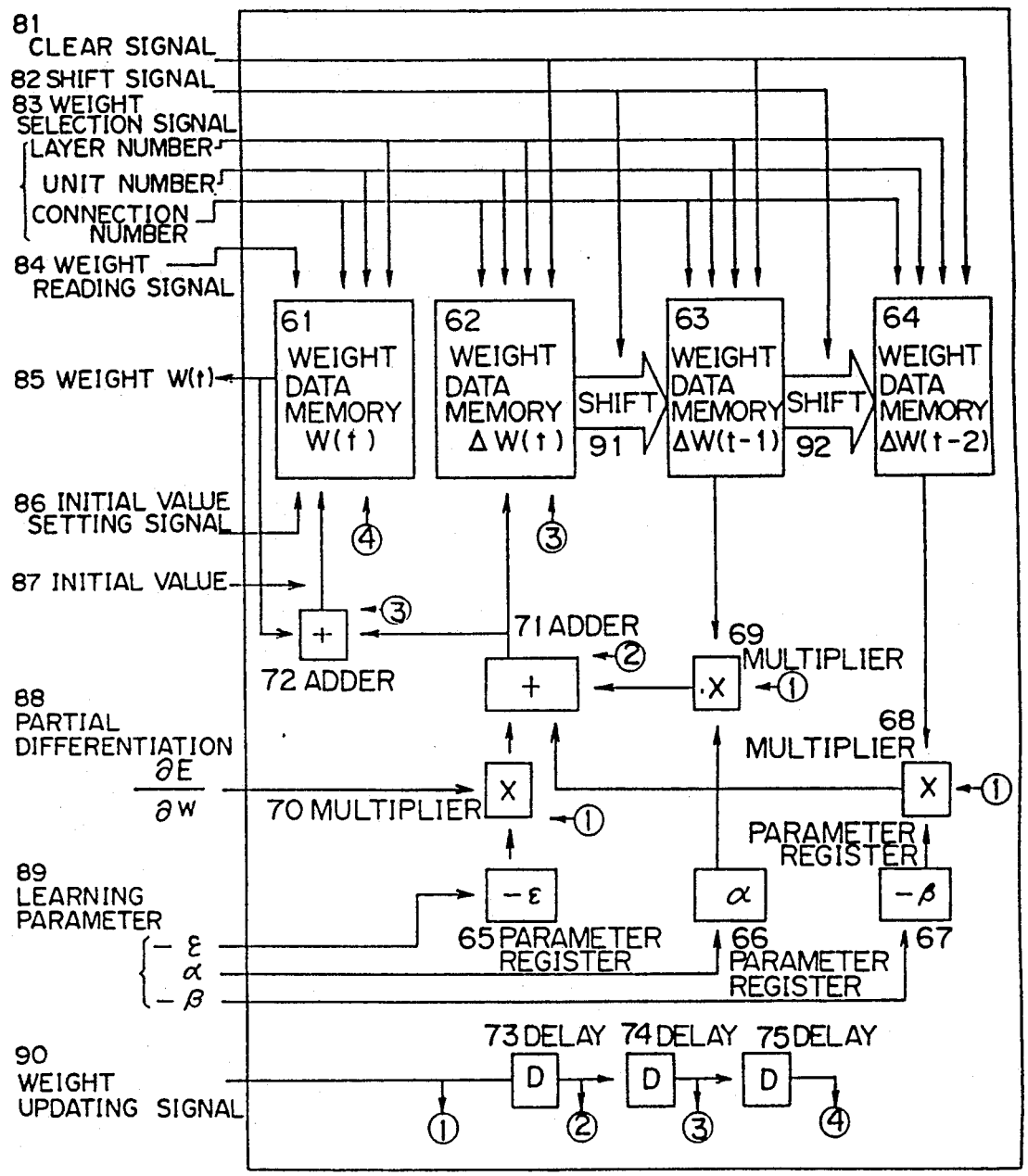
FIG. 11 is a block diagram of the weight learning means shown in FIG. 6.

FIG. 11 shows a structural view of an embodiment of the weight learning means 50 according to the present invention. According to equation (20) of the learning algorithm of the present invention, weight updating quantity $\Delta W$ is expressed as the sum of the prior art weight updating quantity obtained by adding a value obtained by multiplying the previous weight updating quantity ΔW (t−1) by a learning parameter β to the value obtained by partially differentiating the error E with regard to a weight, i.e. by multiplying the partial differentiation of an error with regard to the weight by a learning constant −ε, and the weight updating quantity obtained by multiplying two-previous weight updating quantity ΔW(t−2) obtained prior to the previous weight updating quantity by a learning parameter β. This learning algorithm is carried out by the weight learning means shown in FIG. 11. In FIG. 11, 61 is a weight data memory for storing the weight data, 62 is a weight data memory for storing the current weight updating quantity ΔW, 63 is a weight data memory for storing the previous weight updating quantity data ΔW(t−1), and 64 is a weight data memory for storing the two-previous weight updating quantity ΔW(t−2) which is obtained prior to the previous weight updating quantity. 65 is a parameter register for storing a learning constant −ε, 66 is a parameter register for storing a learning parameter α for representing a learning speed coefficient, and 67 is a parameter register for storing the learning parameter data. 68 is a multiplier for multiplying the two-previous weight updating quantity ΔW(t−2) obtained prior to the previous weight updating quantity by −β, 69 is a multiplier for multiplying an updating quantity ΔW(t−1) of the previous weight data by learning parameter ε, and 70 is a multiplier for multiplying the current weight updating quantity ΔW by a learning parameter ε. 70 is a multiplier for multiplying the current weight updating quantity ΔW by learning parameter ε. Adder 71 adds the results of these multipliers to each other. As the output of adder 71 is the weight updating quantity ΔW, it corresponds to the difference of weights W(t) and W(t−1). The current weight value is stored in weight data memory 61, the content thereof is read out and the value W(t−1) is added to the output ΔW(t) of adder 71, thereby providing a new weight value W(t). The addition is carried out by adder 72. Clear signal 81 clears weight data memories 62, 63 and 64. The shift signal shifts the weight data from weight data memory 62 to weight data memory 63 so that the updating quantity W of the updated weight data is made equal to the previous updating quantity at the weight data updating quantity. The shift signal further shifts the previous weight data updating quantity ΔW(t−1) from weight data memory 63 to weight data memory 64 so that the previous weight data updating quantity ΔW(t−1) is made to be the two-previous updating quantity ΔW(t−2) obtained prior to the previous updating quantity. Weight selection signal 83 for making an access to respective weight data memories 61, 62, 63 and 64 are address signals formed from information such as the layer number of the layered network, the unit number of the layer and the connection number of the connection branch to be input to the unit. The weight read out signal is provided to weight data memory 61 to read the predetermined weight data. The current weight W(t) 85 is a signal of weight W(t) read out from weight data memory 61. It is necessary to write an initial value in data memory 61 as a predetermined weight according to the learning algorithm and the control signal of the initial value setting signal is expressed by 86, namely, a signal for writing an initial value. 87 is the data of the initial value of the weight data at that time and is the write data. Weight updating signal 90 designated at the under part of FIG. 11 is a timing signal and signals which are different in timing are produced at ①, ②, ③ and ④ because of delay designated by symbol D. Those signals are provided at multipliers 70, 69 and 68 and a signal pulse ① and multiplication is performed. Then, after completion of a multiplication, at a time of pulse ② produced after a delay of delay circuit 73 an execution of adder 71 is performed. Further, after a delay caused by delay circuit 24, a pulse produces at time ③ and an addition operation is performed by adder 72 and a weight updating quantity is written in weight data memory 62. After the delay time of delay circuit 75, a pulse signal of ④ is produced. At time of pulse signal ④, the addition result of weight updating quantity ΔW(t) and weight data W(t−1) is written in weight data memory 61 as the following weight data w(t).

The signal of the weight learning means 50 and the operation of the arrangement element shown in FIG. 11 are summarized.

In an interface unit with an external circuit, a clear signal 81 performs a 0 clear of weight data memories 62, 63 and 64.

Shift signal 82 copies all the contents of weight data memory 62 to weight data memory 63, and also copies all the contents of weight data memory 63 to weight data memory 64.

Weight selection signal 83 determines one weight by using a layer number, a unit number and a connection number.

Weight read signal 84 reads a predetermined weight data in weight data memory 61.

Weight 85 is a weight data which is read out from weight data memory 61.

Initial value setting signal 86 is for writing an initial value into a predetermined weight in weight data memory 61.

Initial value 87 is a data signal for writing an initial value into a predetermined weight in weight data memory 61. Partial differentiation 88 is ∂E/∂W data which is used for a weight updating operation calculated by the network.

Learning parameters 89 are −ε, α and −β and they are stored in registers 65, 66 and 67, respectively.

Weight updating signal 90 designates timings ①, ② and ③ for calculating a predetermined new weight within weight data memories 61 and 62 and designates timings ③ and ④ for writing the weight into weight data memories 61 and 62.

In the internal module unit, weight data memory W(t) 61 is accessed by using weight selection signal 83 as an address and outputs a predetermined weight value as weight 85 in accordance with weight read signal 84. Weight data memory W(t) 61 is addressed by weight selection signal 83 and stores an initial value 87 as a predetermined weight in accordance with initial value setting signal 86. Further, weight data memory W(t) is addressed by weight selection signal 83 and stores the output of adder 72 as the predetermined weight in accordance with weight updating signal ④ from delay 75.

All the content of a weight data memory W(t) 62 is cleared by clear signal 81 and addressed by weight selection signal 83. It then stores the output of adder 71 as a predetermined weight in accordance with the weight updating signal ③ from delay 74.

Weight data memory ΔW(t−1) 63 clears all the content thereof by clear signal 81.

Weight data memory ΔW(t−1) 63 is accessed by weight selection signal 83 and outputs the predetermined weight updating value to multiplier 69.

Weight data memory ΔW(t−2) 64 clears its contents by clear signal 81 and is addressed by weight selection signal 83. It then outputs the predetermined weight value to multiplier 68.

Adder 72 adds the outputs from weight data memory 61 and adder 71 and outputs the sum at the time of weight updating signal ③ from delay 74.

Adder 71 adds the outputs of multipliers 68, 69 and 70 and outputs the sum at the time of weight updating signal ② from delay 73.

Multiplier 68 multiplies weight updating quantity ΔW(t−2) output from weight memory 64 with −β maintained in parameter register 67 at a time of input ① of weight updating signal 90 and outputs the sum.

Multiplier 69 multiplies weight updating quantity ΔW(t−1) output from weight data memory 63 and α maintained in parameter register 66 at a time of input ① of weight updating signal 90 and outputs the sum. Multiplier 70 multiplies partial differentiation 88 by −ε maintained in parameter register 65 at a timie of input ① of weight updating signal 90 and outputs the sum°

Parameter register 65 stores −ε selected from an input of learning parameter 89.

Parameter register 66 stores α selected from the input of learning parameter 89.

Parameter register 67 stores −β selected from an input of learning parameter 89.

Delay 73 inputs weight updating signal 90 and forms a signal delayed by one timing.

Delay circuit 74 inputs output ② from delay circuit 73 and forms a signal delayed by one timing.

Delay circuit 75 inputs output ③ from delay circuit 74 and forms a signal delayed by one timing.

Shift means 91 copies all the contents of weight data memory 62 to weight data memory 63 in accordance with shift signal 82.

Shift means 92 copies the content of weight data memory 63 to weight data memory 64 in accordance with shift signal 82.

The operation of the weight updating means 54 is explained hereinafter. Weight updating means 54 calls an initial setting and weight and updates the weight. At initial setting, clear signal 1 turns on, causing the contents of weight memories 62, 63 and 64 to be 0. After setting weight selection signal 83 and initial value 87, initial value setting signal 86 turns on and the weight content designated by weight selection signal 83 in weight data memory 61 is determined as a value provided by initial value 87. By performing the above operation for all the layers, units and connections, the contents of weight data memory 61 are initialized. Further, −ε, α and −β are stored in parameter register 20, 21 and 22 by providing learning parameter 89 with −ε, α and −β.

The weight is updated as follows.

After setting weight selection signal 83 and partial differentiation 88, weight updating signal 90 turns on and the following operation starts (①, ②, ③ and ④ represent timings).

① Amplifier 68 obtains a product −βΔW(t−2) of a designated weight in weight data memory 64 and a value in parameter register 67.

① Amplifier 69 obtains a product αΔW(t−1) of a designated weight in weight data memory 63 and the value in parameter register 66.

① Multiplier 70 obtains a product −ε∂E/∂W of a partial differentiation 88 and a value of parameter register 65.

② Adder 70 obtains the sum of the outputs of multipliers 68, 69 and 70. This is a new ΔW(t).

② Weight read signal 84 is provided externally in accordance with the timing.

③ Adder 72 obtains the the sum W(t−1)+ΔW(t) of the weight designated in weight data memory 61 and of adder 71, namely, W(t).

③ Output ΔW(t) from adder 71 is written in a designated portion in weight data memory 62.

④ The output, namely, new weight W(t) of adder 72 is written in a portion designated in weight data memory 61.

The above operation is performed for all the layers, units and connections and the contents of weight data memories 61 and 62 are updated. By turning on shift signal 82, shift means 91 and 92 copy the contents of weight data memories 62 and 63 to weight data memories 63 and 64.

Figure 12:
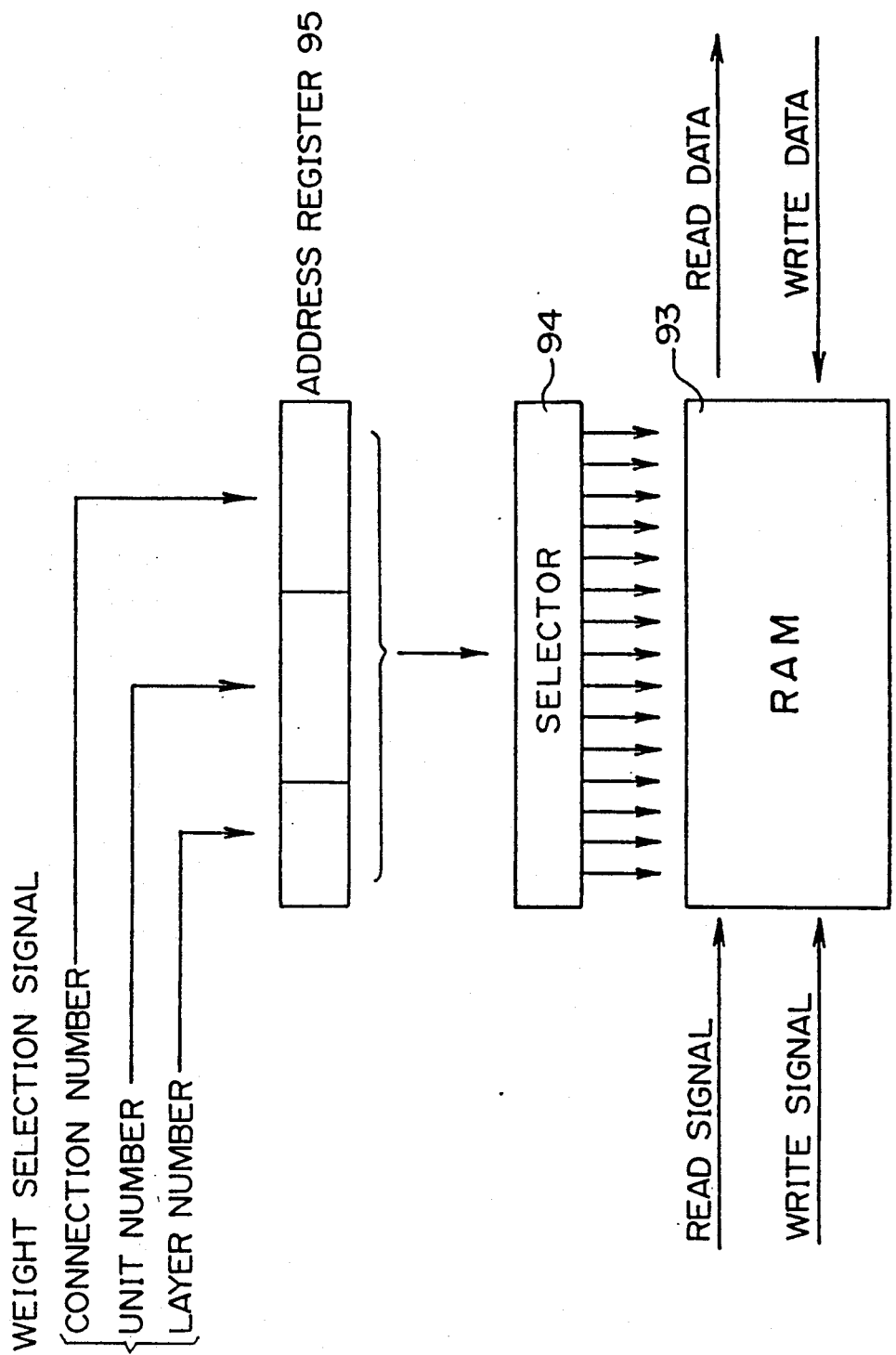
FIG. 12 is a block diagram of the weight data memory shown in FIG. 11.

FIG. 12 is a view of an arrangement of an embodiment of weight data memories 61, 62, 63 and 64. Weight data memory comprises a random access memory (RAM) 93. When the write signal is activated, the write data is stored in the designated address, and when the read signal is activated, the weight data stored in RAM 93 is output from the designated address as the read data. The address signal is provided through selector 94, i.e., the decoder in RAM 93. Address register 95 is provided in the input portion of selector 94. As shown in the drawing, the number of layers in the layered network, the unit number of the layer and the connection number of the connection branch connected to the unit are set in address register 95. Weight data designated by the layer number, unit number, and connection number is written in RAM 93 and read out therefrom. The content of weight data is weight data W(t) in case of memory 61, weight updating quantity ΔW(t) in case of memory 62, the previous weight updating quantity ΔW(t−1) in case if memory 63 and the two-previous weight updating quantity ΔW(t−2) obtained prior to the previous updating quantity in memory 64. The weight value, the updating quantity, the previous weight updating quantity and the two-previous updating quantity are stored in the same address with regard to the same connection branch. As shown in the drawing, all the weight selection signals such as layer number, unit number and connection number, have the common address information. As is shown in FIG. 11, respective signals are connected to the common address line. The weight learning means receives a clear signal, a shift signal, a weight selection signal, a weight read signal, an initial value setting signal, an initial value, a learning parameter, a weight updating signal and a partial differentiation ∂E/∂W with regard to the error weight externally and the output of weight learning means is w(t) readed from weight data memory 61.

Figure 13:
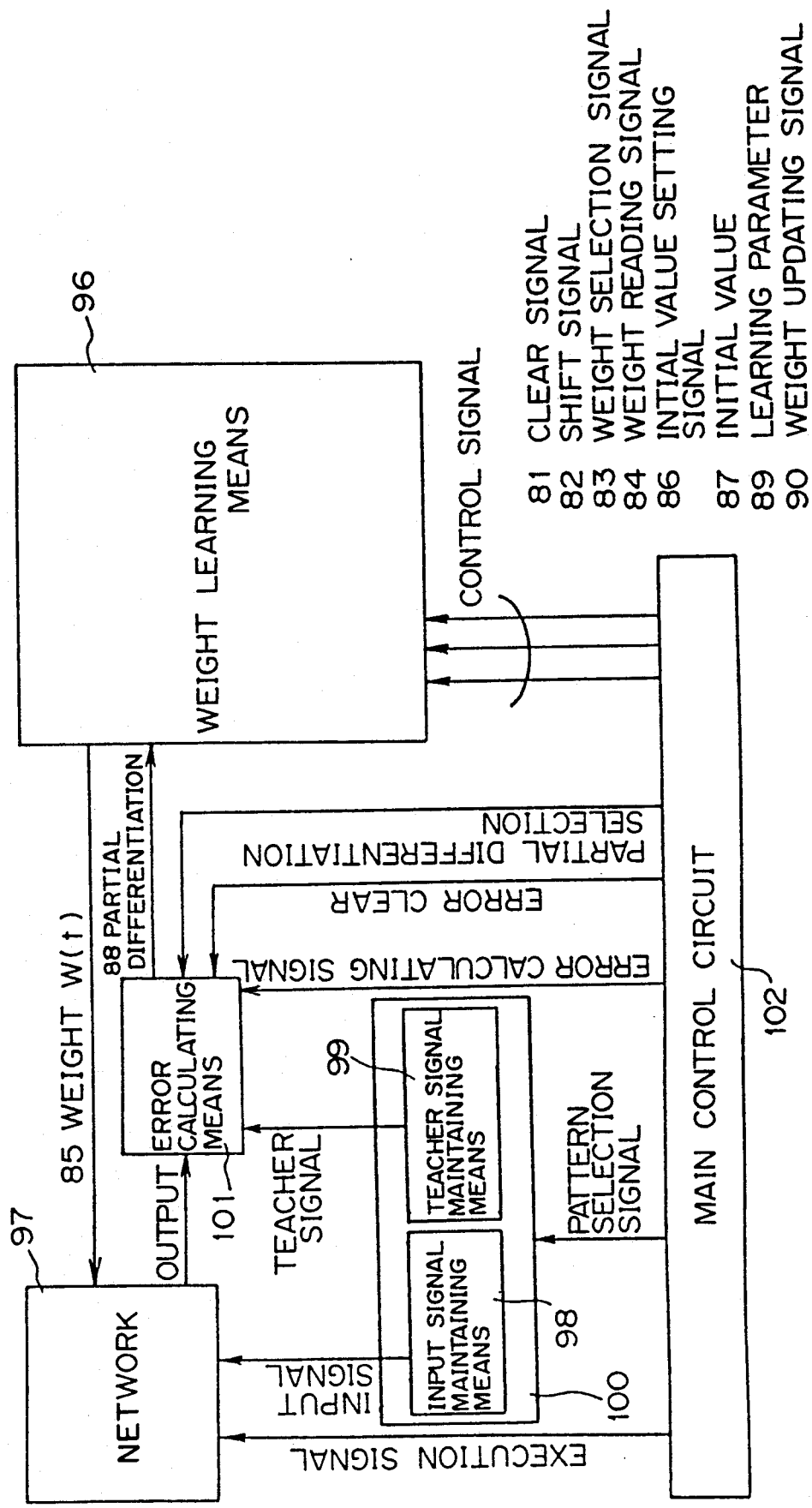
FIG. 13 shows a system structure of an embodiment according to the present invention.
Figure 14:
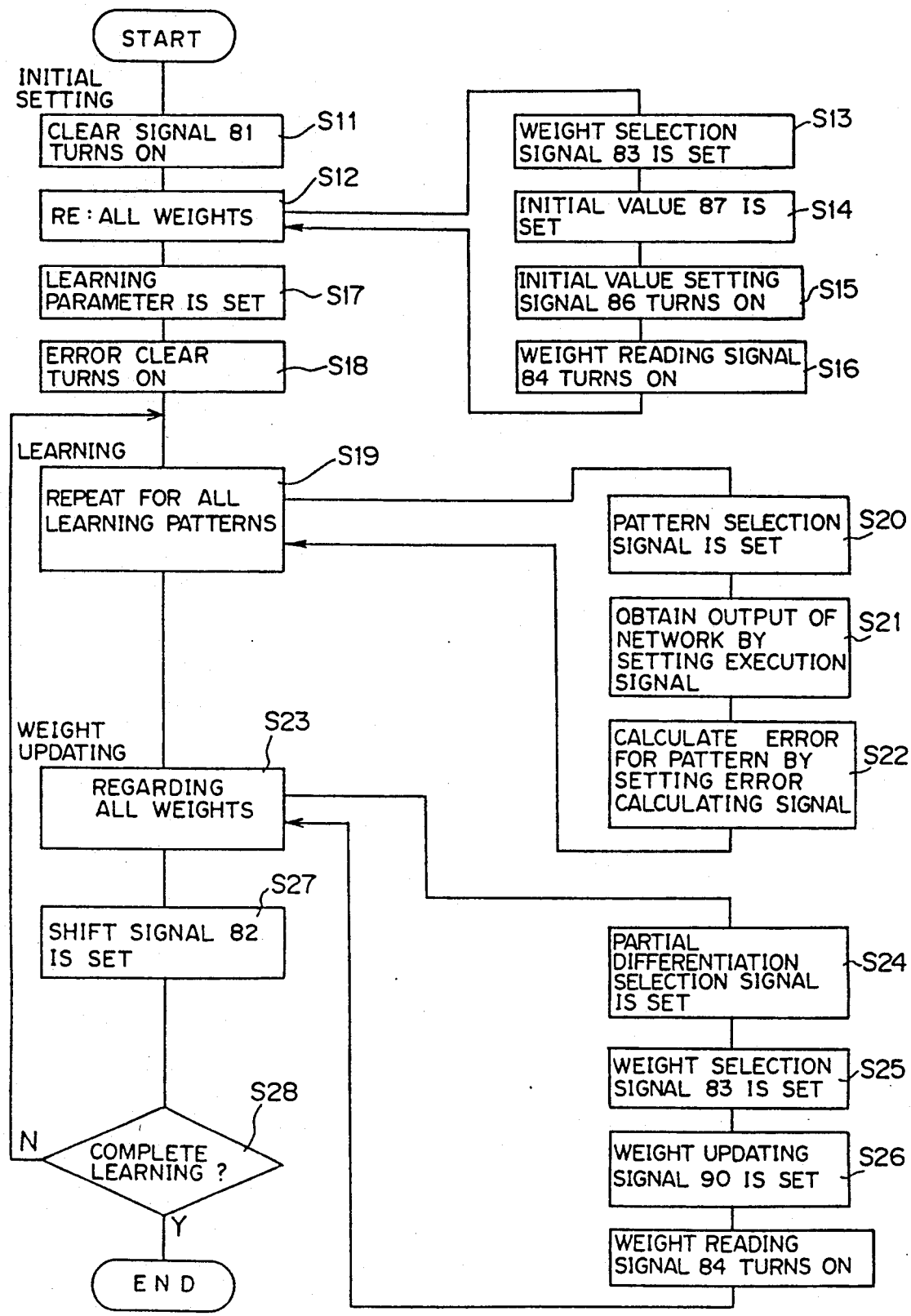
FIG. 14 shows a flowchart of the main control circuit shown in FIG. 13.

FIG. 13 is a block diagram of an embodiment of system structure of the present invention. In FIG. 13, 96 is a block diagram of the weight learning means (corresponding to 50 in FIGS. 6 and 11), 97 is a learning type network, 98 is an input signal maintaining unit for maintaining an input signal to be applied to an input layer of the network, and 99 is a teacher signal maintaining unit for providing a teacher signal to an error calculating means 101. A learning pattern maintaining means 100 comprises input signal maintaining means 98 and teacher signal maintaining means 99. The output of the network is provided to an error calculating means 101 and the error between the output of the network and the teacher signal from teacher signal maintaining means 99 is calculated and the partial differentiation ∂E/∂W with regard to the weight of the error is outputted and is provided to weight learning means 96. The whole system is controlled by main control circuit 102. A main control circuit outputs a control signal to weight learning means 96, and an error calculating signal, an error clear signal, and a partial differentiation selection signal to be provided to error calculating means 101, an executing signal to be then applied to network 97 and a pattern selection signal to be applied to input signal maintaining unit 98. A main control circuit 102 in this system operates as follows. FIG. 14 is a flowchart for explaining the operation of main control circuit 102. The whole flow represents an initial setting and a learning process of weight updating. At an initial setting, clear signal 81 turns on (S1) and the contents of weight data memories 61, 62, 63 and 64 are cleared (S12). After a weight selection signal 83 and an initial value 87 are set, initial value setting signal 86 turns on and the initial value 87 is set in the address of weight data memory 61. This address is designated by the weight selection signal. This operation is conducted for all the connections of the layer units. If weight read signal 84 turns on at this time, it is possible to read out the weight designated weight data (S13–S16).

At S17, the main control circuit provides a learning parameter and turns on an error clear signal so that the current error of error calculating unit 100 is made 0. Then the learning process begins.

First, in order to provide an input signal to network 97, main control circuit 102 sets a pattern selection signal and obtains an output of network 97 (S20 and S21) by setting an execution signal. In this case, weight learning means 96 provides the initial weight data to the network. Then network 97 applies the obtained output signal through the input layer, intermediate layer and the output layer to error calculating means 101. Main control circuit 102 outputs a teacher signal set through a pattern selection signal provided from teacher signal maintaining unit 99 and provides error calculating means 101 with a teacher signal. Error calculating means 101 calculates the error and calculates the partial differentiation (S22). This forms a value of ∂E/∂W, which is provided to weight learning means 96 through partial differentiation 88. The weight updating operation of weight learning means 96 is then carried out. Main control circuit 102 sets a weight selection signal and a partial differentiation selection signal so that the address signal for the weight memory and the partial differentiation value from the error calculating means are set in the weight learning means (S24 and S25).

Next, weight updating signal 90 is provided and, as shown in FIG. 11, a multiplication is executed. An addition is executed to update the weightt data and a write control of the weight is performed (S16). Then, weight read signal 84 turns on and newly-updated weight data W(t) is stored in weight data memory 61. This operation is performed with regard to the weights of all the connecting branches. After completing the weight updating for the whole network (S23), main control circuit 102 sets shift signal 82 (S27) and shifts the updating quantity of weight, that is, ΔW(t) and ΔW(t−1) so that the same content is written in the same address in the weight data memory ΔW(t−1) and weight data memory 64 of ΔW(t−2). For this purpose, shift signal 82 is set. When the copying operation of the weight data memory is completed as recited above, the process proceeds to S28 to check whether the learning is completed. If it is, the process is ended. If it is not, the process returns to the starting point of the learning process through the loop line shown in the flowchart and the same operation is repeated.

In the learning algorithm (FIG. 7) according to the present invention, a feed forward propagation of the signal is performed by the analog neuron processor network described below. A main part of the back propagation of the error of the signal is performed by software in a host computer for controlling an analog neuron processor network and the weight updating portion is performed by the hardware weight learning means shown in FIG. 11. In this case, the weight data memory 61 in FIG. 11 corresponds to the weight memory (150e, 185, 186 in FIG. 28) and the data reading is performed serially. The other weight data memories 62, 63 and 64 perform the same memory method as weight data memory 61 and is a memory of a serial read, write type for storing respective bits of the weight data in the continuous address. Needless to say, weight data memories 61, 62, 63 and 64 may be formed of a parallel read line type memory.

Both the back propagation of an error in a signal and a weight updating operation according to the learning algorithm (FIG. 7) of the present invention may be executed by software in a host computer for controlling the neuron processor network described below.

Analog neuron processor (ANP) and its layered network structure for executing the learning algorithm of the present invention is explained hereinafter.

Figure 6:
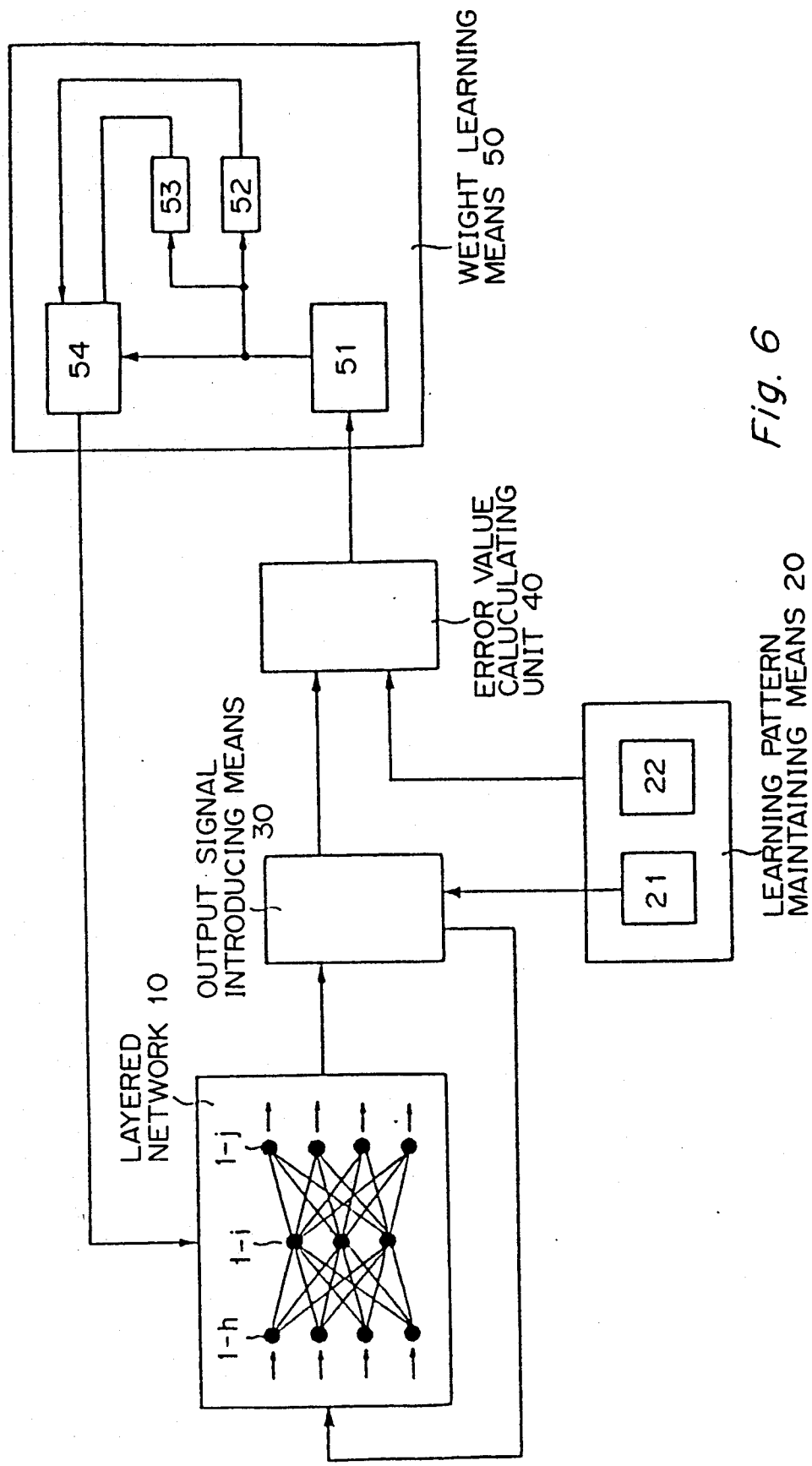
FIG. 6 shows a principle structure of the present invention.
Figures 15A, 15B:
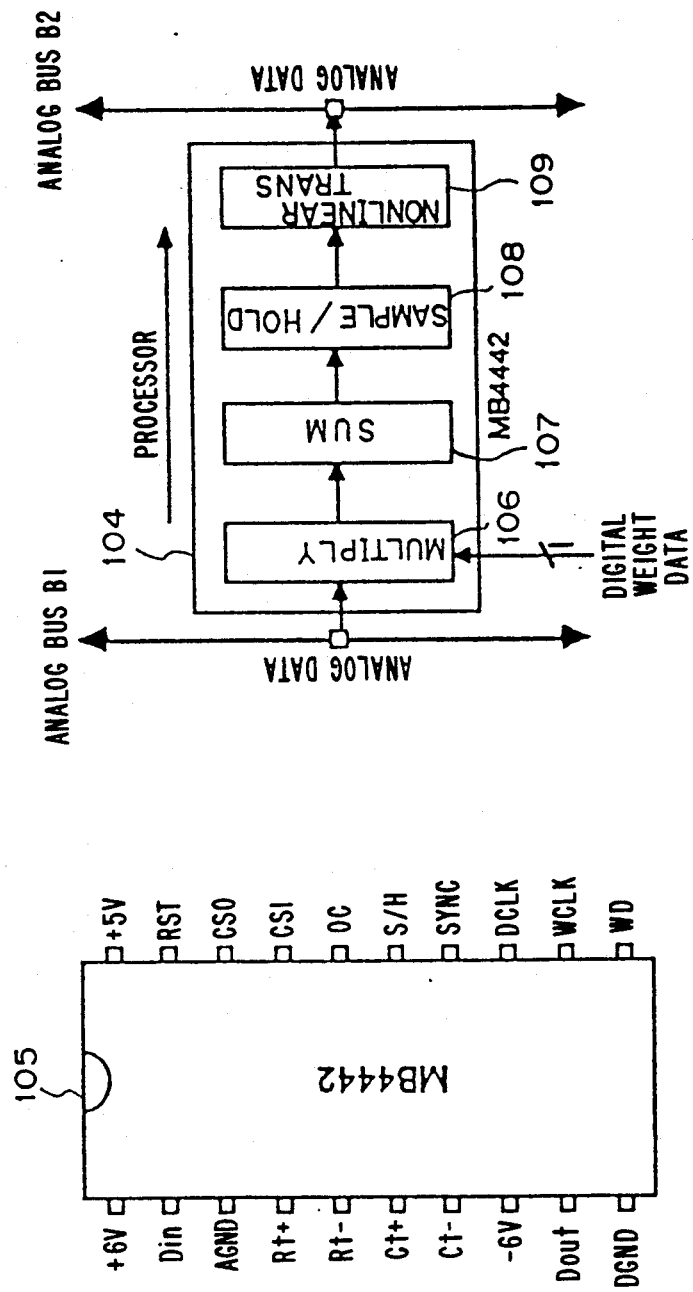
FIG. 15A is a schematic view of a package formed by a chip of an analog neuron processor (ANP) for use in the embodiment.
FIG. 15B is an internal structure view of the ANP shown in FIG. 15A.

FIG. 15A is a schematic view of a dual-inline package of a nueron chip when basic units 1-i, 1-h and 1-j shown in FIG. 6 are formed of an analog neuron processor (ANP) 105 formed by a neuron chip provided of the present invention. This package, called MB4442, carries out neuron model processes. The internal threshold value processing unit is obtained by performing a sigmoid function. The analog neuron chip is called comprises an ANP whch is a divice for inputting and outputting analog data. FIG. 15B is an internal structure of ANP of the present invention. As shown in FIG. 15B, ANP105 is connected between analog bus B1 and anolog bus B2. ANP105 comprises analog multiplying unit 106 for multiplying an input analog signal with a weight, analog adding unit 107 for obtaining a sum-of-products, sample/hold unit 108 for maintaining the sum and non-linear function unit 109 for outputting a value of a sigmoid function. Respective terminals of ANP 105 shown in FIG. 15A are as follows. The internal structure of ANP105 comprises an analog circuit unit and a digital circuit unit. Plus-6-volt and minus-6-volt terminals are connected to a power source terminals for supplying power to in an operational amplifier of an analog circuit unit. Terminals $D_{in}$ and $D_{out}$ are for respectively inputting and outputting analog signals. Terminal AGND is for the ground of the analog circuit unit. Terminals Rt+ and Rt− are for a resistor R provided externally to form an integral circuit in the analog circuit unit and terminals Ct+ and Ct− are for a capacitor C provided externally to form an integral circuit. Terminal DGND is for the ground of a digital circuit unit. The plus-5-volt terminal is for the power source of the digital circuit unit. The RST a reset terminal is for for resetting the charge of the capacitor in the integral circuit. Terminals CSI and CSO are for respectively inputting and outputting daisy chain control signals. Terminal OC is for receiving offset cancelling control signals. Terminal SH terminal is for receiving sample/hold control signals. Terminal SYNC is for receiving signals for synchronizing processes of respective layers. Terminal DCLK is for receiving basic clock signals for processing the analog input signal. Terminal WCLK is for a clock for obtaining digital weight data. Terminal WD is for receiving digital weight data for inputting data in bit serial form.

Figure 16:
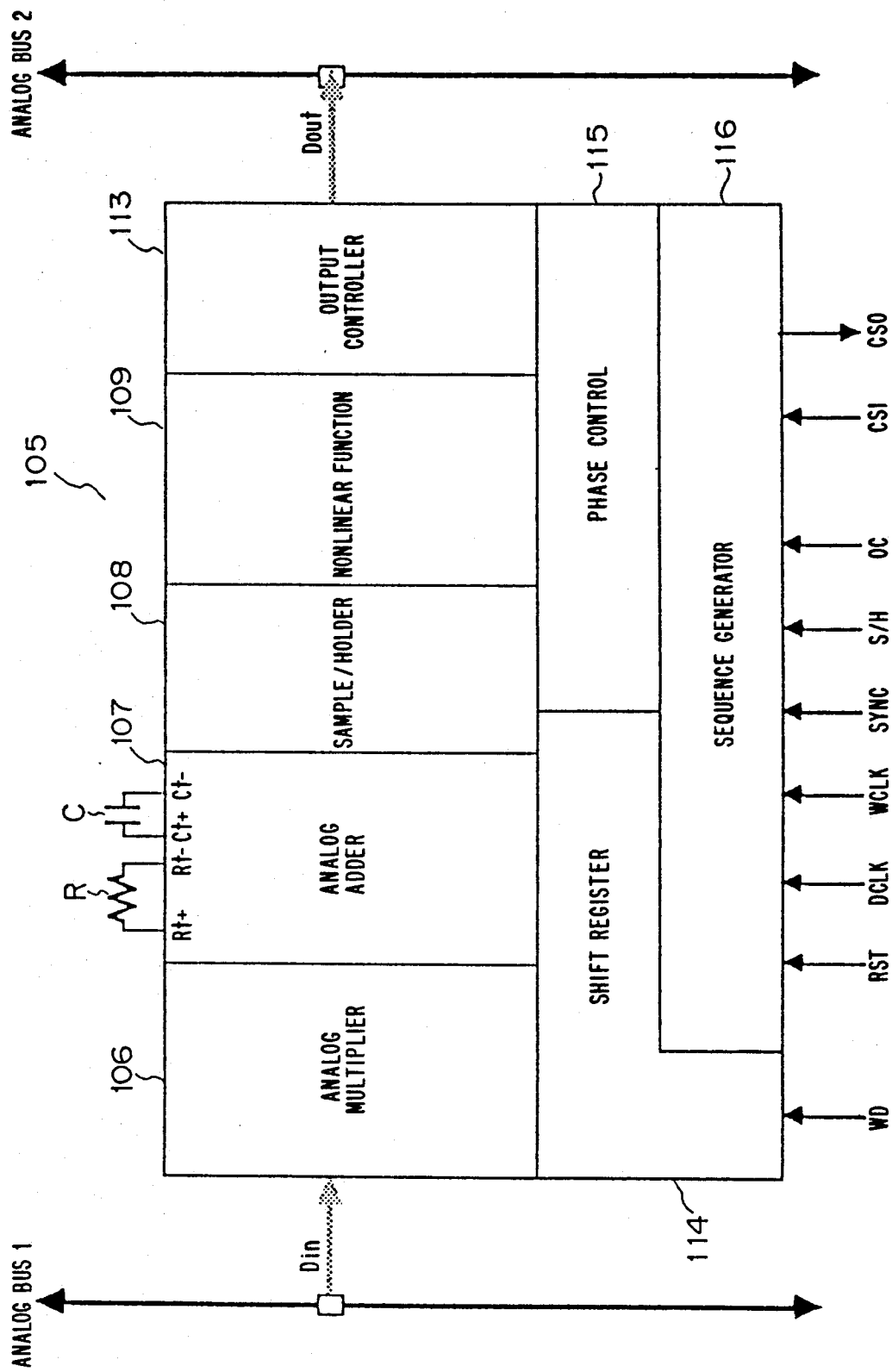
FIG. 16 is a principle structure of the analog neuron processor shown in FIG. 15A.

FIG. 16 shows the principle structure of an analog neuron processor (ANP) of the present invention.

Analog input signals transmitted in a time divisional manner from separate ANP's (not shown) are input to analog multiplier unit 106 in ANP105 through analog bus B1. Analog multiplier 106 multiplies the analog input data by the digital weight data WD which is received in bit serial form from shift register 114 and is then subjected to a serial-to-parallel conversion, thereby providing a product signal representing the product of the analog input signal and the digital weight data. Analog adder 107 comprises a Miller integrating circuit containing an external resistor R and a capacitor C, and obtains the sum of the respective product signals obtained from the analog input signal transmitted in a time divisional manner from a plurality of ANPs (the position in which each of the ANPs exists is called a node) provided at the previous stage and connected to analog bus B1, and obtained from the analog input signal for a threshold value transmitted from a dummy node. Next, the product signals are held by sample-hold unit 108 for the desired time period and the sampled/held output is converted through non-linear type function unit 109. Output control unit 113 delays the output of non-linear function unit 109 for 2O a predetermined time period under the control of sequence generator 116. The analog output signal $D_{OUT}$ is then outputted to analog bus B2. Sequence generator 116 produces a control signal to be supplied to the inside of this computer system. Phase control unit 115 controls the phase of a control signal to ensure that the switches connected to the analog circuit portions within the ANP and digital circuit portions are turned on and off. In particular, when the first switch is turned on and the second switch is turned off, the phase of the control signal is controlled to prevent both first and second switches from being turned on simultaneously.

Sequence generator 116 receives reset signals RST, DCLK, WCLK, SYNC, S/H, OC and CSI from a later described master control block and outputs a CSO, thereby forming a control signal within the ANP.

Neural networks are required to perform high speed operations using parallel processing. The present invention uses time divisional data, but respective ANPs normally perform parallel pipeline processing. An ideal neural network needs connecting wires for connection between respective neurons. Thus, the above structure would require a lot of wires. The present invention deals with time divisional data. Thus, the time required to process a sum of products in respective ANPs becomes a little long. However, respective ANPs are arranged vertically, namely, in the direction of the layers, in parallel with each other. Therefore, parallel processing of ANPs within one layer is performed, thus decreasing processing time. In addition, a pipeline process is possible between layers, which further decreases total processing time. When inputs, are received simultaneously and in parallel by, for example, three ANPs connected to an analog bus, the respective ANPs produce products of analog inputs and weights. These products are maintained as electric charges in capacitors of integrators in respective ANPs. In the next time period, respective ANPs produce products of analog inputs from the same analog bus and weights. These products are added to those determined in the previous time period in the capacitors of the integrators. When the sum of the products of the analog input signals from all the ANPs in the previous stage with the weight are produced, the sum is sample/held. Thereafter, a sample/hold signal is outputted through a sigmoid function upon an input of a CSI control signal. Upon completion of the output, the CSI falls down. A CSO then rises after a predetermined delay, thereby providing the use right of the output bus to the ANP of the adjacent neuron chip within the same layer.

The present invention is explained in detail in accordance with an embodiment.

Figure 17:
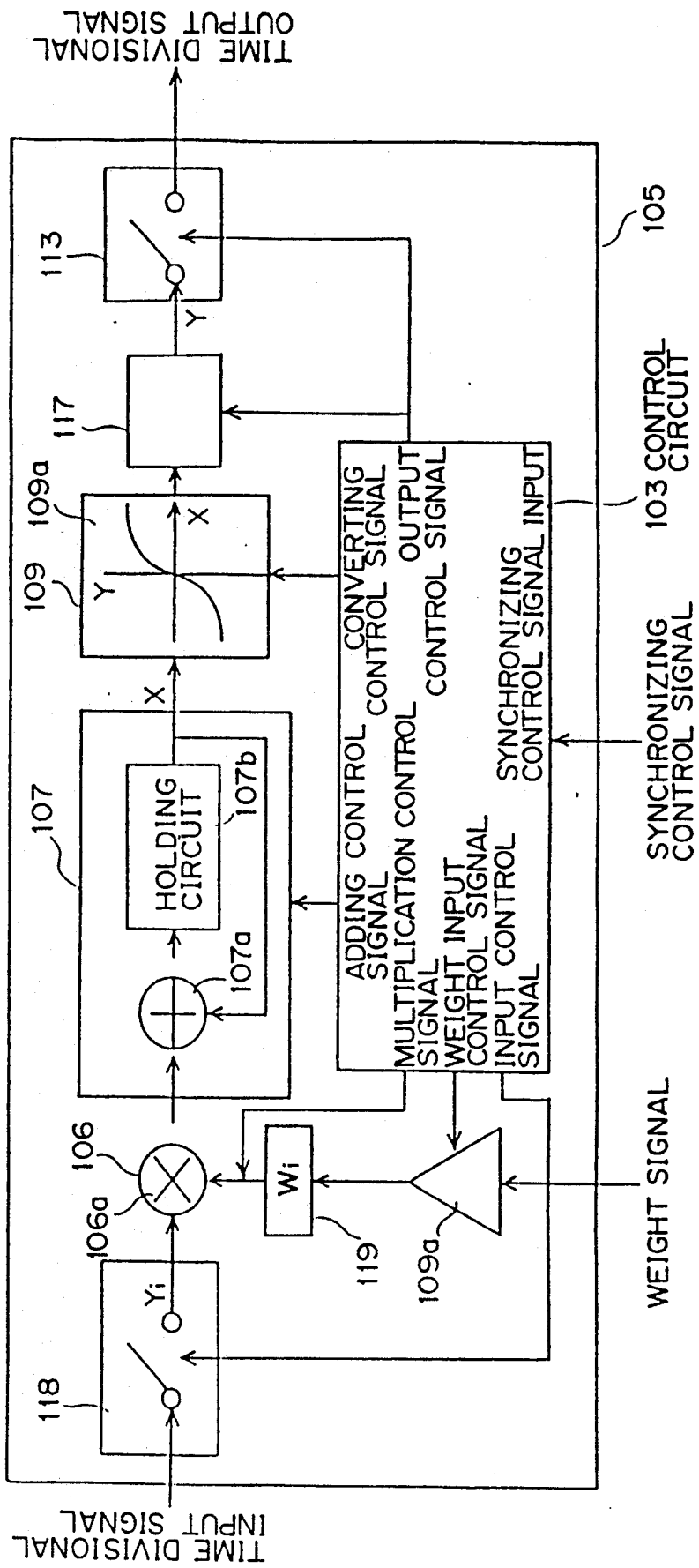
FIG. 17 is a block diagram of an embodiment of the basic unit in a layered network according to the present invention.

FIG. 17 shows a block diagram of the embodiment of the basic unit of the neuron chip (ANP). Multiplying unit 106, adding unit 107 and threshold value process unit 109 constitute an execution unit of a continuous neuron model. Output holding unit 117 is also provided. Where a plurality of inputs connected to basic unit 105 is expressed as Yi and the weight determined corresponding to respective connections as Wi, multiplying unit 106 calculates $Y_i \cdot W_i$ Adding unit 107 calculates $X = \Sigma Y_i \cdot W_i - \theta$ where $\theta$ is a threshold value. Where a final output from threshold value unit 109 is Y, the following equation is calculated.

$Y = 1/(1 + exp(-X))$

The weight "$-\theta$" is multiplied by the value "$+1$" inputted from the dummy node. The result "$x-\theta$" is then output from adding unit 107. Therefore, threshold value unit 109 performs a conversion by using an S character curve.

Multiplying unit 106 comprises multiplying type D/A converter 106a. An analog signal (inputted through input switch 118) from basic unit 105 in the previous layer or a later described dummy node circuit is multiplied by the weight information (inputted through the later described weight holding unit 119) of the digital signal and the resulting product is outputted as an analog signal. Adding unit 107 comprises analog adder 107a composed of an integrator and holding circuit 107b for holding the added result of analog adder 107a. Multiplying type D/A converter 106a receives an analog input signal at a reference voltage terminal of D/A converter 106a and respective bits of the weight at respective digital input terminals as the digital input signal, and multiplies the analog input signal by the weight. Analog adder 107a adds the resulting product output from multiplying type D/A converter 106a to the added value obtained at the previous timing and held in holding circuit 107b, thereby providing a new added value. Holding circuit 107b holds the added value obtained by analog adder 107a and feeds back the held value to analog adder 107a as the previous added value. These adding processes are carried out in synchronization with the adding control signal outputted from control circuit 103. Threshold value unit 109 comprises non-linear type function generating circuit 109a comprising an analog function generator circuit. It outputs a nonlinear signal such as a sigmoid function in response to the input. When the accumulation of the multiplied result is completed, including addition of the threshold value ($-\theta$), an operation process of the sigmoid function is performed by adding the threshold value ($-\theta$) to the added value X held in holding circuit 107b, thereby providing the analog output value Y. Output holding unit 117 comprises a sample/hold circuit and holds that output value Y of the analog signal from non-linear type function generator 109a which constitutes an output to basic unit 105 in the following stage layer.

The output switch 113 is turned ON for a predetermined period upon receiving an output control signal from control circuit 103. The final output is maintained in output holding unit 117 and processed to be outputted on analog bus B2. An input control signal from control circuit 103 turns ON input switch unit 118, to receive the input signal when an analog output is transmitted from the final output of basic unit 105 in the previous stage layer. Weight holding unit 119 comprises a parallel out shift register. It maintains the weight signal as a bit parallel weight for mutiplying unit 106 when the weight signal is bit serially transmitted from the weight memory and passes the gate on opening it (when the weight input control signal is turned on by controlling circuit 103). The bit-parallel weight data is provided to a multiplying unit when the multiplication control signal is provided. Control circuit 103 in the digital circuit unit produces a synchronizing signal for use inside the circuit based on an external synchronization signal and carries out a function of the analog process of the inside of the circuit.

As constructed above, the input and output signals of basic unit 105 with the signal process structure shown in FIG. 17 can be realized by using the analog signal. Multiplying type D/A converter 106a may receive the weight data of the digital signal in parallel or may convert the weight data into parallel data after receiving them as serial data. If the weight data is formed of the analog signal, the analog multiplying circuit may be used instead of the multiplying type D/A converter 106a.

Figure 18A:
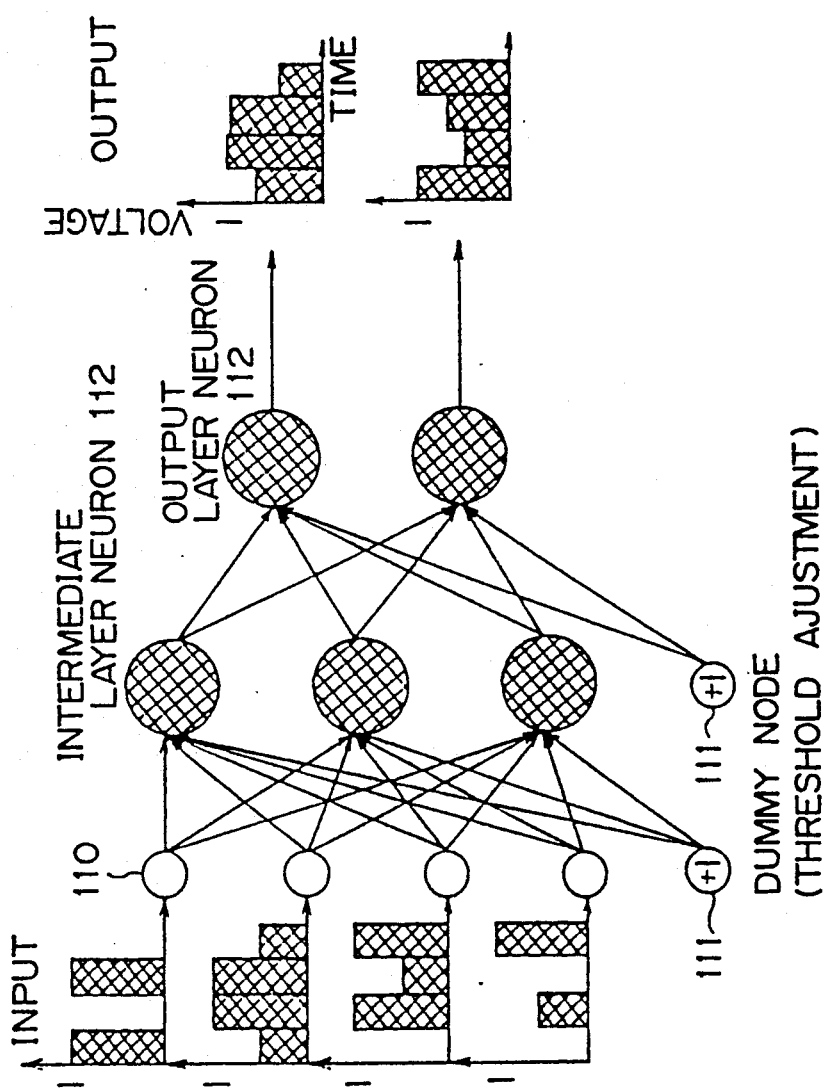
FIG. 18A is a conceptional view of a layered type neural network.
Figure 18B:
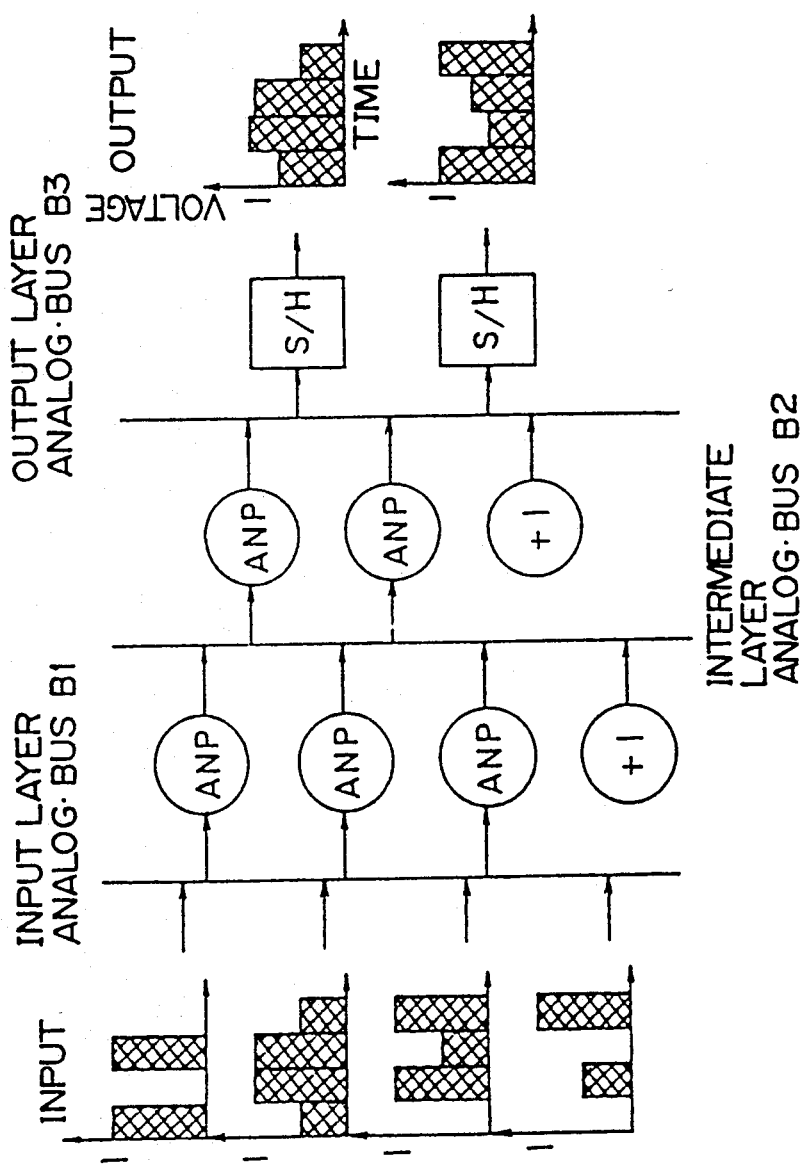
FIG. 18B is a conceptional view of the layered type neural network used for the present invention.

The layered structure shown in FIG. 18A is expressed by using the ANP of the present invention in FIG. 17. Independent analog buses B1, B2 and B3 are provided between respective layers, namely, between the input layer and the intermediate layer, and between the intermediate layer and the output layer, and at the output layer shown in FIG. 18B. All the vertical ANPs operate in parallel. A sample hold circuit S/H is provided at the output of the output layer.

Figure 19:
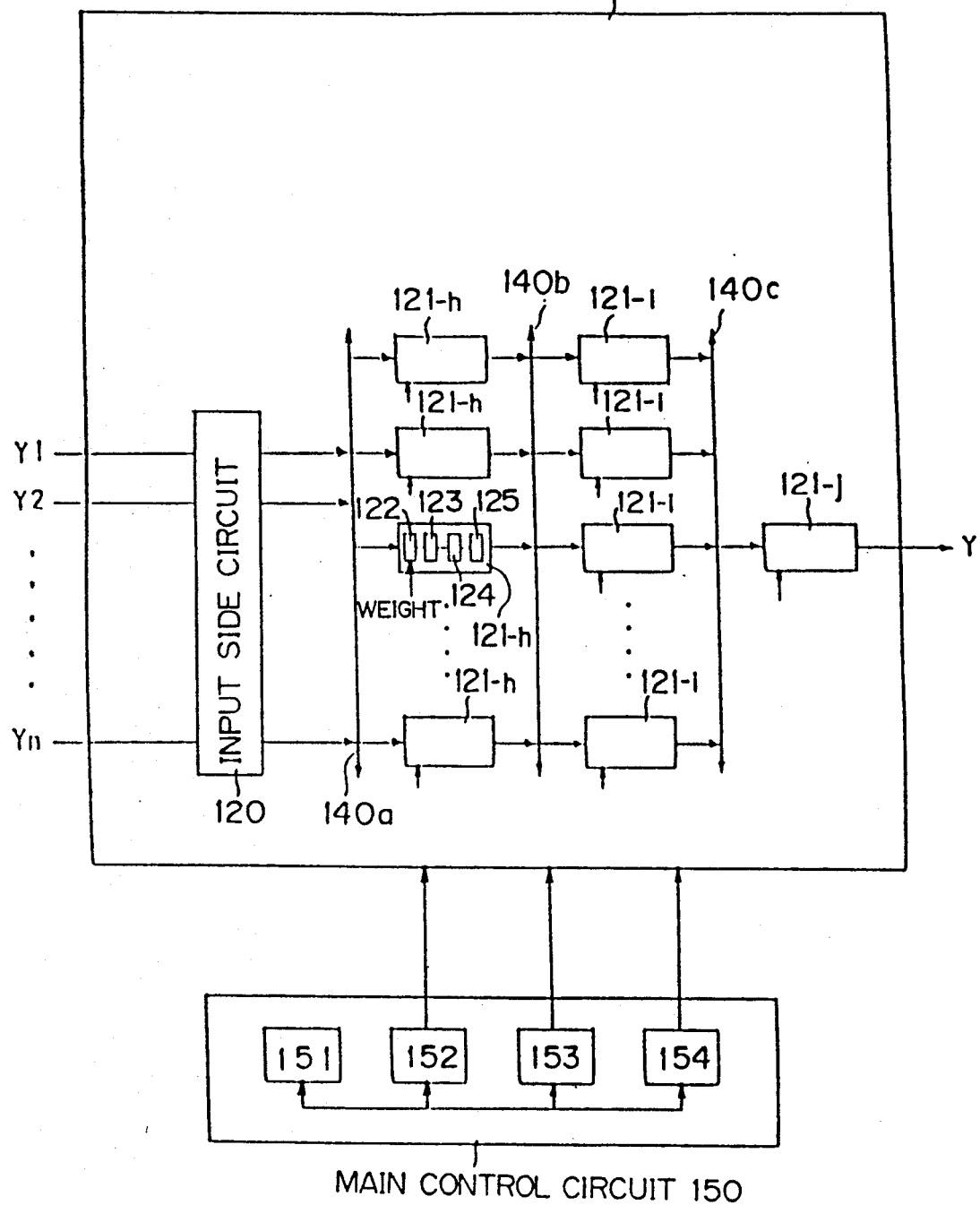
FIG. 19 is a block diagram of an embodiment forming a layered network by using a neuron computer of the present invention.

FIG. 19 shows an arrangement of an embodiment of the present invention. Input side circuit 120 corresponds to an input layer and 121 designates an analog neuron processor ANP forming a basic unit of a layered network, namely, a basic unit. 121-h designates a plurality of basic unit forming an intermediate layer. When there are more than three layers, 121-h designates a plurality of basic units forming one stage of or a plurality of stages of the intermediate layer and 121-i designates one or a plurality of basic units forming the output layer and 121-j shows an output layer circuit. An electric connection is formed between basic unit 121-h and basic unit 121-i, between two basic units 121-i, and between basic unit 121-i and basic unit 121-j. A layered network designated by 130 is formed based on a weight determined by respective connections.

Basic unit 121 has at least multiplying unit 122, adding unit 123 and threshold unit 124. Further, it is provided with output maintaining unit 125 n some cases. Multiplying unit 122 receives a plurality of units and corresponding weights, and performs a multiplication. Adding unit 123 adds all the multiplication results of basic units 121 in the previous layer, which is obtained by multiplying unit 122.

Threshold unit 124 converts the addition results obtained by adding unit 123 to a threshold value function of a nonlinear type and calculates a final output. When output maintaining unit 125 is provided, the final output obtained by threshold value unit 124 is maintained. The inputs and outputs to and from basic unit 121 are realized by an analog signal.

140 is an analog bus and forms a common line between an input layer and the front-most stage of the intermediate layer (140-a), between respective intermediate layers (140-b) and between the last stage of the intermediate layer and output layer (140-c). 150 is a main control circuit, which controls data transfer in a layer network 130. The main control circuit 150 is provied with driving unit selection means 151, weight setting means 152, threshhold value processing actuating means 153 and output value transmitting means 154.

In this embodiment, driving unit selection means 151 sequentially selects basic unit 121 in the previous stage of the layer. Output value transmitting means 154 is synchronized with the selection process and the final output of the analog signal maintained by the selected basic unit 121 is processed to be output to basic unit 121 of the post-stage layer in accordance with a time divisional transmission format through anlog bus 140. When this input is received, multiplying unit 122 of basic unit 121 of the post-stage layer sequentialy selects the weight corresponding to the connection with basic unit 121 of the prestage layer, the weight being determined by weight setting means 152, and performs a multiplication process on the input signal and the weight. Adding unit 123 sequentially adds multiplication results obtained by multiplying unit 122. When all the sum-of-the-product processes of basic unit 121 in the prestage layer are confirmed to be completed, threshold value process actuating means 153 performs a process of converting the signal by using nonlinear threshold value function f. Thus, basic unit 121 outputs $f(X-\theta)$. Then, the post-stage layer becomes the new prestage layer and the same process is repeated for the following post-stage layer. Because of this latter transmission system, the output pattern corresponding to the input pattern is output from the output layer of the layered network.

Figure 20:
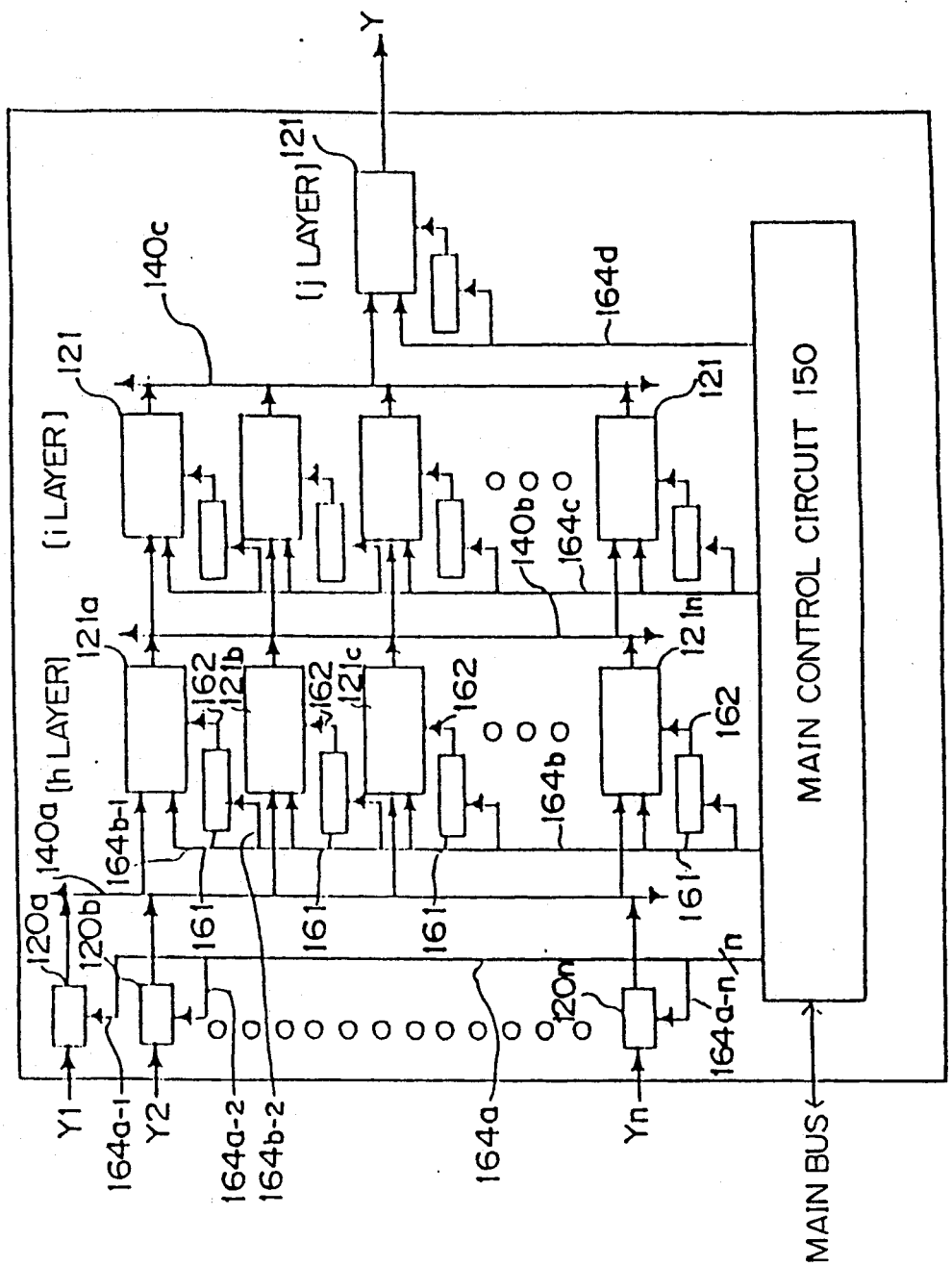
FIG. 20 is a detailed block diagram of the embodiment shown in FIG. 19.

FIG. 20 shows an embodiment of the network structure data process apparatus formed by connecting a plurality of basic units 121 in a layered manner. This embodiment temporarily holds a weight provided to respective basic units 121 outside the units and performs a control of CSI by an order of main control circuit. In this embodiment, the electrical connection between the layer structure of the layer network is realized by a single common analog bus 140 (a to c may be attached to the analog bus 140 as an identifier). Accordingly, the final value outputted from the output switch unit 113 of basic unit 121 is constructed such that it is outputted in the output mode of the analog signal, while the final output value is inputted to basic unit 121 located in the following stage layer. The input layer is designated by h, the hidden layer by i, and the output layer by j.

In FIG. 20 the weight output circuit 161 is provided for respective basic units 121 and outputs the weight for weight holding unit 119 (FIG. 17) a of basic unit 121. Weight signal line 162 connects the output of weight output circuit 161 through weight holding unit 119, provides input side circuit 120 (a to n may be attached to the initial signal output cirucit as an identifier) in accordance with the number of input patterns, and outputs an initial signal to an input layer of a layer network as an input pattern. Synchronizing control signal line 164 (a to d may be attached to the synchronizing control signal line as an identifier) includes CSI and transfers the synchronizing control signal from main control circuit 150 carrying out the control of the data transfer to weight output circuit 161, and control circuit 103 of the input side circuit 120 and basic unit 121. Synchronization control signal line 164 is designated by a common line in the drawing but is connected to respective circuits from main control circuit 150 as individual signal lines.

Figure 21:
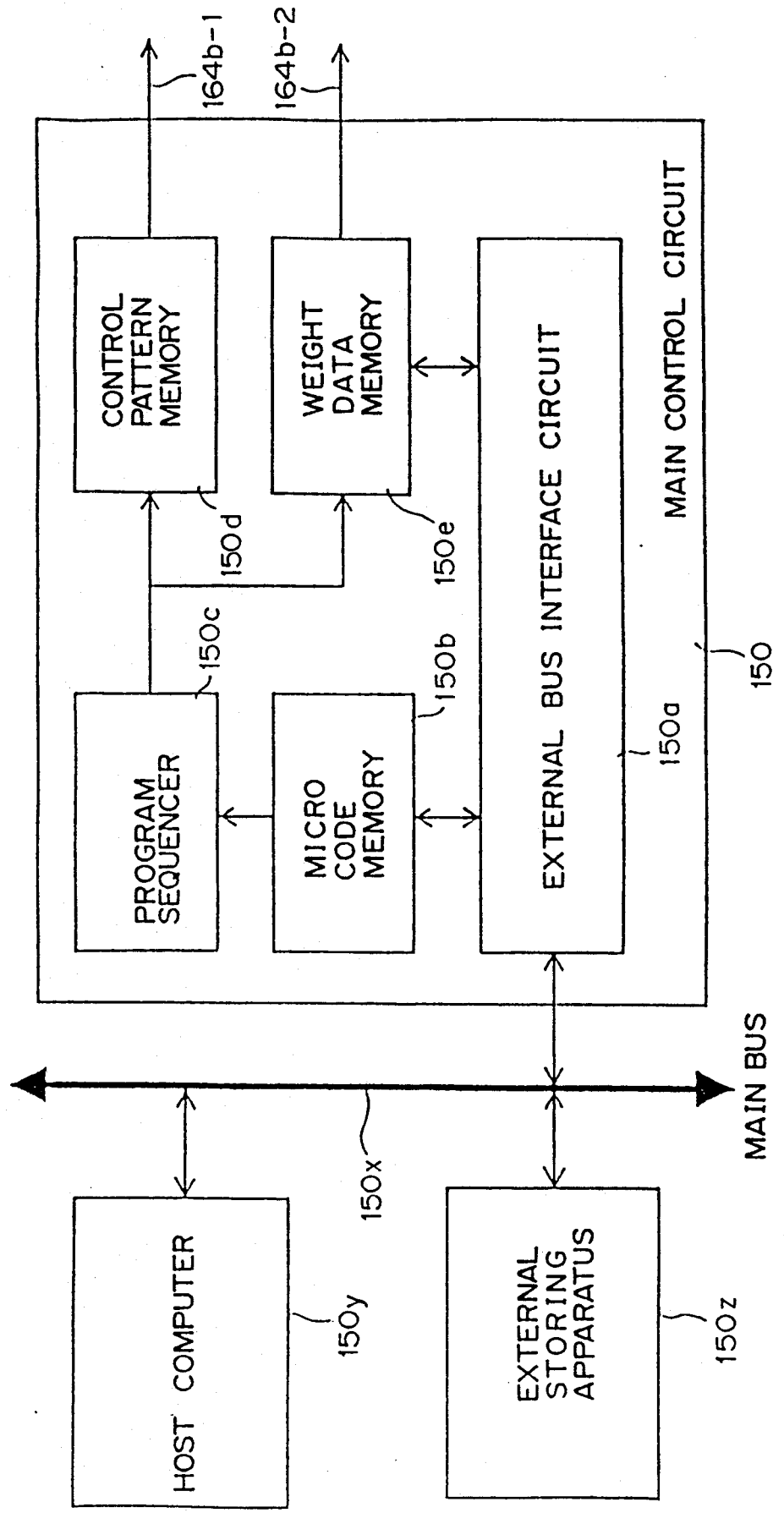
FIG. 21 is a system structure view of a main control circuit.

FIG. 21 shows in detail the system of main control circuit 150.

Main control circuit 150 comprises at least external bus interface circuit 150a, micro code memory 150b, program sequencer 150c, control pattern memory 150d and weight data memory 150e. External interface circuit 150a is connected to host computer 150y and external memory apparatus 150z through main bus 150x and receives an operation instruction from host computer 150y. Micro code memory 150b stores a micro-code for defining operation of program sequencer 150c. Program sequencer 150c controls control pattern memory 150d and weight data memory 150e in accordance with a micro code within micro code memory 150b. Control pattern memory 150d has output signal lines connected to input side circuit 120 and basic unit 121 in an initial layer, an intermediate layer or hidden layer and an output layer, individually. It turns the output signal lines on or off to select each of respective sets, that is, respective sets of input side circuit 120, input layers, hidden layers, and output layers or basic units 121 in a time divisional manner, in accordance with an instruction from program sequencer 150c. Weight data memory 150e provides respective basic unit 121 with weight in synchronization with the time divisional input signal in accordance with the instruction from program sequencer 150c, by providing the weight of digital data to respective weight output circuits 161. Host computer 150y includes MPU and a main storage, determines a weight by a learning algorithm such as a back propagation and provides the input pattern Yi. The external storage device stores data for forming a neuron computer.

The operation of the embodiment shown in FIG. 20 is next explained, with reference to the timing chart shown in FIG. 22.

When a request for conversion to an output pattern is provided by host computer 150y through main bus 150x, main control circuit 150 transmits an output control signal sequentially and cyclically to an input side circuit 120 and selects a plurality of input side circuits 120 sequentially and cyclically. Namely, main control circuit 150 sequentially selects input side circuit 120 from control pattern memory 150d in accordance with an instruction of program sequencer 150c by sequentially turning on synchronization control signal lines 164a for respective input side circuits 120. Namely, main control circuit 150 turns on only synchronization control signal (CSI) line 164a (shown by 164a-1 in the drawing) selected from n synchronization control signal lines to open a gate of input side circuit 120a, in order to output input pattern $Y_1$ supplied to initial signal output circuit 120a to analog bus and turns off other synchronization control signal 164a. Next, main control circuit 150 turns on only synchronization control signal 164a (shown 164a-2) to open a gate of input side circuit 120b, in order to output an input pattern $Y_2$ of input side circuit 120b to analog bus 140a and turns off other synchronization control signal lines 164a. The following operation is conducted as recited above. Main control cicuit 150 performs an ON and OFF operation on synchronization control untill the input pattern $Y_n$ of input side circuit 120n is outputted to analog buses 140a. Main control circuit 150 simultaneously sets the outputs of weight data memory 150e for respective weight output circuits 161 through synchronization control signal line 164b in synchronization with ON operations of respective synchronization control signal lines 164a in order to provide weight to respective weight output circuits 161 of respective basic units 121 in the input layer h.

In FIG. 22A, a synchronization control signal of synchronization control signal line 164a is represented by Yi output control signal (i=1 to n) and input side circuit 120 is sequentially and cyclicaly selected. In this Figure, n designates the number of input side circuit 120. The input side circuit 120, as selected above, transmits an analog signal Yi provided as an input pattern to an analog bus 140 (presented by an input layer analog bus 140a in the drawing) provided between the h layer and the input side circuit 120a. This input pattern is given through host computer 150y. Accordingly, as shown in FIG. 20A, an analog signal Yi is sequentially transmitted on the input layer analog bus 140a sequentially. The number of the analog signal Yi corresponds to that of input side circuit 120. Initial input pattern Yi, and following input patterns Yi are transmitted one after another repeatedly.

Multiplication process unit 122 of respective basic units 121 in an h layer receives the transmitted analog signal Yi transmitted and uses a weight Wi of weight holding units 119 set by main control circuit 150 to carry out an arithmetic operation (Yi.Wi) The weight Wi is already determined in MPU in accordance with the back propagation method and a learning algorithm shown in FIG. 7 and in supposed to be determined in MPU by the learning means shown in FIG. 11 and the back propagation method.

Accordingly, main control circuit 150, as shown in FIG. 22B, sets a weight Wi corresponding to selected input side circuit 120 into weight holding unit 161 in respective basic units 121 of an h layer through weight output circuit 161 in synchronization with a selection process of input side circuit 120. The products of Yi and Wi are obtained in 1 bus cicle, and the sum of the products and the previous sum-of product are obtained.

It is possible to set a weight in basic unit 121 in accordance with any mode of an analog signal or a digital signal. The weight is designated by respective connections and as stated above, should be expressed accurately by $W_{ij}$ (j indicates the number of the basic unit in the h layer), but is represented by Wi to simplify the explanation.

Figure 23:
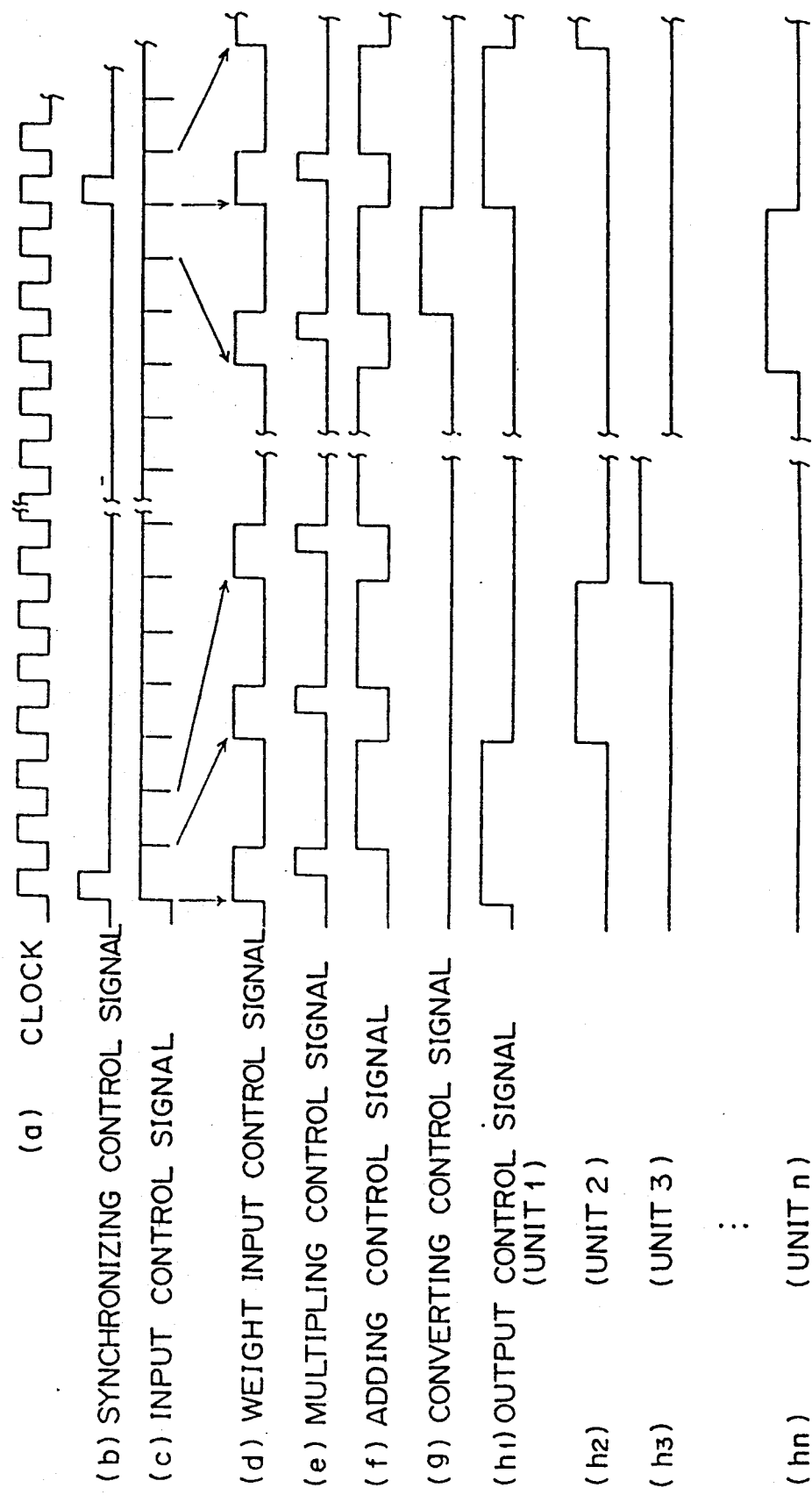
FIG. 23 is a timing chart of a signal processing in the embodiment shown in FIGS. 19 and 20.

The processing operation is explained by referring to the timing chart shown in FIG. 23, for a signal processing of a basic unit 121. Basic unit 121 (represented by 121a in the drawing) in the intermediate layer is explained.

When control circuit 103 receives a synchronization control signal from control pattern memory 150d of main control circuit 150 through synchronization control signal line 164 (represented by 164b-1 in the drawing) it turns input control signal (c) ON and makes input switch unit 118 conductive. At the same time, control signal 39 turns ON weight input control signal (d) opening a gate buffer 119a and an output control signal ($h_1$) corresponding to CSI for making output switch unit 113 conductive. Then, in synchronization with a clock (a) main control circuit 150 sequentially turns CSI of the synchronization control signal line 164a ON and input pattern signals Yi maintained in input side circuit 120a, 120b ... 120n are provided to amplification type D/A converter 106a through analog bus 140 and input switch unit 118.

Main control circuit 150 provides a weight of weight data memory 150e to weight output circuit 161 through synchronization control signal line 164b (represented by 164b-2 in the drawing) and this weight (digital data) $W_i$ is stored in a weight holding unit 119 through buffer 119a. Then, the output control signal ($h_1$) is turned ON for only one period of the clock (a), the analog gate of the sample hold circuit in the basic unit 121 is made in an open state for this period, and the held analog value is outputted to i layer analog bus 140b through output switch unit 113. When weight Wi of the digital value is stored in weight holding unit 119, multiplication control signal (e) is then turned ON and multiplication type D/A converter 106a multiplies analog signal $Y_1$ received through INPUT switch unit 118 by the weight $W_1$, thereby outputting the multiplication result as an analog signal. Next, as the adding control signal (f) is turned ON, an analog adding adder 107a formed by an integrator operates and an analog value (which is initially cleared to 0) maintained immediately before in sample hold circuit 107b is added to an amplification result of defined type D/A converter 106a, thereby storing the addition result in sample hold circuit 107b again.

In accordance with the above operation, one bus cycle is completed and input pattern Y2 for input side circuit 120b is provided from input switch unit 118 in synchronization with the next clock (a) and weight output circuit 161 provides weight W2 corresponding to the input pattern Y2. Thus, input pattern Y2 is multiplied by weight W2 and the multiplication result is added to the value held in sample hold circuit 107b. Thereafter, this operation is repeated until the process for an input pattern $Y_n$ to the input side circuit 120n is completed. When the multiplication of the input pattern $Y_n$ by $W_n$ is completed, conversion control signal (g) is turned ON. The value obtained by accumulating the multiplication result is then inputted to non-linear type function generating circuit 109a of threshold processing unit 124 and the corresponding Y value is maintained. Therefore, the threshold processing unit 124 performs the following arithmetic operation.

$$Y = 1/(1 + exp(-X + \theta))$$

Therefore, the final output value Y, which is the final operational output of the basic unit 121, can be obtained and is maintained. This result is output to analog nus (140b) in the following stage at the following rise of the output control signal ($h_1$). When this value Y is obtained, the accumulated value in adding unit 107 is in synchronization with a selection cycle of the next input side circuit 120 and is cleared by inputted clear signal.

In accordance with the operation described above, respective basic units 121 provide the final output value Y from input pattern $Y_i$ and weight $W_i$.

Hereafter, the explanation returns to the structure of the embodiment shown in FIG. 20. As explained in detail by referring to FIG. 23, the process for inputting the pattern set in all the input side circuits 120 is completed and then again main control circuit 150 provides the respective basic units 121 (a to n are added as identifiers) with synchronization control signals. Thus, a similar operation is carried out in accordance with input pattern $Y_i$ newly provided to input side circuit 120 and a new weight $W_i$.

On the other hand, the final output value Y of the basic unit 121 of the h layer thus obtained is held and transmitted in a time divisional manner to basic unit 121 of the i layer positioned in the next stage through analog bus 140b in the same manner as for input side circuit 120. Namely, main control circuit 150 controls output signals $h_1$ to $h_n$ (FIG. 23) to control circuit 103 for respective units 121a to 121n in the h layer through synchronization control signal line 164b (which is represented by 164b-1 in the drawing) sequentially and cyclically, thereby turning the output switch unit 36 of the basic unit 121a, 121b ... ON sequentially and cyclically. Therefore, the analog signal of the final output value maintained in the respective basic units 121a to 121n is transmitted in a time divisional manner to multiplying unit 122 of respective basic units 121a to 121n in the i layer period. Respective basic units 121a to 121n in the i layer carry out the same operation as described above. They use the final output value Y of basic unit 121 in the i layer obtained by the above process, and carry out transmission processing for basic unit 121 in the i layer in a similar time divisional manner, thereby dividing final output value Y of basic unit 121 in the output layer. Main control circuit 150 similarly controls respective basic units through synchronization control signal lines 164c and 164d individually connected to respective basic units 121 in the intermediate layer and the output layer.

Figure 24:
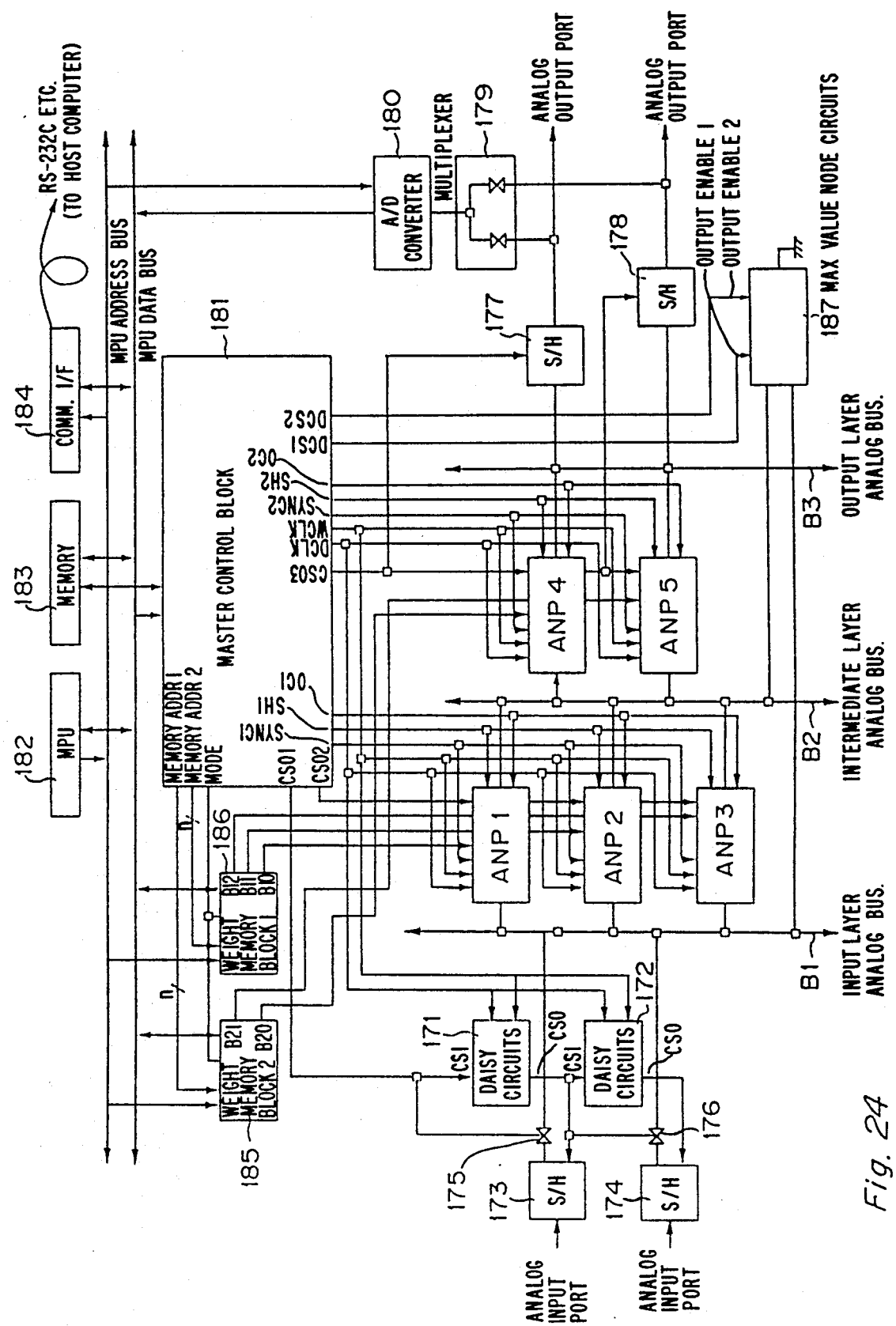
FIG. 24 is a detailed circuit diagram of an embodiment forming a neuron computer in the layered network according to the present invention.

FIG. 24 is a block diagram of the layered neuron network of the neuron computer of the present invention. Analog neuron processors ANPs 1 to 5 comprising neuron chips, are provided in parallel in respective layers and analog buses (B1, B2 and B3) are independently provided between two layers. In FIG. 24, the intermediate layer is formed by ANPs 1, 2 and 3 and the output layer is formed by ANPs 4 and 5. The input stage does not have any ANPs, but has daisy circuits 171 and 172 for inputting the analog input signal in good timing. The circuits designated by S/H are sample/hold circuits 173 and 174. ANPs 1 to 5 need logic signals for control and many control signal lines are connected to respective layers from master control block (MCB) 181. Data clock DCLK is applied to daisy circuits 171 and 172 at the input side of all the ANPs and constitutes a basic clock for analog processing. A weight clock WCLK is applied to all the ANPs and daisy circuits 171 and 172 at the input side. This provides a high speed clock for the weight data. The weight data is input to respective ANPs 4 and 5 and ANPs 1, 2 and 3 from weight memory block 185 and 186 in synchronization with the weight clock WCLK. The synchronization clock SYNC1 is applied to the ANPs in the intermediate layer and the synchronization signal SYNC2 is applied to the ANP at the output layer for the synchronization clock. SH1 and OC1 represent the sample/hold control signal and offset control signal, respectively, for the ANPs in the intermediate layer, and SH2 and OC2 represent these signals for the ANPs in the output layer. Daisy circuits 171 and 172 of the blocks on the left side are the input side circuits corresponding to the input layer. In order to realize the input node, namely, the neurons in the input layer, the analog input signal applied to the analog input ports 0 and 1 should be applied to the daisy circuits in a time divisional manner at the same timing as an ANP produces the analog signal. That is, a basic operation is constructed when ANPs 4 and 5 in the output layer receive analog signals from ANPs 1, 2 and 3 in the previous intermediate layer in a time divisional manner through analog bus B2. The relationship described above should exist between the intermediate layer and the input layer. This relationship should be such that the ANPs in the input layer exist before the ANPs in the intermediate layer. Therefore, the output should be provided to analog bus B1 from analog input ports 0 and 1 upon receiving the analog input signal at the same time as the ANPs in the intermediate layer output the analog signal to analog bus B2. In other words, the input signals from the analog input ports 0 and 1 are applied to analog bus B1 in a time divisional manner. The analog signal from the analog input port 0 is applied to the analog bus B1 at an appropriate timing. The next analog input signal from analog input port 1 is applied to analog bus B1 after the analog signal from analog input port 0 is applied to the same analog bus B1. In order to achieve the above synchronization, the input control signal CSI outputted at a constant timing is applied to daisy circuit 171 and after a certain period, daisy circuit 171 produces output control signal CSO. The CSI is produced by CSO1 of master control circuit 181. Daisy circuits 171 and 172 form a kind of delay circuit. When daisy circuit 171 receives input control signal CSI from master control unit 181 it transmits the CSO signal to the vertically lower adjacent daisy circuit 172 so that the analog output signal is outputted from analog input port 1 to the vertically the lower adjacent daisy circuit 172. This operation is called a daisy control.

When the output CSO1 of master control circuit 181 rises, switch 175 is turned on and the analog input signal of analog input port 0 held in sample/hold circuit 173 is applied to analog bus B1. As CSO1 is the CSI of daisy circuit 171, a CSO rises a predetermined time after the fall of the CSI. This CSO1 is the CSI for daisy circuit 172, and simultaneously turns switch 176 on. Thus, the analog input signal of analog input port 1 held in sample/hold circuit 174 is applied to bus B1. The present layered structure needs such daisy control. That is, the analog input signal is applied to analog bus B1 through analog input port 0 and sample/hold circuit 173. The next analog input signal is outputted to the same analog bus B1 through analog input port 1 and sample hold circuit 174. From the viewpoint of respective neurons in the hidden layer, the analog input signal of analog input port 0 and the following analog input signal from analog input port 1 are sequentially inputted in a time divisional manner.

Daisy circuits 171 and 172 output output control signal CSO by delaying input control signal CSI by a predetermined period to avoid bus competitions on analog bus B1.

In intermediate layer, ANP1 receives output control signal CSO2 from master control block 181 as CSI provides the analog signal and then CSO is applied to ANP2 as CSI and thereafter ANP2 outputs CSO. ANP3, which receives CSO of ANP2 as CSI, next produces the analog signal. In summary, ANPs 1, 2 and 3 produce outputs in turn, thus completing the daisy operation in the intermediate layer. In parallel with this operation, master clock control block 181 for managing all the operations provides CSO3 to ANP4 in the output layer and then ANP4 produces the output. After completion of the output, ANP4 provides CSO to ANP5 and ANP5 produces the output.

Outputs from ANPs 4 and 5 in the output layer are subjected to a sample/hold operation by sample/hold circuits 177 and 178, respectively, under the control of CSO3 from master control block 181 and daisy chain output control signal CSO. The output voltage is outputted as the analog output signal from analog output ports 0 and 1 and selected by analog multiplexer 179. An A/D conversion is thus applied to the output of multiplexer 179 by A/D converter 180 and then the output of A/D converter 180 is transmitted to digital control circuit means comprising MPU182, memory 183 and communication interface 184. The output signal is compared to a teacher signal stored in the MPU during learning to determine whether or not the output signal is the desired one. The weight data of the later described weight memory is changed based on this comparison. Maximum value node circuit 187 applies dummy node control signals DSC1 and DSC2 from master control block 181 to output enables 1 and 2 and the output terminal is connected to analog buses B1 and B2.

Figure 25A:
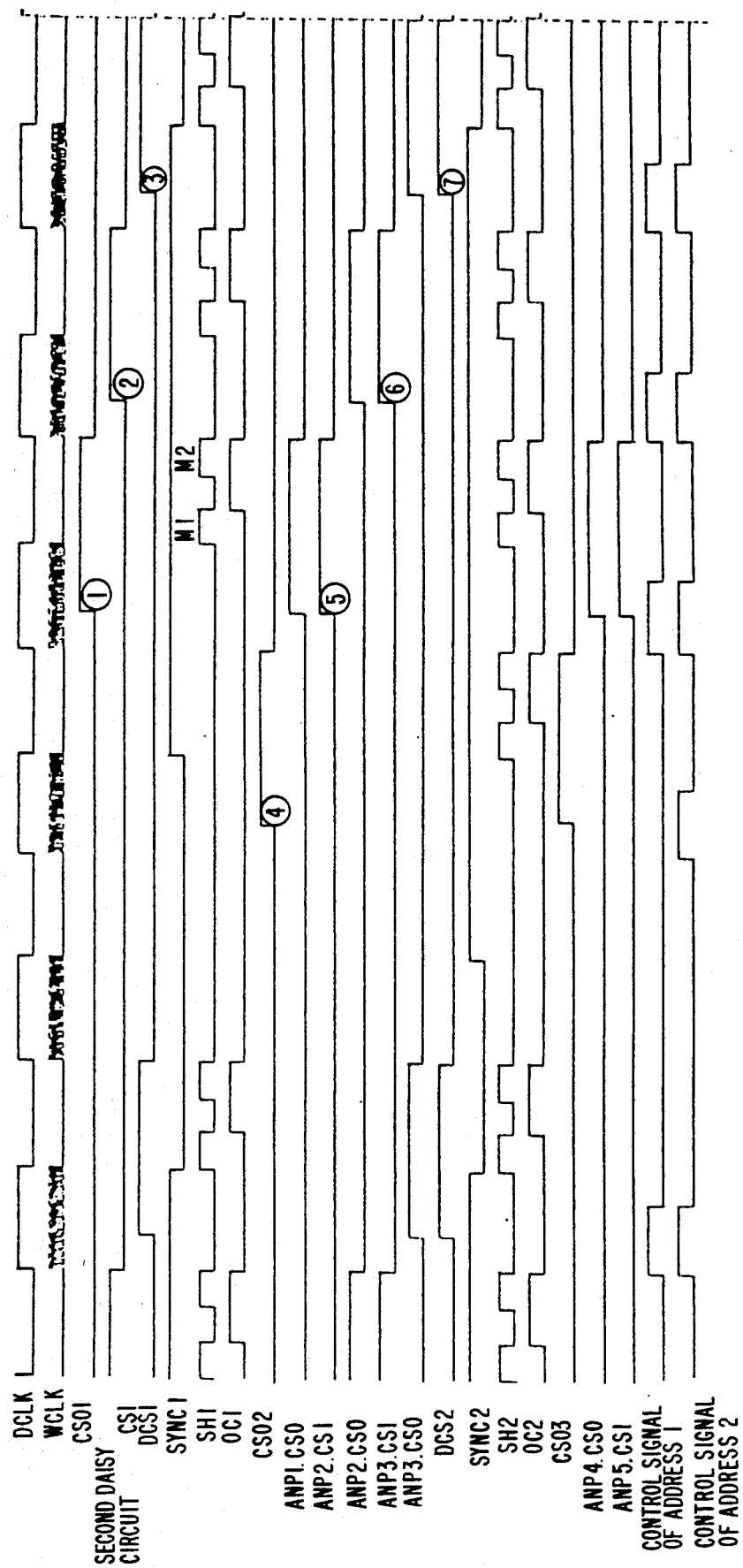
FIGS. 25A and 25B are timing charts of the signal processing shown in FIG. 24.
Figure 25B:
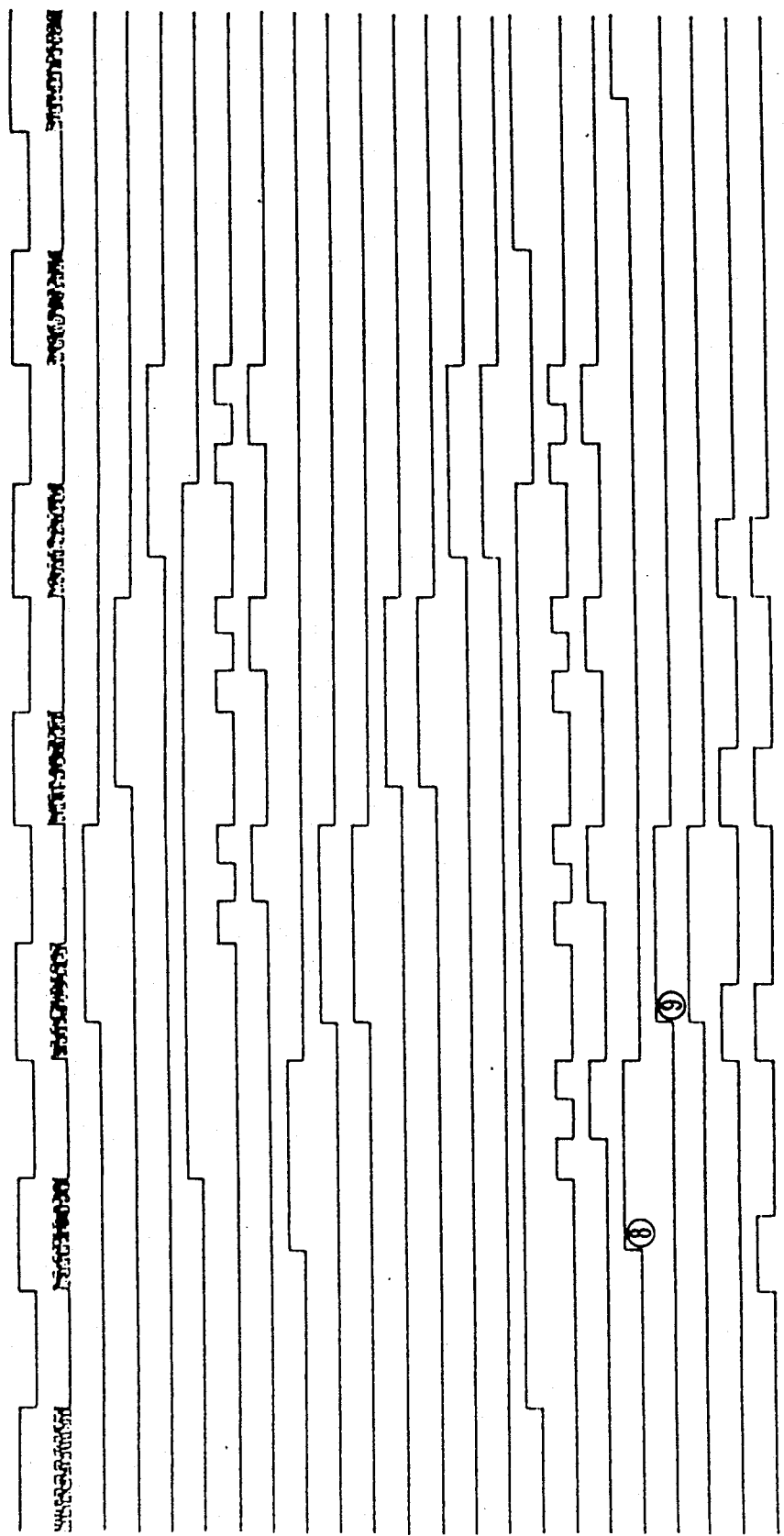

FIGS. 25A and 25B show a timing chart of a layered neuron computer according to the embodiment shown in FIG. 24. A control signal line is extracted every layer. The data clock DCLK, i.e., the basic operational clock, and weight clock WCLK are simultaneously applied to daisy circuits 171 and 172 on the input sides of all ANPs in the same layer.

Weight clock WCLK is a serial synchronizing pulse for transmitting the serial digital weight and for reading the weight from the weight memory block. The control signal determines at which timing the input data is received. In the timing chart of FIG. 25, CSO1 is a busy daisy chain control signal outputted from master control block 181, namely, the daisy chain control signal CSI applied to daisy circuit 171. In daisy circuit 171, CSI outputs the first analog input signal to analog bus B1 through analog input port 0 and sample/hold circuit SH173. In the timing chart shown in FIG. 25, at time ①, the analog signal is outputted to analog bus B1. At this moment, the voltage is applied to analog bus B1 and ANP1, ANP2 and ANP3 perform a parallel sum-of-the-products operation for this analog signal. The CSO passes daisy circuit 171 and the next CSI rises at timing ②, a predetermined time after CSO falls. The next CSI is a control signal applied to second daisy circuit 172 in the input layer. During the high-CSI period, the analog input signal is applied to ANP1, ANP2 and ANP3 through sample/hold circuit SH174, thereby executing a sum-of-the-products operation. DCS1 from master control block 181 is a control signal to be applied to a dummy node. Respective layers receive signals from the dummy node as well as input signals. The number of nodes is equal to the number of neuron nodes plus one. Therefore, the input layer has two inputs, although it seems to have three inputs when observed from the ANPs provided in respective intermediate layers. Therefore, a control signal block comprises two CSIs and one DCS1. The input cycle starts from the initial CSI and ends at the input to the dummy node DSC1. The dummy node is provided by the maximum value node circuit 187 and the circuit outputs a threshold value voltage fixed on the analog bus while CSI is being inputted. As shown at time ③, from the beginning of the rise of DCSI and while the output voltage is being outputted, respective ANPs in the intermediate layer perform the sum-of-the-products operations as for the ordinary input. The fixed value voltage of a high CSI signal is added to the sum of the products of the previous two analog input signals, thereby enabling an addition to be conducted after multiplication. SYNC1 becomes high at a falling edge of DCLK before the rise of CSO1 and thus becomes low at the falling edge of the following DCLK after the rise of DSC1. SYNC1 is a synchronizing signal for the input layer. When WCLK is inputted, the analog input is multiplied by the weight data. Sample/hold signal SH1 inputted to the ANP at the intermediate layer, provides two high portions M1 and M2 and the product is obtained a little before the first high portion M1 and the sum is produced during the high portion M1 and then held. At the next high portion M2, the offset voltage $V_b$ is subtracted from the held voltage and the resulting voltage is subjected to a sample/hold operation. This process is repeated for the analog signal to be inputted, thereby computing the sum of the products. In this case, respective ANPs in the intermediate layer perform the sum-of-the-products operation three times, including the one for the dummy node. Thus, the processes of respective ANPs in the intermediate layer are completed and the addition of the products for three inputs is completed.

In the timing chart when DCLK is high immediately after the fall of DCSC1, the result of the sum-of-the-products operation of three signals obtained from analog input ports 0 and 1, and the dummy node is held in capacitors of respective ANPs 1, 2 and 3. This operation is basically repeated. The rise in the CSO2 signal determines when the output signal of ANP1 is outputted to analog bus B2 provided between the intermediate layer and the output layer.

Offset control signal OC1 shown below SH1 performs an offset cancel within an ANP. Respective ANPs use analog signals including an operational amplifier therein and thus the circuit itself has an offset which is cancelled by the control signal of the OC signal. As shown by OC1, every time one sum-of-the-products operation is carried out, one pulse is output to perform an offset cancelling inside the ANP. In the timing chart, as shown by time ④, when CSO2 rises, the signal held in ANP1 is outputted to the analog bus B2, and ANP4 in the output layer performs sum-of-the-products operation during the high-CSO2 period. The rise of CSO2 shown by time ④, designates a timing when the sum-of-the-products result obtained as a result of the preceding input signal is outputted.

The timings in the intermediate layer and the output layer are explained by referring to FIGS. 25A and 25B.

The analog signal is produced in synchronization with outputs ④, ⑤, ⑥, and ⑦, of the daisy chain control signal from the hidden layer and outputs ⑧ and ⑨ from the output layer and it is produced on the analog bus as the result of the previous process cycle for the analog signal in accordance with daisy chain control signal outputs ①, ②, and ③ from the input layer. The execution of the pipeline process is explained later. Upon the rise of CSO2, shown by time ④ in the timing chart, ANP1 produces the output. Two pulses are outputted as shown by the signal SH2. Signal SH2 is inputted to the first ANP4 in the output layer in the block diagram shown in FIG. 24. Namely, one sum operation in ANP4 is carried out on two high portions of the SH2 signal. Three neurons comprising ANPs 1, 2 and 3 are shown in the intermediate layer. In addition, the dummy node is added to it by maximum value node circuit 187, thereby providing four neurons in total. Accordingly, a pulse comprising two high portions of SH2 signal is produced four times starting at time ④. The analog signal in the hidden layer is inputted to ANP4 in timings of four pairs of high portions of the SH2 signal to perform the sum-of-the products operation. This operation is naturally conducted simultaneously with the timing when the ANP in the hidden layer performs the sum-of-the-products operation on the input signal, thereby conducting pipeline processing. The CSO signal for ANP1 provided in the intermediate layer is shown below CSO2 and is CSI for ANP2 in the same intermediate layer. This is shown by the portion designated by time ⑤. The CSO for ANP2 is shown below ANP2, CSI and the CSI for ANP3 is shown below ANP2, designated by time ⑥. CSO and the CSI for the dummy node is shown below the CSI for ANP3, and DCS2, outputted from the master control block, becomes high at time ⑦. The CSI is inputted to ANP1, ANP2 and ANP3 in the intermediate layer and max inner value node circuit 187 for the dummy node, in the sequence of times ④, ⑤, ⑥ and ⑦. During this period, signal SH2 produces four pulses, each having two high portions. The neuron of ANP4 provided in the output layer adds the products of input analog signals and weights four times. At time ④, when CSI is input to ANP1, the analog signal from ANP1 is output to the analog bus between the intermediate layer and the output layer and is input to ANP4. At the same time, corresponding weight data are input to ANP4, the multiplications are carried out and the products are added at the first high portion of the SH2 signal and the sum is subjected to a sample/hold operation at the second high portion. Upon completion of the calculation, the CSO signal from ANP1 rises, thereby providing CSI of ANP2 at time ⑤. Then the weight data are multiplied by the analog data, so that the sum can be calculated. A predetermined period after the fall of the state shown by time ⑤, the CSI to ANP3 becomes high and the sum-of-the-products operation is carried out by ANP4, as shown by time ⑥. At time ⑦ the fixed voltage output from the maximum value node circuit 187 is then input to ANP4 and added to the result accumulated up to this point through the sum-of-the-products operation.

The above operation is applied in parallel to ANP5 in the output layer, thus realizing simultaneous processing. When CSO3 outputted from master control block 181 rises, the result of the sum-of-the-products operation calculated by ANP4 is output to analog bus B3 connected to the output layer. The control signal according to which max value node circuit 187 provides the output to analog bus B2 is DCS2 and this corresponds to time ⑦. The operation up to DCS2 is for outputting the calculation result from the hidden layer. The same operation will be applied to the signal designated below DCS2 in the timing chart. This signal defines the operation of the output layer side connected in cascade to the intermediate layer. Upon a rise of CSO3, the result of the sum-of-the-products operation calculated by ANP4 is output. ANP4 20 and ANP5 in the output layer produce the output. For example, the rise in CSO2 at time ④ enters ANP1 and this rise is delayed from DCLK. This is because, where the multiplication of the analog input signal and the digital weight data is performed, the digital data read by WCLK are serial. These serial data are converted to parallel data and thus the rise in CSO2 is delayed by the time required to convert the serial data to parallel data and the time taken for the analog input signal to arrive at the D/A converter, namely, the multiplying process unit. That is, the rise in CSO2 is delayed from the rise in DCLK by the time required to read the serial data. When some data, for example, 16 cycles of WCLK, pass after the rise of DCLK, the data set is completed. When 8 cycles of WCLK pass after the rise in CSO2, the analog multiplication starts.

Figure 26:
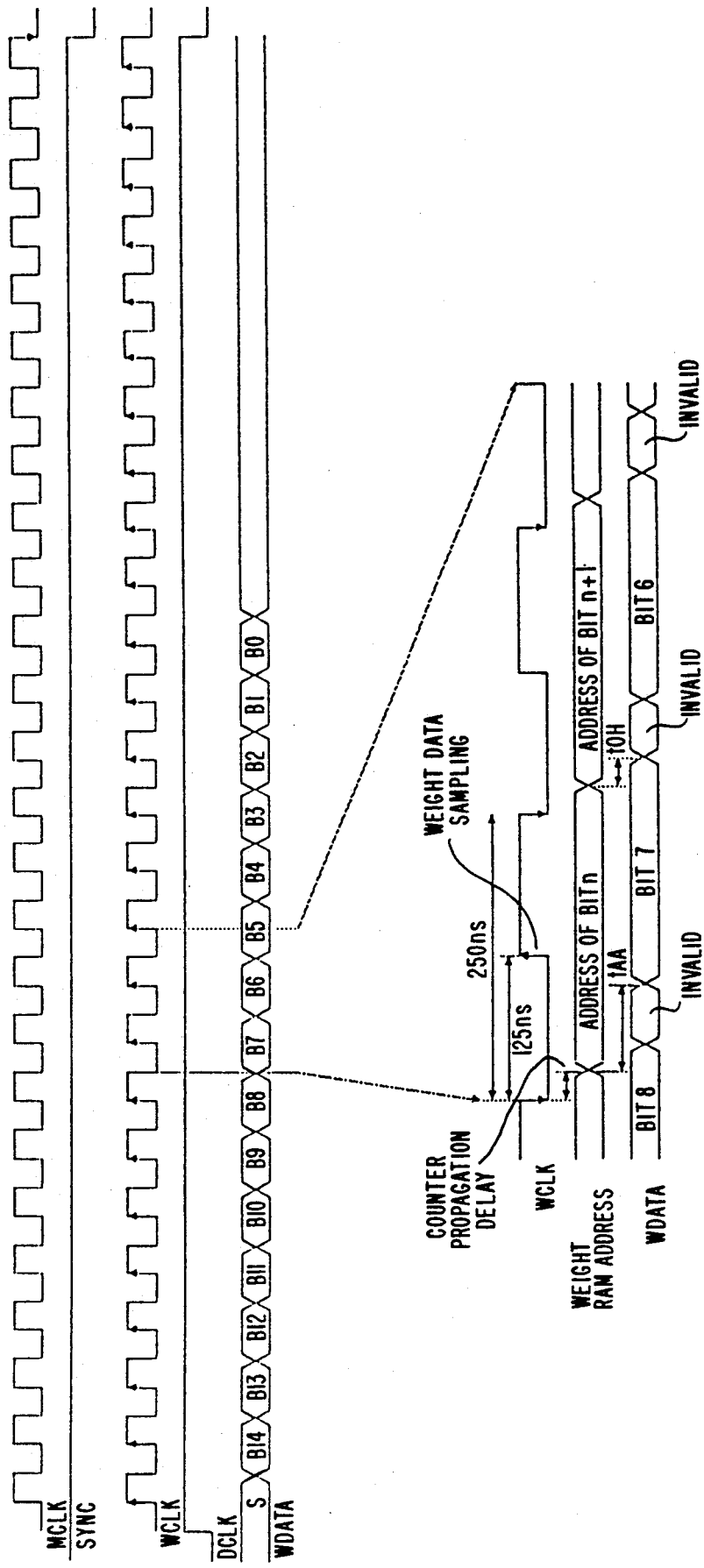
FIG. 26 is a timing chart to read the digital weight data.

FIG. 26 shows a timing chart designating a reading of the digital weight data. It shows the master clock MCLK, synchronizing signal SYNC, weight clock WCLK, data clock DCLK and actual weight data WDATA. The weight data WDATA are read out from the weight memory in a bit serial manner and 16 bit data are input serially. S indicates a sign bit and B14 to B0 show numerical value bits. In FIG. 26, portions BS, B7 and B6 of the weight data WDATA are shown in the lower part of FIG. 26 to indicate their relation with the weight clock WCLK. The period of weight clock WCLK is 250 nsec and the duty ratio is 50%. After the propagation delay of a counter for updating the address provided in the sequencer passes from the fall of WCLK the address is provided to the weight memory. The address of bit n of the weight memory (RAM) stores bit 7 of weight data WDATA. When period tAA has passed after the determination of this address, bit 7 is read out. The change from bit 7 to bit 6 is determined by the change in the clock to the next period and bit 6 is read from the weight memory at the next period. 16 bits of weight data are inputted to ANP and the product of the 16-bit weight data and the analog voltage input to ANP are calculated by the internal D/A converter. The input of the analog voltage starts after the rise of the data clock DCLK. Therefore, it takes time for the analog input voltage to reach the D/A converter. It is necessary to control this time and the time required for setting the digital weight data and to input the analog voltage so that the arrival time of the analog voltage complies with that of the weight data.

For example, the analog input voltage rises at B 7 of the weight data. When bit 0 of the weight data B and all the weight data are determined, the multiplication of the weight data and the analog value starts and the addition can be conducted during the period when DCLK becomes low at the next timing.

Operational timing of ANP is defined by SYNC signal, WCLK, and data DCLK. There is an error in time when the analog input voltage is transmitted from an input terminal of the ANP to the D/A converter and CSI rises after DCLK rises, taking into account the possible difference in rising time between CSI and DCLK.

Figure 27A:
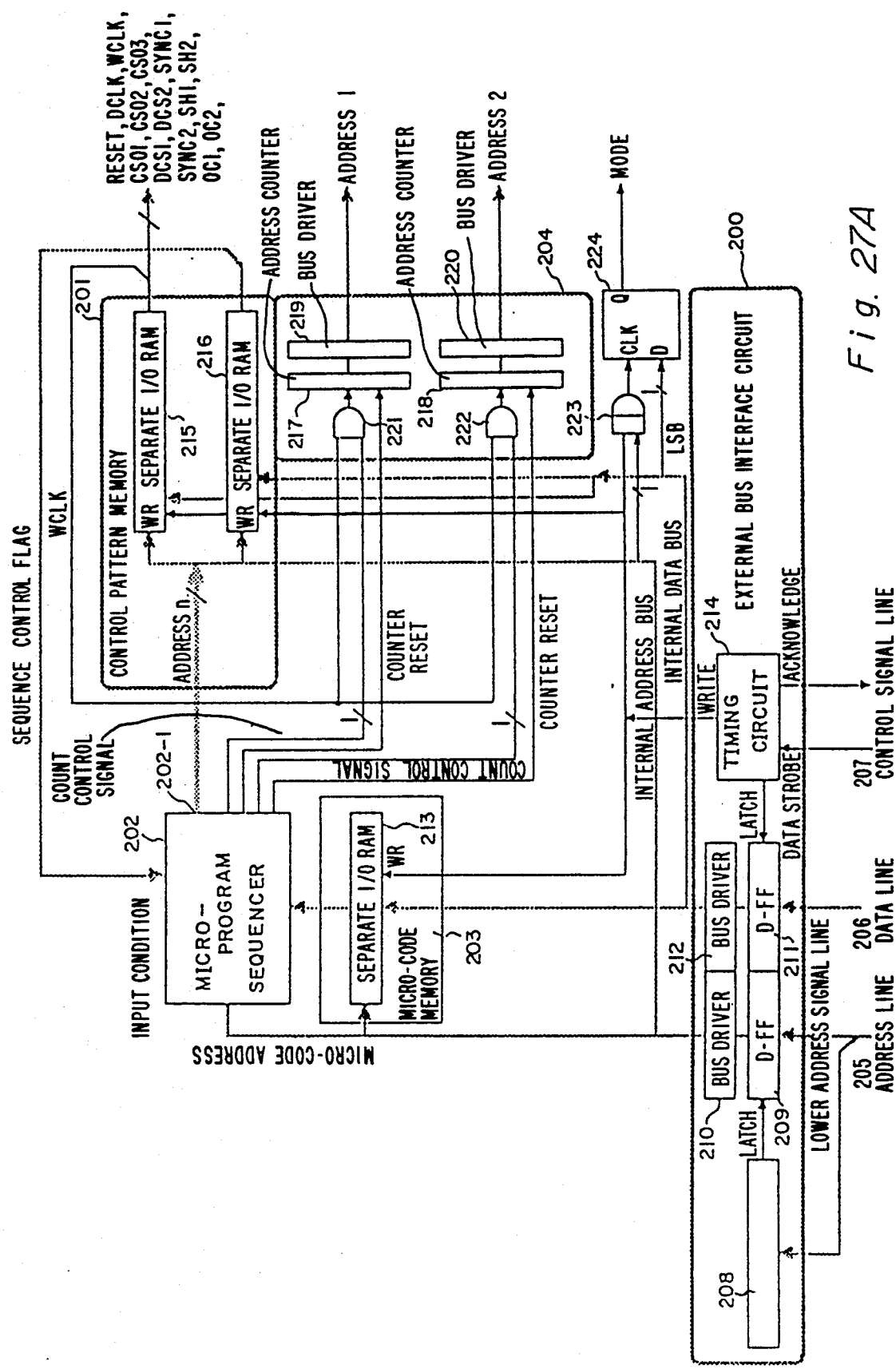
FIG. 27A shows a detailed block diagram of a master control block in the embodiment shown in FIG. 24, FIG. 27B designate a structural view of a pattern memory and micro code memory.

FIG. 27A shows the structure of master control block 181, which controls all the control signals. The main structure element comprises external bus interface circuit 200, control pattern memory 201, micro-program sequencer 202, micro-code memory 203 and address forming unit 204. External bus interface circuit 200 is connected to address line 205, data line 206 and control signal line 207 through an interface connected to the MPU. Upper address comparing circuit 208 and D-FF 209 of the register in external bus interface circuit 200 decodes the upper address given by the MPU. When the upper address is the same as the predetermined one, the lower address and data are set in D-FFs 209 and 211 by using a latch signal from timing circuit 214 as a trigger. The address and data are inputted through respective bus drivers 210 and 212, and through the internal address bus and the internal data bus. The address is used to refer to micro-code memory 203 and to write micro-code into micro-code memory 203 from the MPU side through the data bus. The lower address is applied to micro-program sequencer 202 through bus driver 210 and the MPU can refer to control pattern memory 201 by using a predetermined address.

The data from the MPU or main memory is latched by D-FF 211 through data line 206 and is applied to separate I/O RAM 213 in micro-code memory or separate I/O RAMs 215 and 216 in control pattern memory 201 through bus driver 212. The data strobe signal from the MPU or the memory is added to timing circuit 214 through control signal line 207 and the acknowledge signal is returned, thereby controlling the transmission and receiving of the address and data. Timing circuit 214 controls a latch timing to D-FF 211 and D-FF 209 and controls the writing timing to micro code memory 203 and control pattern memory 201 through the WR signal.

One period of each of the "1" and "0" patterns of a control signal given to the neuron chip, as shown in the timing charts of FIGS. 25A and 25B, are stored in control pattern memory 201 and read out from control pattern memory 201 in accordance with the control of micro-program sequencer 202, thereby producing one period of the patterns. For example, reset signal RESET, data clock DCLK, weight clock WCLK, CSO1, CSO2, CSO3, SYNC1, SYNC2, SH1, SH2, OC1, OC2 are read from the first separate I/O RAM 215 and the control information accompanied by the pattern, namely, the sequence control flag, is read from second separate I/O RAM 21 6. Where the pattern "1000110001" is stored in control pattern memory 201, the address of control pattern memory 201 is controlled to repeat the bit comprising "1and 0" and the repeated pattern is read out from control pattern memory 201. As the control signal patterns are extremely complex, they are pre-stored in separate I/O RAM 215 and the bit pattern is sequentially outputted by designating the address of separate I/O RAM 215 under control of micro-program sequencer 202. Thus, a plurality of the same patterns is repeated, as determined by the address control. One pattern period is called an original pattern. In order to repeat the original pattern, specific information is fed back to micro-program sequencer 202 from control memory 201. The sequencer control flag within the second separate I/O RAM 216 is inputted to micro-program sequencer 202, so that the addressing is returned to the head address in which the original pattern is stored in the first I/O RAM 215. Thus, the original pattern is repeated. Micro-program sequencer 202 transmits an address signal to separate I/O RAM 215 through general purpose port output line 202-1 until the required condition is satisfied. Normally, the address is incremented but the address signal is returned to the head address in which the original pattern is stored. As a result, a predetermined control pattern is repeatedly outputted from separate I/O RAM 215.

Figure 27B:
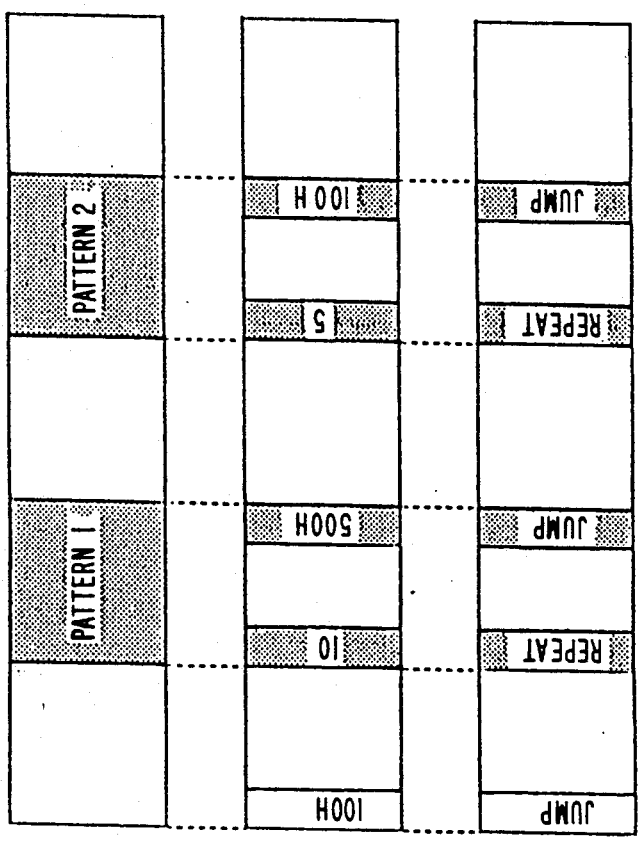

FIG. 27B shows the relationship between the information of memories 201 and 203 for controlling master control block 181. In FIG. 27B, control pattern memory 1 corresponds to the first separate I/O RAM 215 and control pattern memory 2 corresponds to the second separate I/O RAM 216. The control code of sequencer 202 is stored in micro-code memory 203, which stores mainly Jump commands and Repeat commands. Repeat commands are stored in a predetermined address and the number of the control pattern repetition in the control pattern memory is stored in the corresponding address of control pattern memory 2 in accordance with the repetition command. When this number reaches "10", ten repetitions are carried out. In this way, the address increases until it reaches a jump command in micro-code memory 203 and the address jumps to 500 H by the second jump in micro-code memory 203, thereby producing Pattern 2 which is repeated 5 times. The addresses jump to "100H" again at the third Jump in the micro-code memory 203, thereby outputting Pattern 1. Thus, the original pattern is repeated and read from control pattern memory 1.

WCLK is formed in synchronization with the reading clock of the address referred to by control pattern memory 201 and information is read out from weight memories 185 and 186 in sychronization with WCLK. The addresses of weight memories 185 and 186 are accessed by the address signal outputted from addresses 1 and 2 of address forming unit 204. Addresses 1 and 2 are separated, address 1 being for the hidden layer and address 2 being for the output layer. The weight data applied to the ANP in the hidden layer are read out from weight memory 185 designated by address 1. The weight data applied to the ANP in the output layer are read out from weight memory 186 designated by address 2. The contents of weight memories 185 and 186 are stored bit by bit in the increasing direction of the address and it is necessary to apply a count control signal to address counters 217 and 218 from micro-program sequencer 202. Incrementing addresses are applied sequentially to weight memories 185 and 186 through bus drivers 219 and 220 from address counters 217 and 218. A plurality of weight data is read out from weight memories 185 and 186.

WCLK from the first separate I/O RAM 215 and a counter control signal from micro-program sequence 202 are applied to AND circuits 221 and 222 in address forming unit 204. When the counter control signal is high, the address counter is updated by WCLK. Address counters 217 and 218 are incremented from 1 to 16 bits of WCLK. The remaining 17 to 26 bits of WCLK are inhibitted by turning the counter control signal low and stopping incrementing address counter 217 and 218. A counter reset signal is transmitted to AND circuits 221 and 222 from micro-program sequencer 202 in synchronization with SYNC1 and SYNC2 and reset address counters 217 and 218. The address is returned to the head address of weight memories 185 and 186. The mode signal outputted from master control block 181 comprises a mode designating an ordinary use of the weight memory, namely, separating the weight memory from the MPU data bus to apply the weight data to the ANP and a mode in which the weight memory is connected to MPU data bus and is referred to by the MPU.

A mode signal is formed when the LSB of the data from the MPU is input to flip-flop 224 by using as a trigger signal an AND signal output from AND circuit 223 when a bit of the lower address and write signal WR from timing circuit 214 is applied to AND circuit 223. When the mode signal is 0, the weight memory is for an ordinary use.

Write signal WR and a bit of the internal address bus are input to a clock terminal flip-flop 224 through AND circuit 223 and the LSB of the internal data bus is input to the data terminal of flip-flop 224. The upper address signal is input to comparing circuit 208 and it is determined whether master control block 181 is selected. If it is, the lower address and data are applied to DFFs 209 and 211. This interface operation is applied to the other devices connected to the MPU and the weight memory supplies the weight data to the ANP during a normal period, and if the weight memory is directly connected to the data bus of the MPU, bus competition is caused. To prevent this, the mode is determined as 1 when the LSB of the data bus is supplied to the flip-flop 224, thereby preventing the weight memory from being chip-selected and producing the data on the data bus from weight memory. The internal address bus designates the addresses of either micro-code memory 203 or control pattern memory 201 by using the internal address bus. The desired data is written into the accessed address to the internal data bus. Thus, the program stored in micro-program sequencer 202 is selected, and the programs stored in micro-code memory 203 and separate I/O RAM 216 are changed and the control pattern stored in separate I/O RAM 215 is changed.

Figure 28A:
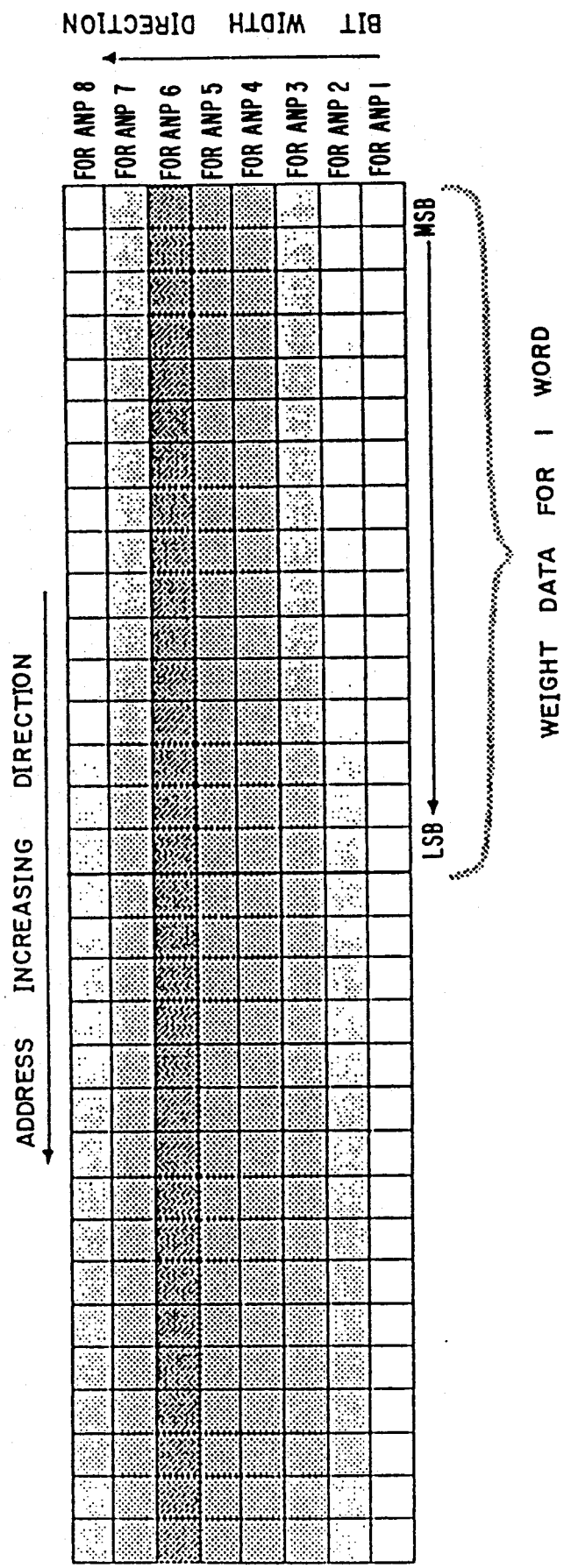
FIG. 28A is an explanatory view for storing data into the weight data memory.

FIG. 28A shows the data storage structure of weight data memory 230. The 8 bits in a column direction are the 8-bit data stored in the same address and thus, bits 1, 2 ... 8 are for ANP1, ANP2 ... ANP8, respectively. In the row direction, the addresses are different and increase from right to left. The weight data comprise 16 bits including the sign bit and these bits are stored in addresses from the small address value to a large address value. MSB is the sign bit and the other 15 bits are numerical value bits. When the address provided by micro-program sequencer 202 increments in synchronization with WCK, one word of the weight data, namely 16 bits, is read out from MSB to LSB, and is thereby applied simultaneously to 8 ANPs. As the data is stored in the increasing direction of the address, the address count is conducted for the weight data. Namely, one word of weight data from MSB to LSB are counted then one item of weight data is provided under the control of the weight data memory. Control is also conducted by micro-program sequencer 202.

Figure 28B:
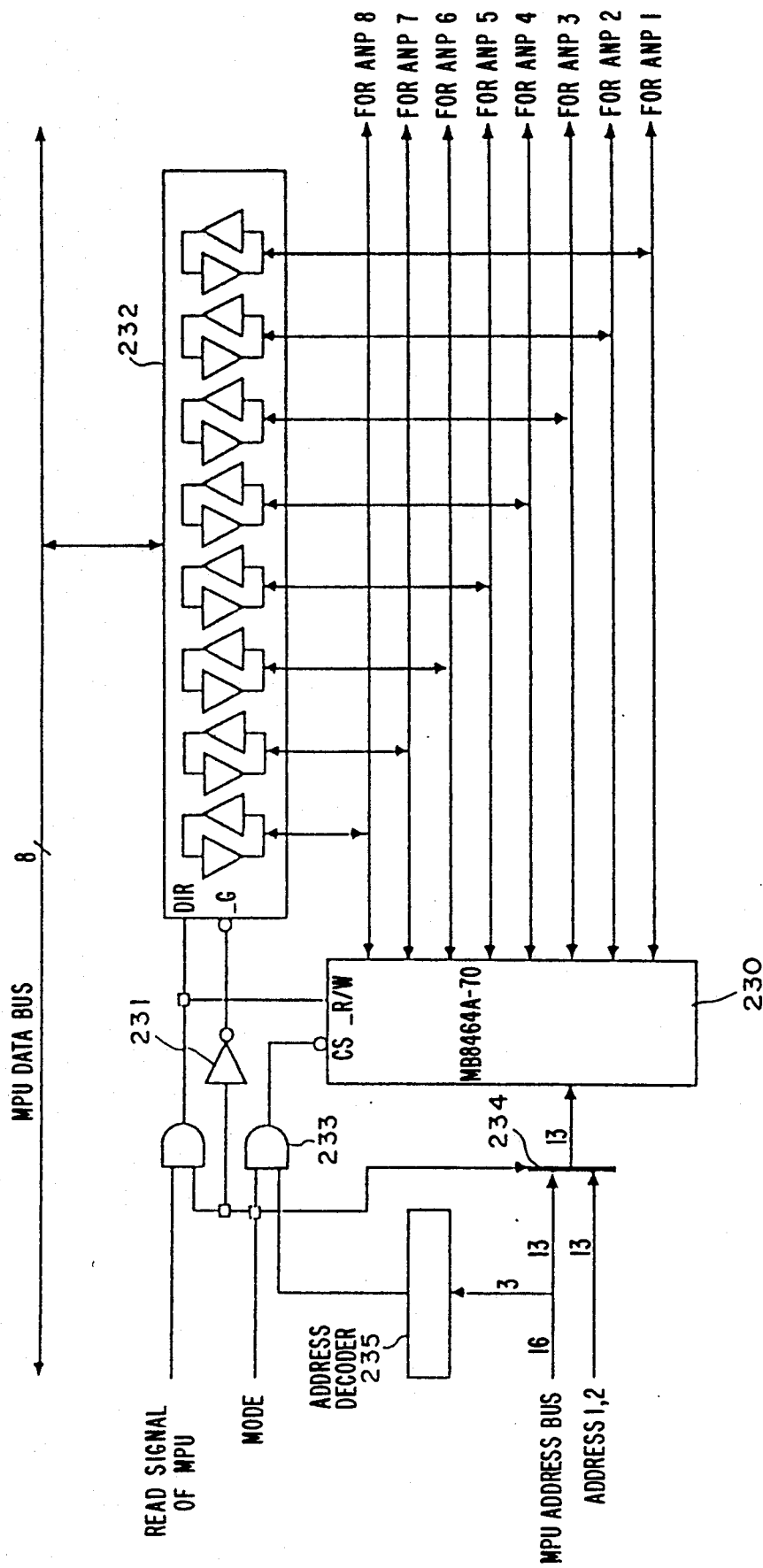
FIG. 28B shows a detailed structural view of weight data memory.

FIG. 28B shows a circuit of weight memory blocks 185 and 186. Memory 230 comprises a RAM named MB8464A-70. The output comprises 8 bits corresponding to ANP1 to ANP8. Basically, either the bus signal line viewed from the MPU bus or addresses 1 and 2 viewed from master control block 181 are used. Addresses 1 and 2 are the same as addresses 1 and 2 in FIG. 19A. They are input, incrementing in synchronization with WCLK. 8-bit data is simultaneously read out and respective bits are simultaneously applied to ANP1 to ANP8.

When the mode signal is 0, weight memory 230 is chip selected through AND gate 233. Addresses 1 and 2 from micro-program sequencer 202 become effective at multiplexer 234. Weight data from weight memory 230 are transmitted to ANPs 1 to 8. On the other hand, the output of the reverse circuit 231 is high, thus disenabling tri-state bus transceiver 232 and preventing the weight memory 230 from being output to the MPU.

If the data is output to the MPU, the mode signal is turned to 1 and memory 230 is chip selected through address decoder 235 according to appropriate address information from the MPU and memory 230 receives an address signal from MPU. When the mode signal is 1, memory 230 is selected through address decoder 235 by address information from MPU, thereby producing the output to MPU. When the mode signal "1" is read by MPU bus or written in memory 230 from the bus, the read and write direction is determined by that read signal on the data line transmitted from MPU through AND gate 236.

The learning algorithm will now be explained.

A flowchart of a learning algorithm using the back propagation utilized in the present invention. The learning is conducted as follows. All the information to be learned is input to a neural network, namely, a layered type network constituted of ANPs, through an input control circuit, not shown, from the MPU. The input signal is provided at the network output through the input side circuit, the hidden layer and the output layer. It is further applied to the MPU through an A/D converter. The learning algorithm exists in the main storage on the side of the MPU. The teacher signal is obtained from main storage and transmitted to the MPU and the error between the output of the network and the teacher signal is examined. If the error is large, the MPU changes the weight data representing the strength of the network's connection to a direction such that the right output is produced by the network. The weight data is applied to ANPs in respective layers through weight memory 230.

Figure 29:
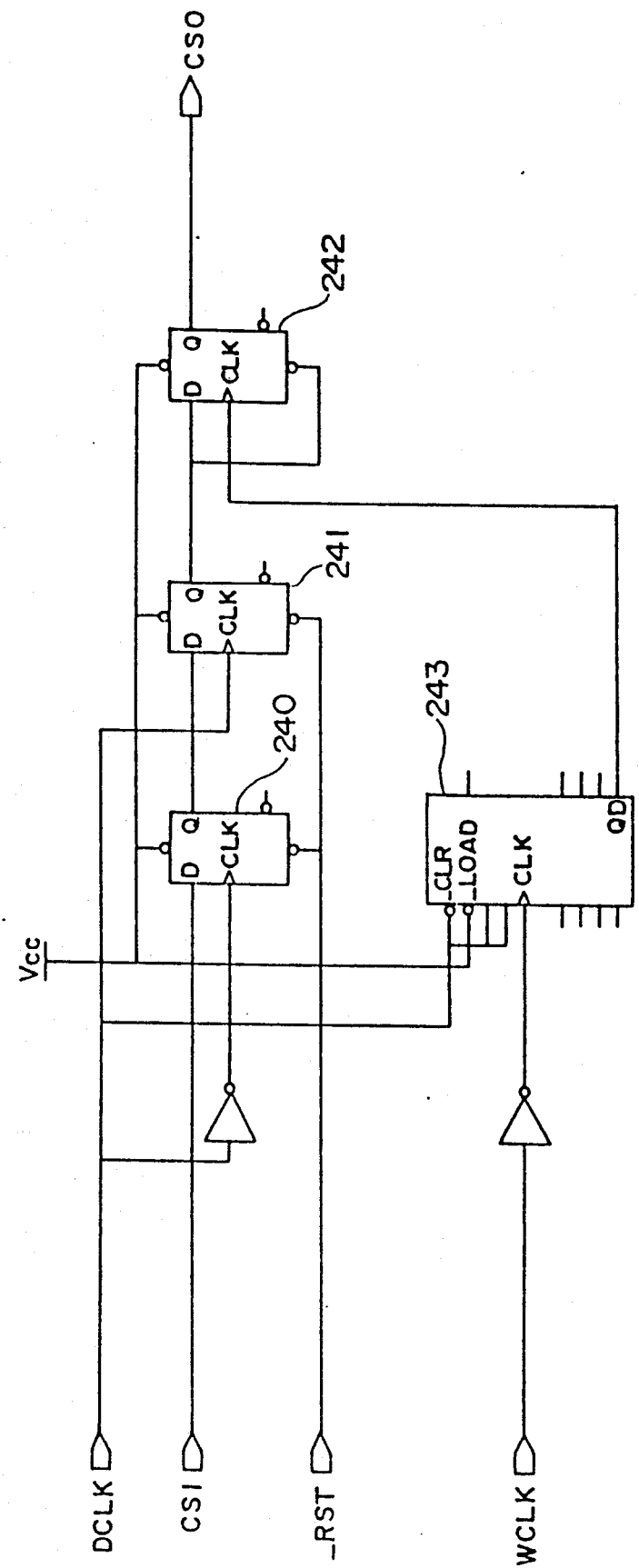
FIG. 29 designate a detailed circuit diagram of a daisy circuit.

FIG. 29 shows the structure of the input side daisy circuits 173 and 174. 240, 241 and 242 are D-type flip-flops. The data input to the D terminal is set at a rise of the DCLK signal and the output Q is turned to the state "1". The first flip-flop 240 sets the CSI signal at the fall of DCLK and in the next rise of DCLK, the output signal is set in the second flip-flop 241.

The output of the second flip-flop is applied to the D terminal of the third flip-flop 242. The clock signal for setting the input is outputted from 4-bit counter 243. Counter 243 is triggered at the fall of WCLK and cleared at the fall of DCLK. Therefore, at the fall of DCLK, counter 243 becomes all 0. The fall of WCLK is input 8 times and thereafter the QD signal of the upper bit becomes high, thereby enabling a high signal to be output as a CSO from flip-flop 242. The output of flip-flop 241 becomes 0, thereby clearing CSO. In accordance with such operation, the daisy operation is conducted, in which CSO is output at a predetermined time corresponding to 8 pulses of WCLK after CSI falls.

Figure 30:
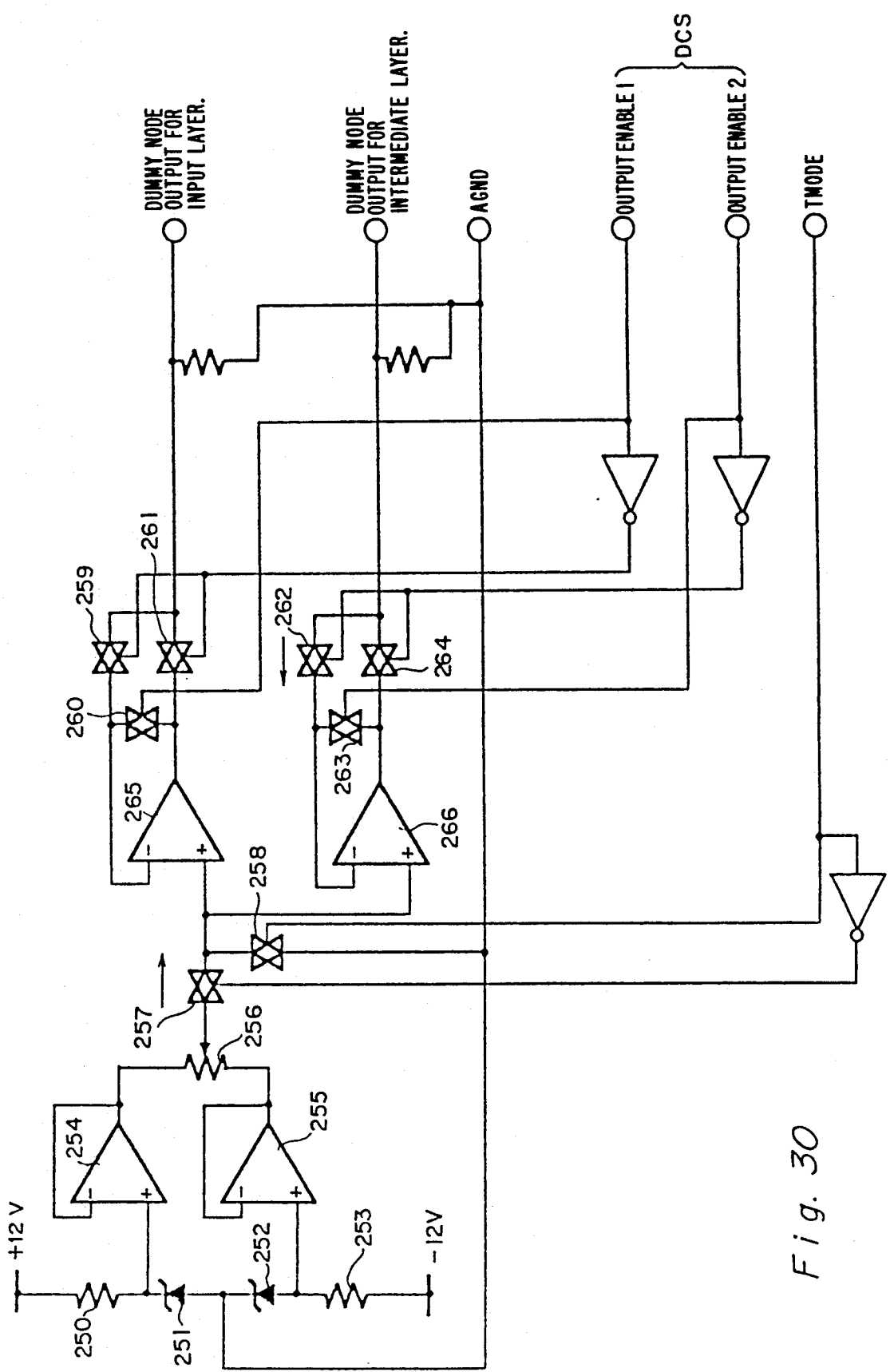
FIG. 30 shows a detailed circuit diagram of a max. value node circuit.

FIG. 30 shows max. value node circuit 187 forming a neuron of the dummy node. Resistor 250, zener diodes 251 and 252, resistor 253, and voltage followers 254 and 255, form a circuit for providing a constant voltage. When a current flows between 12 volts and −12 volts through resistors 250 and 253 and Zener diodes 251 and 252, then +7 volts and −7 volts are respectively formed at the input of voltage followers 254 and 255. These voltages are outputted to output resistor 256, forming voltage followers 254 and 255. The operation is controlled by using analog switches 257 through 264 such that two constant voltages are outputted in a time divisional manner. When the T-mode signal is 0, a constant voltage is supplied to the next voltage follower 265 through analog switch 257. When the T-mode is "1", that is, in test mode, the output of analog switch 258 is suppressed so that the analog ground and "0" volts is input to voltage follower 265. In the test mode, the offset on the bus is notified to the MPU. Voltage follower 265 is enabled by the switch control at the output portion. When the output enable is turned to "1", analog switch 260 is turned on and operates as the voltage follower and produces the output. However, at this time the dummy node does not produce an output. Conversely, when the output enable is 0, an output is produced at the dummy node. Analog switch 260 and the switch control of the output are controlled by output enables 1 or 2 and is "0" enable. When output enable 1 or 2 is 0, a constant voltage is output at a dummy node. The upper dummy node output is for the input layer and the lower dummy node output is for the intermediate layer. The output voltages of these dummy nodes are fixed to the appropriate value and can be used as threshold voltages. Zener diodes 251 and 252 produce constant voltages during the reversed prior state. These constant voltages can be changed from +7 volts to −7 volts. The enable states of output enables 1 and 2 are determined by dummy node control signal DCS from master control block 181 to avoid a collision between the output voltages from this and other ANPs connected to the analog bus.

Figure 31A:
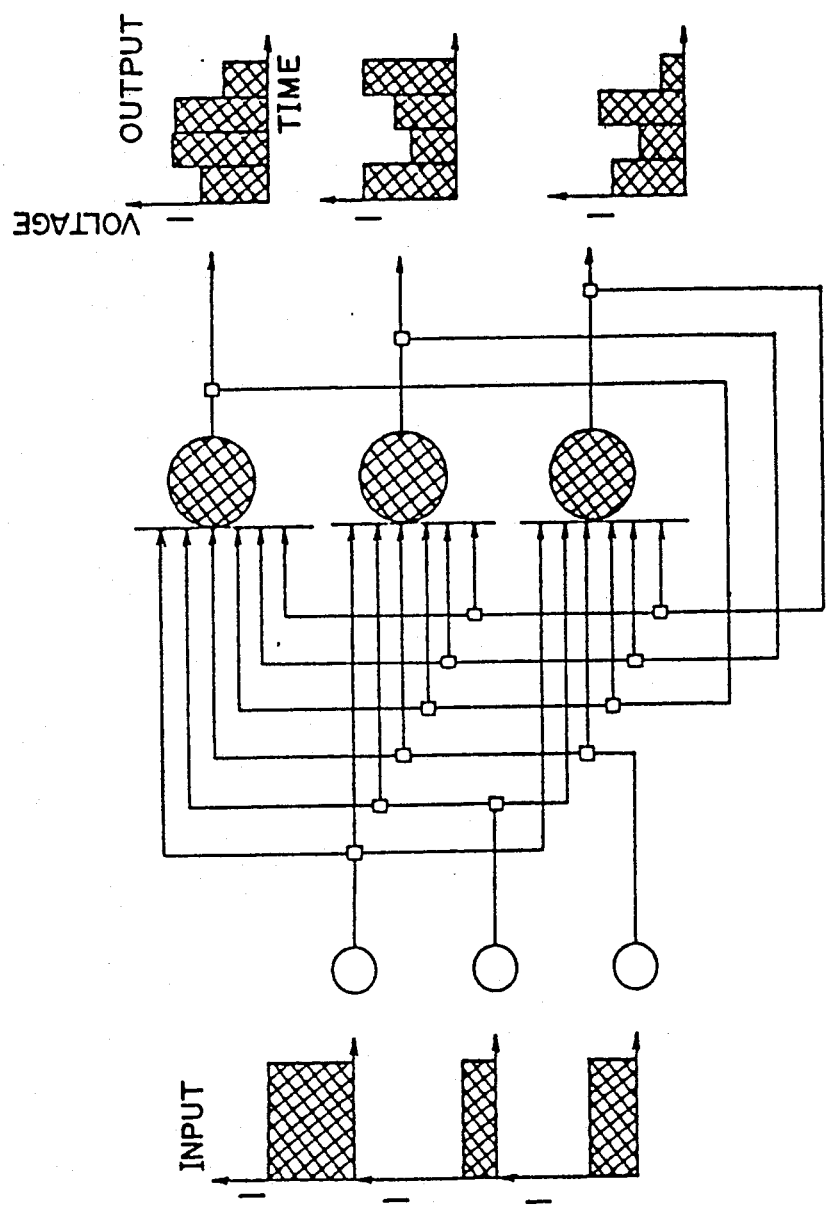
FIG. 31A shows a conceptional view for explaining a feedback type network.

FIG. 31A is a conceptual view of a feedback type network. In this type of network an input exists basically and the feedback path through which the signal outputted from the self part is returned is provided. The feedback type apparatus is used for the case in which one layer in the layered type neural network is used in a time divisional multiplexed manner. The input and output signals of the ANP are provided in a time divisional manner and the output data of the same ANP are sequentially outputted at every constant sequence cycle at the output of respective ANPs and one of the sequence cycles operates sequentially as the input layer, the intermediate layer and the output layer.

Figure 31B:
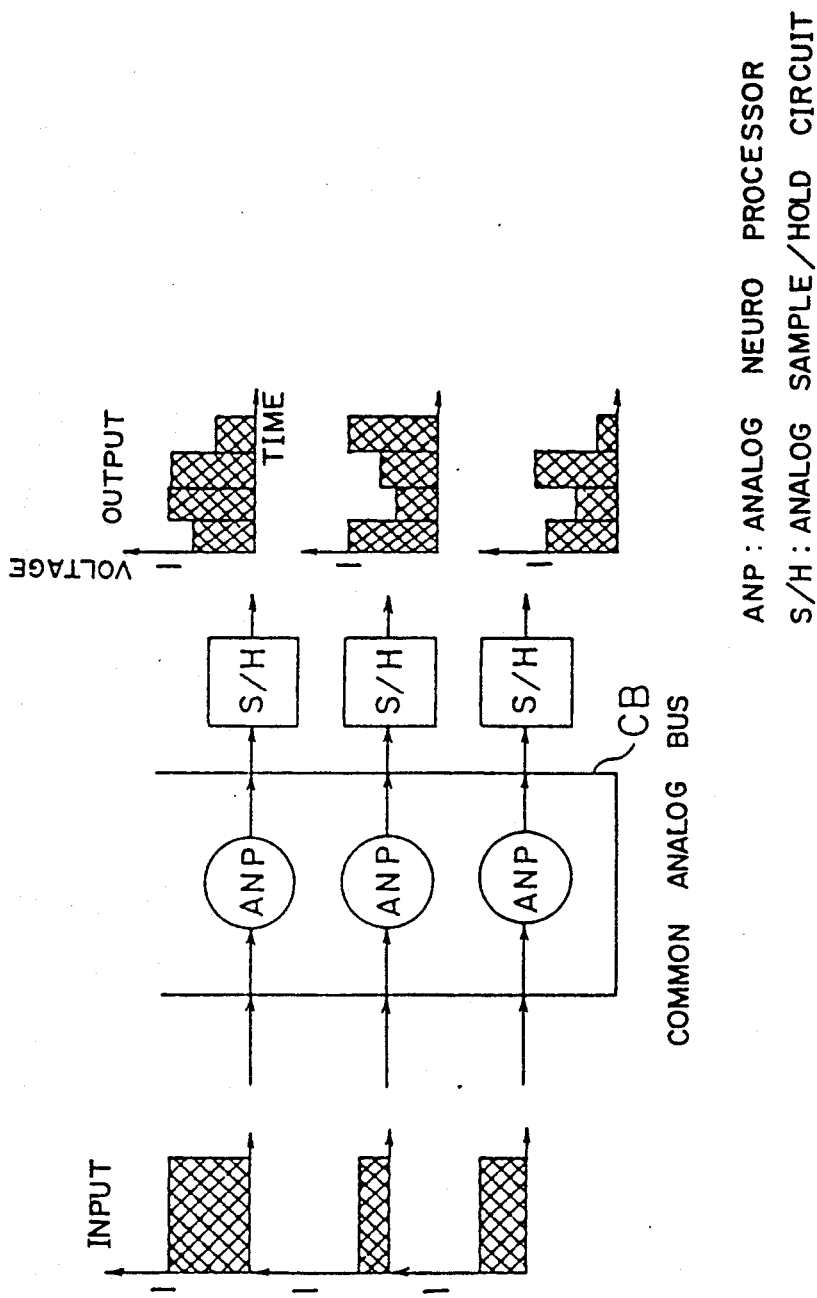
FIG. 31B shows an explanatory view of the case in which the feedback type network is formed by a neuron computer of the present invention.

According to the embodiment of the present invention, as shown in FIG. 31B, the feedback type is realized by the common analog bus CB, thereby forming a feedback path. The output obtained by the calculation of the self ANP is fed back to respective ANPs through the feedback path, and this feedback operation is repeated.

Figure 32:
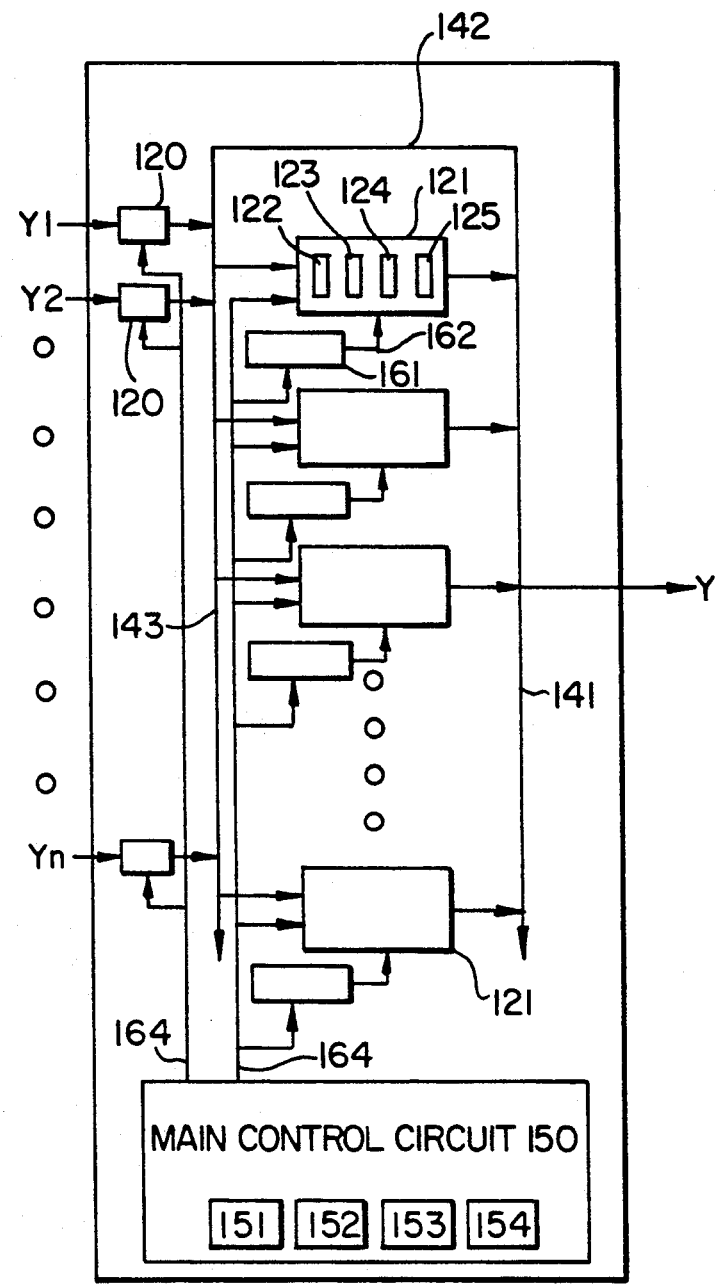
FIG. 32 shows a block diagram of an embodiment of a feedback type network.

FIG. 32 shows a view of an arrangement of the first embodiment of the feedback type network. In FIG. 32, 121 corresponds to a plurality of basic units 1 forming a processing layer. These basic units 121 similarly have multiplying units 122, accumulating units 123 and threshold values elements 124, and sometimes have output holding units 125. Similarly, the inputs and outputs of basic units 121 are formed of analog signals. An electric connection is made between the output portions of respective basic units 121 and the input portions of basic units 121 through analog buses 141, 142 and 143. The weights determined corresponding to respective connections form a layered network in an equivalent manner, namely, a Hopfield type network.

142 is an analog bus and is a common line provided for electrically connecting the output portion and input portion to form a feed-back line. Main control circuit 150, which controls the data transfer, comprises driving unit selecting means 151, weight setting means 152, threshold value process initiating means 153 and output value transmitting means 154.

Driving unit selecting means 151 sequentially selects basic units 121. Output value transmitting means 154 feeds back the final output of the analog signal maintained by the maintaining portion of the output of selected basic unit 121 to multiplying process unit 122 of basic unit 121 through analog bus 142 in accordance with a transmission type of a time division, and in synchronization with the above selection process. When multiplying portion 122 of respective basic units 121 receives the input and sequentially selects the weights corresponding to respective connections determined by weight setting determining means 152 and performs a multiplication process on the input and the weight. Adding portion 123 sequentially accumulates the multiplication result obtained by multiplying unit 122. When it is confirmed that all the accumulation processes concerning basic unit 121 in the process layer are completed, threshold value process initiating unit 153 initiates threshold value process unit 124 of basic units 121 and applies a constant threshold voltage to perform a calculation of a sigmoid function.

This process is repeated cyclically by the predetermined number. This data transfer system can provide an output pattern corresponding to the input pattern as the output of the layered network in which the layer is used in a time divisional multiplexed manner.

This embodiment discloses the network structure data process apparatus comprising a single layer. In order to form the network structure data process apparatus of a multi-layered structure by using a single layer structure, analog bus 142 is used as a common line. It feeds back the output of basic unit 121 of a single layer, thereby connecting the output of respective basic units 121 to the input portion of the basic unit 121.

Next, an operation of the embodiment shown in FIG. 32 is explained in accordance with a timing chart shown in FIG. 33A.

In response to a request for a conversion to the output pattern, main control circuit 150 sequentially transmits a control signal of CSI to input side circuits 120 and sequentially selects a plurality of input side circuits 120. FIG. 33A designates the selection process. The input side circuit 120 thus selected, sequentially transmits analog signal $Y_I$ provided as the input pattern onto analog bus 143. Accordingly, as shown in FIG. 33A, analog signal $Y_I$ is sequentially transmitted onto analog bus 143 by the number of input side circuits 120.

As shown in the timing chart in FIG. 33B, multiplication portion 122 of respective basic units 121 receives analog signal $Y_I$ and then carries out a multiplication by using weight $W_I$ of weight holding portion 8 to be set by main control circuit 150. Accumulation unit 123 of respective basic units 121 sequentially accumulates the multiplication result to be obtained by every selection of input side circuits 120. When all the selections of input side circuits 120 are completed, all the accumulation processes are completed. At that time, threshold value portion 124 of respective basic units 121 obtains the final output value Y which is the final output of the arithmetic operation of basic units 121.

The final output value Y thus obtained is maintained inside the basic unit. Output switch portion 113 of respective basic units 121 receives the output control signal as CSI transmitted from main control circuit 150 and is then sequentially turned on, thereby feeding back the maintained final output value of the analog signal to multiplication unit 122 of basic unit 121 through analog bus 142. By this process, the final output values of basic units 121 in the input layer are transmitted in a time divisional transmission format for basic units 121 in the intermediate layer in an equivalent manner. By repeating the same process for all of basic units 121, the final output value Y corresponding to the output layer is obtained. FIG. 33A shows a timing chart of the output control signal provided to basic units 121 in accordance with the output control signal $Y_i$ to be input to input side circuit 120 and a timing chart of the analog signal of the final output value Y on analog bus 142.

Figure 34:
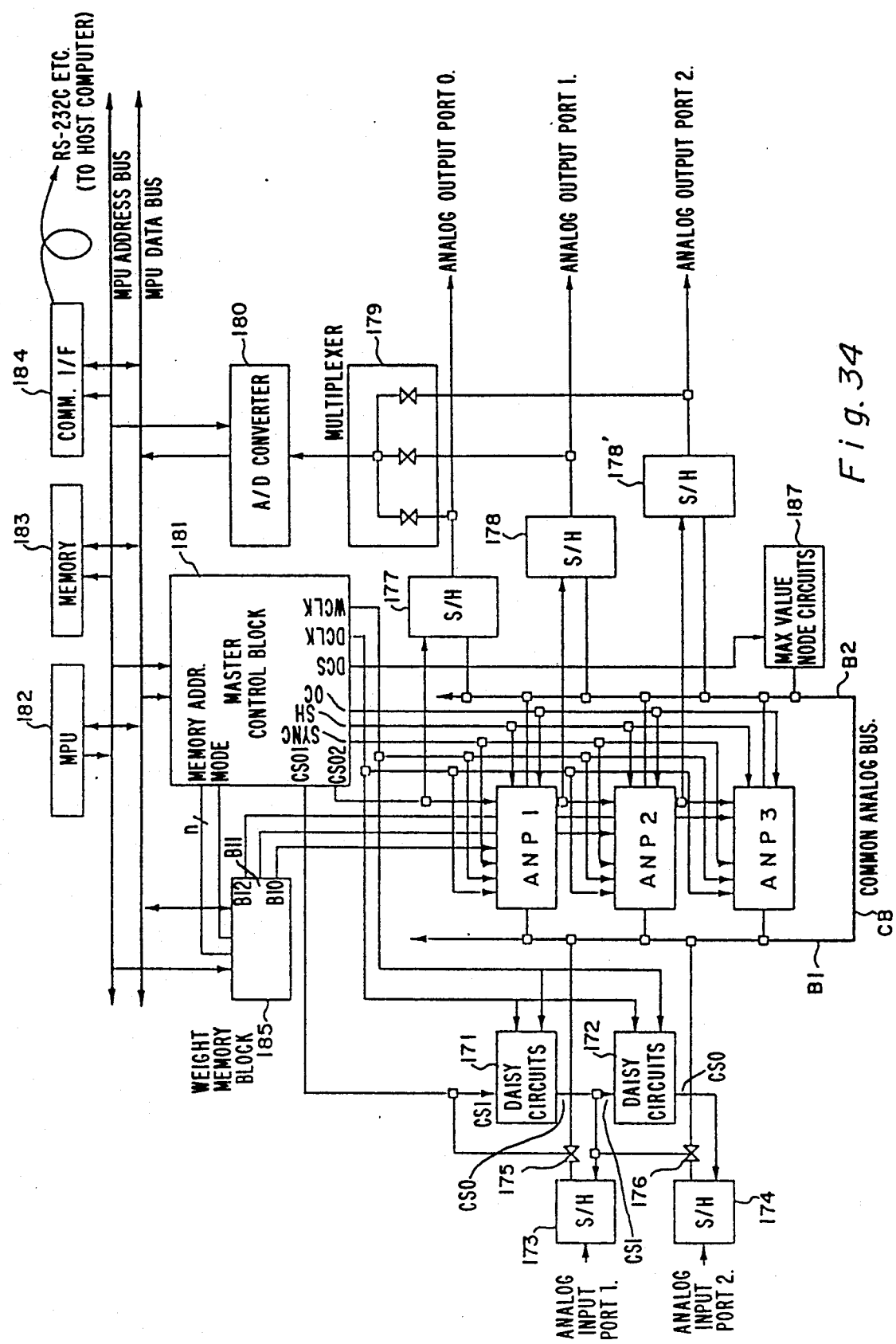
FIG. 34 shows a detailed circuit of an embodiment formed by a feedback type network using a neuron computer of the present invention.

As compared with the layered network, in the embodiment shown in FIG. 34 the input pattern cannot be applied continuously, but the layered network can be formed in a simple structure, thereby greatly reducing the layered network when it is formed of a chip.

FIG. 34 shows an embodiment of a neuron computer of the present invention which is realized by a feedback type network which operates as a layered type network. The sum-of-the-products operation is carried out for the time divisional analog input signal from analog input ports 1 and 2 in ANPs 1, 2 and 3 and ANPs 1 and 2, which operates as the intermediate layer. Output is produced in a time divisional manner from ANPs 1, 2 and 3 to analog bus B2. The output signal is fed back to analog bus B1 through analog common bus CB of a feedback part and again the sum-of-the-product products operation is applied to the feedback signal at ANPs 1, 2 and 3. ANPs 1, 2 and 3 are made to operate as the output layer, thereby realizing a layered type network. Max. value node circuit 187 receives DCS output of the master control block and produces a dummy signal to analog bus B2. DCLK and WCLK are respectively inputted to daisy circuit 171 from the master control block to define the timing of the rise and fall of the CSI signal.

Figure 35A:
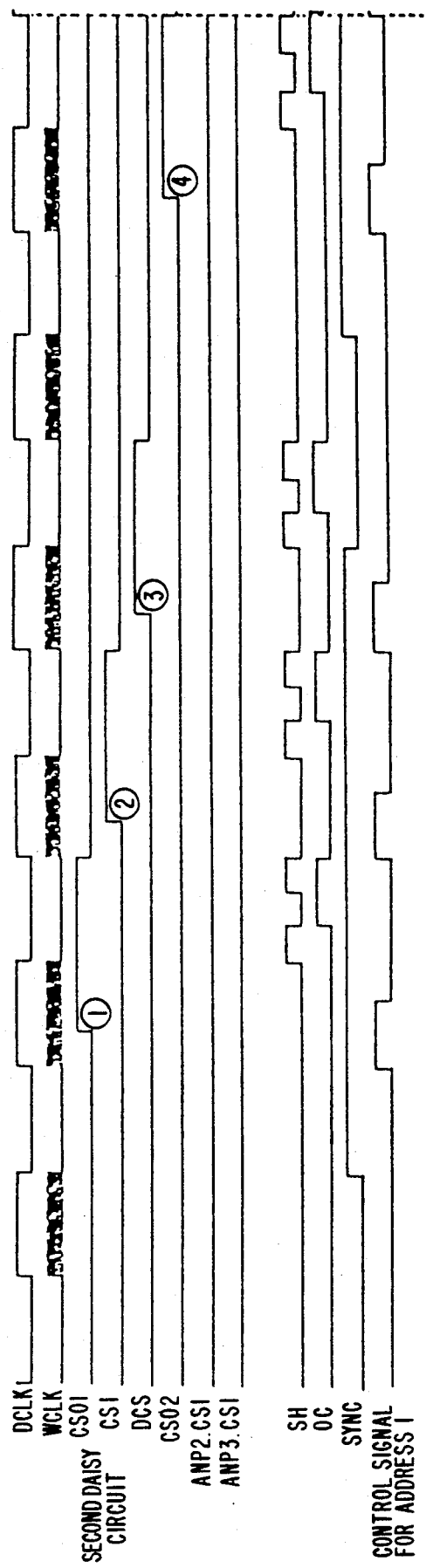
FIGS. 35A and 35B are timing charts for representing a signal process of the embodiment in FIG. 34.
Figure 35B:
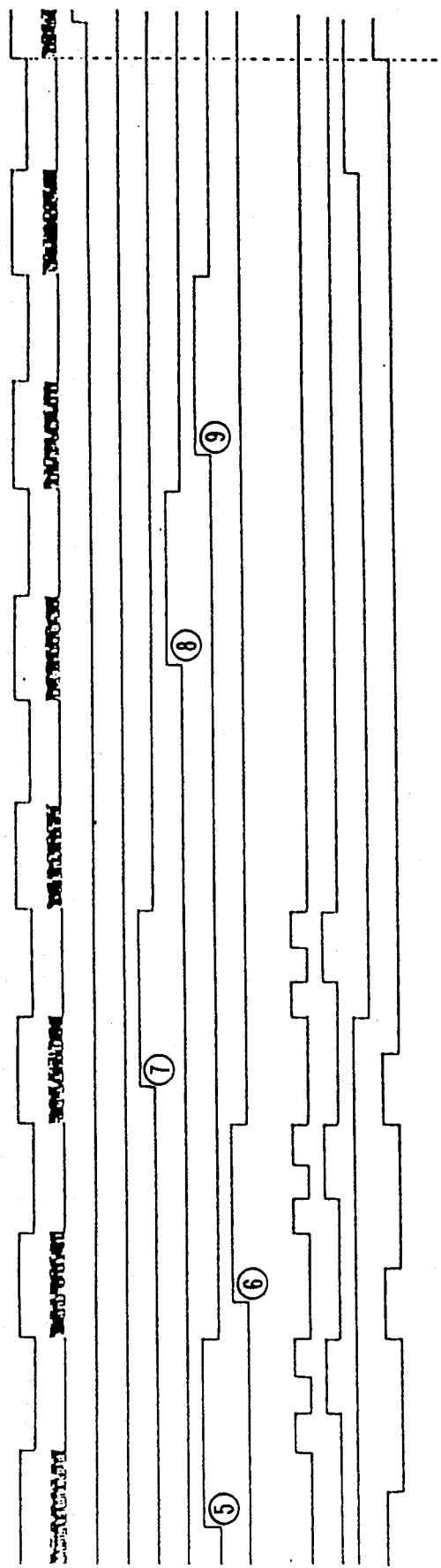

FIGS. 35A and 35B show a timing chart of the feedback type layered network. WCLK is produced only during the rise of DCLK. After the rise of DCLK, the analog signal is made constant and the weight data is input serially. CSO1 from master control block 181 is input to daisy circuit 171 at a timing before they are arranged in parallel and, as shown by ①, the signal rises. At this time the analog signal held in the sample/hold (S/H) circuit after the analog signal is input from analog input port 1, appears on the analog bus B1 through analog switch 175 and the sum-of-the-products operation is conducted at ANPs 1, 2 and 3. Upon the input of the next DCLK, the CSI to daisy circuit 172 rises as shown by time ②. The signal from the sample/hold S/H circuit for holding the input signal from the analog input port appears on the analog bus B1 through the analog switch and the second sum-of-the-products operation is conducted at ANPs 1, 2 and 3. Further, after DCLK is input in the next timing, the dummy signal DCS is produced from the master control block shown by time ③ and the third sum-of-the-products operation for the fixed voltage is carried out at ANPs 1, 2 and 3. While the next SYNC signal rises, the sum-ofthe-products operation is carried out by ANPs 1, 2 and 3 for the output layer. Only during the high period of the address count inhibiting signal applied to the address 1 of the weight memory, WCLK for counting the address counter is enable and the count of the address counter is prohibited at times other than those recited above. Next, when CSO2 is applied to ANP1 from the master control block, ANP1 produces the result of the previous sum-of-the-products to the analog bus B2 and the result is fed back to the analog bus B1 through analog common bus CB. Then, as shown in time ④, the sum-of-the-products operation is again carried out at ANPs 1, 2 and 3. After CSO2 is delayed by a predetermined period in a daisy chain circuit in the ANP, the input signal CSI is applied to ANP2 as shown by time ⑤, and this time the output signal from the ANP is applied to ANP1 again through analog bus B2, common bus CB and analog buses A1 and B1, thereby performing the sum-of-the-products operation. Similarly, after CSO from ANP2 is delayed by the predetermined period, the delayed CSO becomes a CSI signal of ANP3. When the CSI signal rises as shown by time ⑥, the output signal of ANP3 is again fed back to ANPs 1, 2 and 3 through analog bus B2, common bus CB and analog bus B1, thereby performing the sum-of-the-products operation. Similarly, as shown by time ⑦, when the signal DCS from the dummy node rises, the sum-of-the-products operation is carried out for the fixed voltage in ANPs 1, 2 and 3. Upon the following rise of the CSO2 signal, the output is produced from ANPs 1 and 2 through the S/H circuit as shown by times ⑧ and ⑨. Analog input port 2 does not produce the signal.

ANPs 1, 2 and 3 operate as the intermediate layer in times ①, ② and ③ and as the output layer in times ④, ⑤ and ⑥. Accordingly, only one layer of ANPs 1, 2 and 3 form a layered type network.

Possibility of Utilizing the Invention in Industry

In the invention described above, the data process of the network structure data process apparatus, whose principle structure is shown in FIG. 7, is realized by using weight information predetermined by the learning process method according to the present invention.

Various implementing methods are considered for the learning process of the present invention. In one practical method, a network structure data processing apparatus (FIG. 11) exclusively for setting the weight in the computer and the weight setting apparatus obtains the learning algorithm according to the present invention and the obtained weight is output from weight data memory 150e of actual network structure data process apparatus shown in FIG. 21, thus producing an output. According to another implementing system, a program for performing the learning process algorithm according to the present invention is implemented in host computer 150y for controlling the main control circuit 150 explained in FIG. 21. Host computer 150y calculates the weight updating quantity by using the actual network structure data process apparatus to obtain the new weight. The new weight is set in data memory 150e, thereby executing a learning. The finally determined weight is then set in weight memory 150e as the weight upon executing the data process. At this time, the previous and two-previous weight updating quantities necessary for the learning process are developed in a main memory of a host computer 150y, for example.

The explanation is made by referring to the above embodiment but the present invention is not limited to this embodiment. The detailed numerical value relating to the layered network and the control parameter used for explanation are just for convenience of explanation.

The present invention can learn the weight value of the layered network in a smaller number of repetitions than in the prior art. Therefore, the network structure data process unit is practical. The present invention can minimize the difference and inconsistency between the teacher signal and the output signal as compared with the prior art technology. Thus, the present invention can increase the accuracy of the data process function according to the network structure data process apparatus.

We claim:

1. A learning process system for use with a neural network comprising an input layer including a first plurality of basic units, each including a basic unit input each connected to receive an input signal and a basic unit output each connected to receive a weight signal to be multiplied by the input signal received by the basic unit input, connected to provide a sum-of-products and connected to convert the sum-of-products by a threshold value function to provide a final result signal at a basic unit output, at least one intermediate layer including a second plurality of basic units, each including a basic unit input each connected to receive another input signal and a basic unit output each connected to receive the weight signal to be multiplied by the another input signal received by the basic unit input, connected to provide another sum-of-products and connected to convert the another sum-of-products by another threshold value function to provide another final result signal at the basic unit output, an output layer including at least one basic unit, each including a basic unit input each connected to receive a further input signal and a basic unit output each connected to receive the weight signal to be multiplied by the further input signal received by the basic unit input, connected to provide a further sum-of-products and connected to convert the further sum-of-products by a further threshold value function to provide a further final result signal at the basic unit output, and internal connections from the basic unit outputs of the input layer to the basic unit inputs of the at least one intermediate layer and from the basic unit outputs of the at least one intermediate layer to the basic unit inputs of the output layer, said learning process system comprising:

output signal providing means for, when a plurality of predetermined input signals are supplied to the input layer basic unit inputs, receiving first output signals from the basic unit output of each at least one basic unit of the output layer and for providing second output signals identical to the first output signals, error value means for receiving the second output signals and a teacher signal and for generating error signals designating an inconsistency between the second output signal and the teacher signal, and weight learning means for calculating and storing a weight updating signal in respective updating cycles and for generating the weight signal so that a sum of the error signals becomes within a predetermined allowable range by sequentially updating in updating cycles the weight signal in accordance with the weight updating signal based on the sum of the error signals determined at a first updating cycle, based on a once dalyed weight updating signal determined at a second updating cycle prior to the first updating cycle, and based on a twice delayed weight updating signal determined at a third updating cycle prior to the second updating cycle.

2. The learning process system according to claim 1, wherein said weight learning means comprises:
   a register group for temporarily storing a first parameter $-\epsilon$, a second parameter $\alpha$, and a third parameter $-\beta$,
   memory means for storing the weight signal, the present weight updating signal, the once dalyed weight updating signal, and the twice delayed weight updating signal,
   multiplying means for executing a first multiplication of $-\epsilon$ by a partial differentiation of the error signals, a second multiplication of $\alpha$ by the once delayed weight updating signal, and a third multiplication of $-\beta$ by the twice delayed weight updating signal,
   first adding means for adding results of the first, second and third multiplications to produce a result,
   second adding means for adding the weight signal to the result of said first adding means to determine a new weight and storing the new weight signal in the memory means.

3. The learning process system according to claim 2, wherein said memory means comprises means for receiving a common weight address selection signal and a shift signal, for sequentially shifting the weight updating signal to provide the once delayed weight updating signal and the twice delayed weight updating quantity.

4. The learning process system according to claim 2, further comprising means for providing a weight selection signal comprising a layer number, a basic unit number and a connection number as an address signal to said memory means.

5. The learning process system according to claim 4, wherein said weight learning means includes means for determining the weight signal in response to the error signal based on the following differential equation, and $$JW(t) + MW(t) + DW(t) = -\frac{\partial E(t)}{\partial W(t)}$$

wherein a differential approximate of the differential equation is expressed with regard to weight updating signal ($\Delta W(t)$) as follows, $$\Delta W(t) = \frac{-1}{J + M + D} \cdot \frac{\partial E(t)}{\partial W(t)} +$$
$$\frac{2J + M}{J + M + D} \Delta W(t - 1) -$$
$$\frac{J}{J + M + D} \Delta W(t - 2)$$
$$= -\epsilon \frac{\partial E(t)}{\partial W(t)} + \alpha \Delta W(t - 1) - \beta \Delta W(t - 2)$$

where
$\Delta W(t)$ is the weight updating signal,
E is the error signal,
$\Delta W(t-1)$ is the once delayed weight updating signal,
$\Delta W(t-2)$ is the twice delayed weight updating signal, and
$\epsilon$, $\alpha$ and $\beta$ are predetermined coefficients.

6. The learning process system according to claim 1, wherein each basic unit comprises part of an analog neuron chip.

7. The learning process system according to claim 1, wherein said input, intermediate and output layers are controlled by an analog time division signal.

8. A learning process system for use with a network comprising a layered network including an input layer, at least one intermediate layer and an output layer, each layer being responsive to a weight signal,
   input signal maintaining means for maintaining an input signal to be input to the layered network, the input signal being selected based on a pattern selection signal,
   teacher signal maintaining means for maintaining a teacher signal,
   error means for calculating an error signal between an output of said layered network and the teacher signal when said layered network receives the input signal and for outputting an error rate signal representing a rate of change of the error signal,
   weight learning means for receiving the error rate signal, for calculating and storing weight updating signal in respective updating cycles and for generating the weight updating signal in response to the error rate signal, a once delayed weight updating signal and a twice delayed weight updating signal, and
   main control circuit means for providing the weight signal to the layered network, for performing an initial setting of said weight learning means, before said weight learning means determines the updating quantities, and for applying the pattern selection signal to said input signal maintaining means to perform control of said error means.

9. The learning process system according to claim 6, wherein said learning process system further comprises:
   a weight data memory,
   a weight updating quantity memory,
   a previous weight updating quantity memory, and
   a twice-previous weight updating quantity memory,
   wherein said main control circuit means includes means for outputting a clear signal to said weight updating quantity memory, said previous weight updating quantity memory, and said twice-previous weight updating quantity memory for clearing said weight updating quantity memory, said previous weight updating quantity memory and said twice-previous weight updating quantity memory, outputting a shift signal for copying the weight updating signal from said weight updating quantity memory to said previous weight updating quantity memory and copying the once delayed weight updating signal from the previous weight updating quantity memory to said twice previous weight updating quantity memory, a weight selecting signal for an address for said weight data memory, said weight updating quantity memory, said previous weight updating quantity memory and said twice-previous weight updating quantity memory, a weight reading signal for controlling reading of said weight data memory, said weight updating quantity memory, said previous weight updating quantity memory and said twice-previous weight updating quantity memory, an initial value setting signal for setting an initial value in the weight data memory, learning parameter signals $-\epsilon$, $\alpha$ and $-\beta$ for said weight learning means and a weight updating signal for synchronizing the weight learning means.

10. The learning process system according to claim 9, wherein said weight updating signal comprises a synchronization pulse signal and said weight learning means includes:

means for multiplying the learning parameter signals with the error rate signal, the contents of the previous weight updating quantity memory, and the contents of the twice-previous weight updating quantity memory to produce products in a first time period;

first adding means for adding the products and for outputting the weight updating signal in a second time period second adding means for updating the weight signal in a third time period; and means for storing the weight data into said weight data memory in a fourth time period.

11. The learning process system according to claim 6, wherein said weight learning means in the network comprises:

serial read and write analog neuron chips connected to store the weight signal and the weight updating signal, the once delayed weight updating signal and the twice delayed weight updating signal at an address.

12. A learning process system for use in a network, comprising:

a single layer including a plurality of basic units, each including a basic unit input each connected to receive an input signal and a basic unit output each connected to receive a weight signal to be multiplied by the input signal received by the basic unit input, connected to provide a sum-of-products and connected to convert the sum-of-products by a threshold value function to provide an output signal at a basic unit output;

a feedback path for selectively feeding back output signals at basic unit outputs as inputs to basic unit inputs to sequentially operate as an input layer, an intermediate layer and an output layer;

output signal providing means for receiving a first output signal from the basic unit output of at least one basic unit of said single layer when operating as the output layer and providing a second output signal based on the first output signal by supplying a plurality of predetermined input signals to the basic unit input of at least one basic unit of said single layer when operating as the input layer;

error value means for obtaining the second output signal from said output signal providing means and a teacher signal and for calculating an error signal designating an inconsistency between the second output signal and the teacher signal; and weight learning means for calculating and storing a weight updating signal in respective updating cycles and for producing the weight signal so that a sum of the error signals becomes within a predetermined allowable range by sequentially updating in updating cycles the weight signal in accordance with the weight updating signal based on the sum of the error signals determined at a first one of the updating cycles, based on a once delayed weight updating signal determined at a second updating cycle prior to the first updating cycle and based on a twice delayed weight updating signal determined at a third updating cycle prior to the second updating cycle.

13. A method of learning in a layered neural network, comprising the steps of:

(a) determining in the layered neural network an output signal in response to a weight signal from a weight learning circuit;

(b) generating an error signal in an error circuit between a teacher signal and the output signal of the layered neural network; and (c) generating the weight signal in a weight learning circuit in response to a previous weight signal and a weight updating signal, the weight updating signal being generated in response to the error signal from the error circuit, a once delayed weight updating signal and a twice delayed weight updating signal.

14. A method according to claim 13, wherein said step (c) comprises the substeps of:

(c1) obtaining a rate of change of the error signal in response to the error signal;

(c2) generating the weight updating signal in the weight learning circuit in response to the rate of change of the error signal, the once delayed weight updating signal, and the twice delayed weight updating signal;

(c3) delaying the once delayed weight updating signal; and (c4) delaying the weight updating signal.

15. A method according to claim 13, wherein said step (c) comprises the substep of:

(c1) determining a rate of change of the error signal.

16. A method according to claim 15, wherein said step (c) further comprises the substeps of:

(c2) summing in the weight updating circuit the rate of change of the error signal corresponding to each of a plurality of output signals to produce a summed differential error signal; and (c3) determining in the weight updating circuit at least one weight updating signal in response to the summed differential error signal, the once delayed weight updating signal and the twice delayed weight updating signal.

17. A method according to claim 13, further comprising the steps of:

(d) determining if the error signal exceeds a predetermined threshold; and (e) repeating steps (a) through (d) when said step (d) determines the error signal exceeds the predetermined threshold.

18. A learning process system for use with a layered neural network comprising an input layer, at least one intermediate layer connected to respond to the input layer and a weight signal, and an output layer connected to respond to at least one of the at least one intermediate layer, said learning process system comprising:

a teacher signal providing circuit;

an error circuit, operatively connected to said output layer and said teacher signal providing circuit and connected to output an error signal; and a weight learning circuit operatively connected to said error circuit and the layered neural network to provide the weight signal to the layered neural network including means for generating the weight signal in response to a previous weight signal and a weight updating signal, the weight updating signal being generated in response to the error value signal, a once delayed weight updating signal and a twice delayed weight updating signal.

19. An apparatus according to claim 18, wherein said weight learning circuit includes means for generating the weight updating signal in response to the error value signal, a once delayed weight updating signal and a twice delayed weight updating signal.

20. An apparatus according to claim 19, wherein said weight learning circuit includes means for providing the weight updating signal as $$\Delta W(t) = -\epsilon \frac{\partial E}{\partial W} + \alpha \Delta W(t-1) - \beta \Delta W(t-2)$$

where
$\Delta W(t)$ is the weight updating signal,
E is the error signal,
$\Delta W(-1)$ is the once delayed weight updating signal,
$\Delta W(t-2)$ is the twice delayed weight updating signal, and
$\epsilon$, $\alpha$ and $\beta$ are predetermined coefficients.

21. A learning process system, comprising:
a neural network capable of generating an output signal in response to an input signal and a weight signal;
a teacher signal circuit capable of generating a teacher signal;
an error circuit, operatively connected to receive the teacher signal from said teacher signal providing circuit and the output signal from said neural network, to provide an error signal; and
a weight learning circuit, operatively connected to receive the error signal from said error circuit and to provide the weight signal to said neural network, the weight signal being generated in response to a previously generated weight signal and a weight updating signal, the weight updating signal being generated in response to the error signal, a once delayed weight updating signal and a twice delayed weight updating signal.

22. A learning system according to claim 21, wherein said weight learning circuit generates the weight updating signal in response to a rate of change of the error signal, a once delayed weight updating signal and a twice delayed weight updating signal.

23. A learning process system comprising:
a layered neural network having weight values input by a weight value input signal and updated during weight value updating cycles, said layered neural network receiving a first input signal and producing a first output signal responsive to the first input signal; and
weight learning means for receiving the first output signal, for determining updates to said weight values for a current weight value updating cycle responsive to said weight values for two weight value updating cycles immediately prior to the current weight value updating cycle, and for producing said weight value input signal.

* * * * *

UNITED STATES PATENT AND TRADEMARK OFFICE
CERTIFICATE OF CORRECTION

Page 1 of 2

PATENT NO. : 5,333,239
DATED : July 26, 1994
INVENTOR(S) : Nobuo Watanabe et al.

It is certified that error appears in the above-indentified patent and that said Letters Patent is hereby corrected as shown below:

Col. 5, line 62, "weight" should be --weights--; and
line 66, "weights" should be --weight--.

Col. 6, line 28, "$D\dot{W}$" should be --$D\ddot{W}$--; and
line 48, "$J\dot{W}$" should be --$J\ddot{W}$--.

Col. 13, line 24, "sum" should be --sum.--.

Col. 17, line 33, delete "-";
line 36, delete "20"; and
line 38, after "$D_{OUT}$" insert space.

Col. 28, line 7, delete "/".

Col. 29, line 10, delete "20".

Col. 30, line 52, "21 6" should be --216--; and
line 55, ""1and 0"" should be --"1 and 0"--.

Col. 39, line 13, "dalyed" should be --delayed--.

UNITED STATES PATENT AND TRADEMARK OFFICE
CERTIFICATE OF CORRECTION

PATENT NO. : 5,333,239
DATED : July 26, 1994
INVENTOR(S) : Nobuo Watanabe, et. al.

It is certified that error appears in the above-indentified patent and that said Letters Patent is hereby corrected as shown below:

Col. 41, line 23, "6" should be --8--.

Signed and Sealed this

Thirteenth Day of December, 1994

Attest:

BRUCE LEHMAN

Attesting Officer    Commissioner of Patents and Trademarks